(12) United States Patent
Schultz et al.

(10) Patent No.: US 9,157,818 B2
(45) Date of Patent: Oct. 13, 2015

(54) PORTABLE TORQUE MEASUREMENT AND NOTIFICATION SYSTEM AND METHOD OF USING SAME

(71) Applicant: Thru Tubing Solutions, Inc., Oklahoma City, OK (US)

(72) Inventors: Roger L. Schultz, Ninnekah, OK (US); Brock Watson, Oklahoma City, OK (US); Greg A. Kliewer, Edmond, OK (US); Robert G. Watson, Baird, TX (US); Andrew Ferguson, Moore, OK (US)

(73) Assignee: Thru Tubing Solutions, Inc., Oklahoma City, OK (US)

( * ) Notice: Subject to any disclaimer, the term of this patent is extended or adjusted under 35 U.S.C. 154(b) by 294 days.

(21) Appl. No.: 14/022,424

(22) Filed: Sep. 10, 2013

(65) Prior Publication Data

US 2014/0009305 A1      Jan. 9, 2014

Related U.S. Application Data

(63) Continuation-in-part of application No. 13/493,363, filed on Jun. 11, 2012, now Pat. No. 8,413,525.

(51) Int. Cl.
*G01L 3/10* (2006.01)
*B25B 23/14* (2006.01)
*E21B 19/16* (2006.01)
*G01L 5/24* (2006.01)
*G01L 1/22* (2006.01)

(52) U.S. Cl.
CPC . *G01L 3/10* (2013.01); *B25B 23/14* (2013.01); *E21B 19/166* (2013.01); *G01L 1/22* (2013.01); *G01L 5/24* (2013.01)

(58) Field of Classification Search
CPC .................................. G01L 3/10; B25B 23/14
USPC ...................................................... 73/862.338
See application file for complete search history.

(56) References Cited

U.S. PATENT DOCUMENTS

| | | | |
|---|---|---|---|
| 2008/0097735 A1* | 4/2008 | Ibrahim et al. | 703/10 |
| 2010/0018294 A1* | 1/2010 | Tonmukayakul et al. | 73/54.28 |
| 2014/0009305 A1* | 1/2014 | Schultz et al. | 340/870.01 |
| 2014/0165796 A1* | 6/2014 | Gauthier et al. | 81/479 |
| 2014/0196548 A1* | 7/2014 | Watson et al. | 73/862.191 |

* cited by examiner

*Primary Examiner* — Lisa Caputo
*Assistant Examiner* — Jamel Williams
(74) *Attorney, Agent, or Firm* — Belair Intellectual Property Law LLC

(57) ABSTRACT

A method for measuring torque measurement and generating a notifier, including searching for one or more wirelessly pairable load applying devices for applying a load to an object; displaying to a user those paired one or more load applying devices; responsive to selecting one of the displayed one or more load applying devices, receiving one or more of the group consisting of load measurements transmitted from the selected load applying device; and generating a notifier based on the proximity of the one or more of the group consisting of load measurements and torque measurements and a target value.

20 Claims, 22 Drawing Sheets

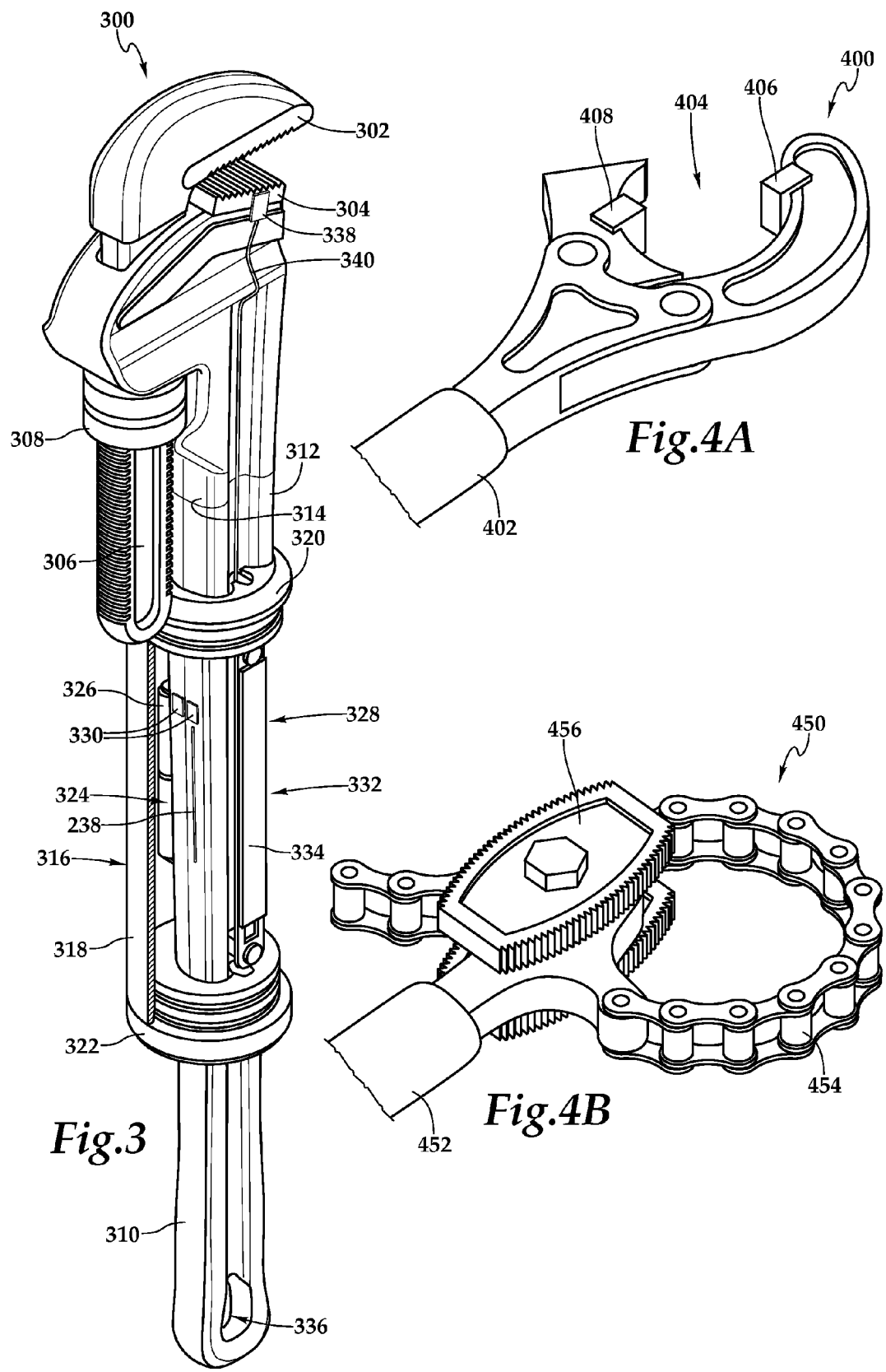

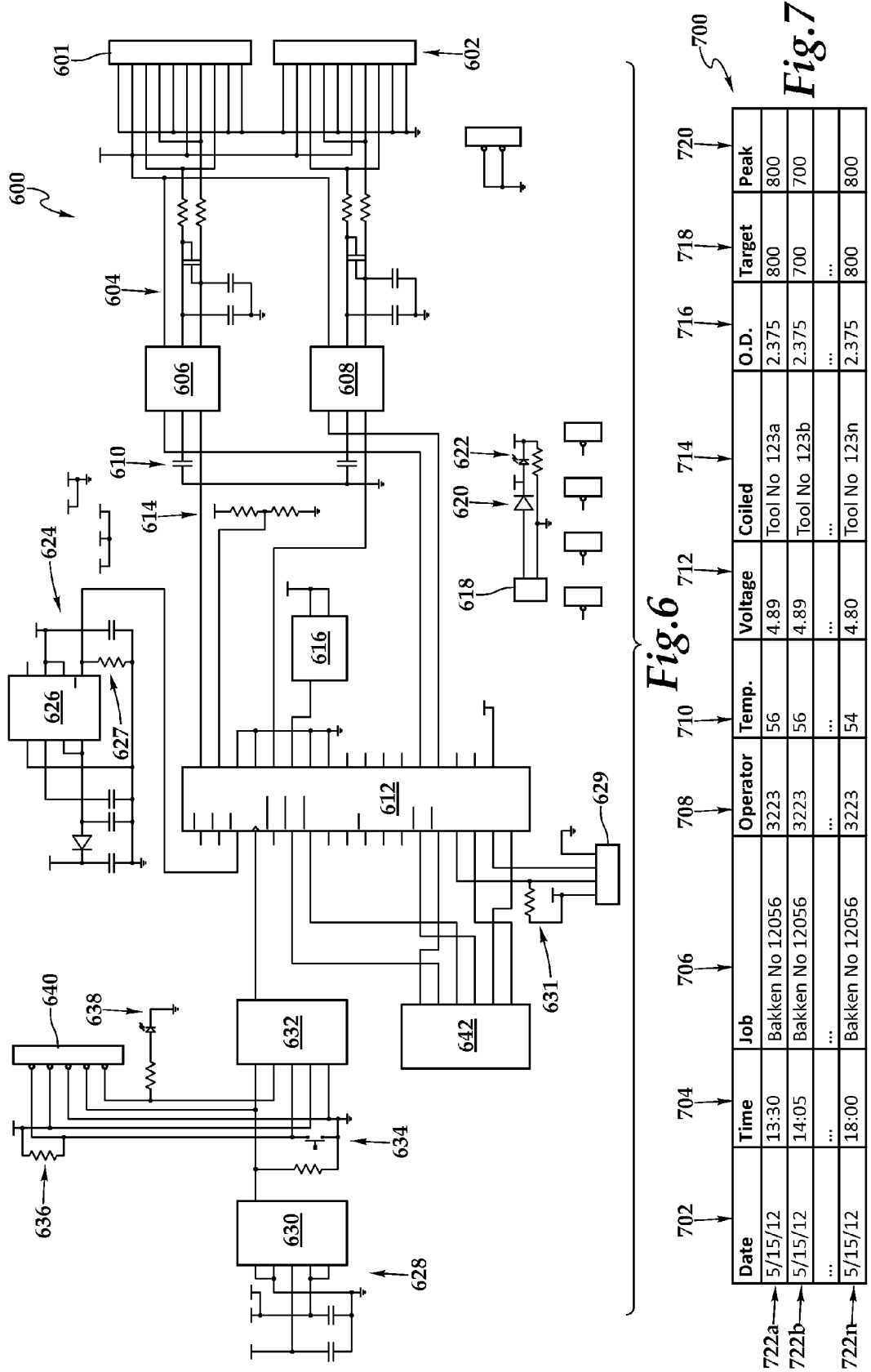

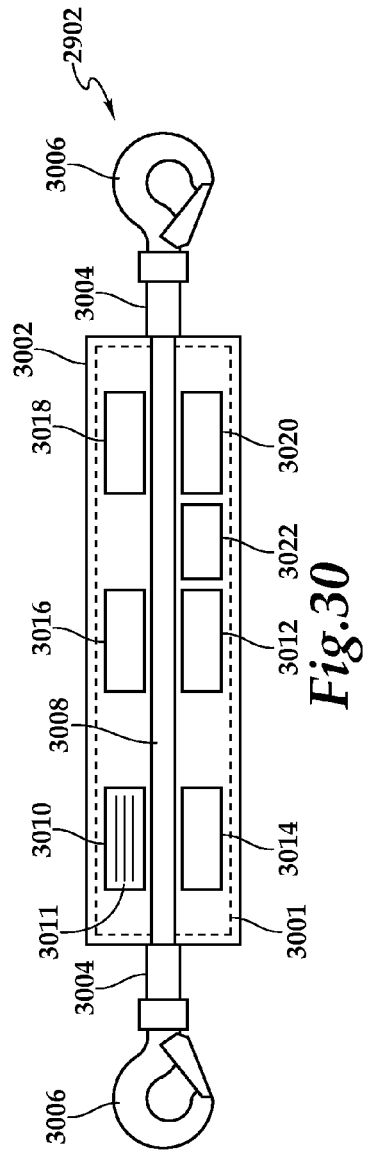

PORTABLE TORQUE MEASUREMENT AND NOTIFICATION SYSTEM AND METHOD OF USING SAME

CROSS-REFERENCE TO RELATED APPLICATIONS

This application is a divisional of prior U.S. patent application Ser. No. 13/666,914, filed Nov. 1, 2012, which is a continuation-in-part of prior U.S. patent application Ser. No. 13/493,363, filed Jun. 11, 2012, now issued U.S. Pat. No. 8,413,525. The entirety of these aforementioned applications is incorporated herein by reference.

TECHNICAL FIELD OF THE INVENTION

This invention relates, in general, to a system for measuring torque applied to an object and, in particular, to a portable torque measurement and notification system and method of using same.

BACKGROUND OF THE INVENTION

Without limiting the scope of the present invention, its background will be described in relation to a portable torque measurement and notification system and method of using same, as an example.

In drilling for oil and gas it is common practice to couple a plurality of tubular members together to produce extended tubular strings, work strings, drillstrings, pipe strings, tubulars, pipe, tool strings, etc. Tubular members typically have tapered threaded ends or connectors that are joined together to form a joint between adjacent tubular members. These tapered threaded connectors must be rotated or coupled together using tools that are capable of applying sufficient torque to one adjacent tubular member while oftentimes the other adjacent tubular member is held substantially rotationally, stationary. To ensure that the shoulders of a joint are butted together properly, it is desirable to torque the joint according to manufacturer's specifications. It is common to refer to the torque required to properly joint together adjacent tubular members as "make-up torque." There are several known methods and tools for applying make-up torque to tubular members.

In one method, the wrench or tool utilized to provide the make-up torque to the tubular members is generally known as pipe tongs. Pipe tongs typically include a set of articulated jaws containing teeth or dies for securely gripping the outer surfaces or diameter of the tubular members. In this method, a first pipe tong is gripped to a tubular member and a second pipe tong is gripped to an adjacent tubular member. By applying force to the pipe tong such that the handles of each pipe tong are forced towards each other a torque is applied to the tubular member. In one aspect, the force may be applied by using a "come-a-long" to the point where an operator determines a "sufficient" amount of torque has been applied to the two tubular members sufficient to meet the manufacturer's recommended torque setting; the sufficiency determination being somewhat arbitrary depending on the operator. Thus, it is oftentimes difficult to apply precisely the manufacturer's recommended make-up torque using this method. In addition, this method may be dangerous in light of the difficulty in controlling the force exerted by the come-a-long in reaching a pre-determined make-up torque. Such lack of control may cause the pipe tongs to fail during operation. Also, conventional pipe tongs tend to be heavy tools and operating them in the field, overhead, and the like further causes dangerous situations for a user.

Additionally, larger pipe tongs used in making up larger diameter tubular members out in the field are substantially larger tools and may weigh a significant amount. Further, oftentimes these pipe tongs may need to be operated moderate distances off of the ground or rig floor. Operating these larger, heavier pipe tongs in these environments may create additional dangers for an operator.

Another method is to apply make-up torque to tubular members with what are commonly known as "power tongs." Power tongs are large, expensive, complex pieces of equipment that include hydraulically operated jaws that are disposed in a housing. Tubular members that are to be joined are raised and lowered through the housing of the power tongs to present the tubular members to a couple of sets of jaws that grip the tubular members. One set of jaws grips and holds one of the tubular member while another set of jaws grips and rotates the other tubular member. To determine the magnitude of torque applied by the power tongs, the hydraulic pressure that is applied to the rotating set of jaws is monitored and the pressure readings are converted into engineering torque units, such as lb·ft, N·m, ft·lb, etc.

Power tongs require substantial structural frame members and generally are moved on tracks disposed on the floor or rig floor. Because they are large and require tracks to be moved about, they tend to be very expensive and not portable.

SUMMARY OF THE INVENTION

The present invention disclosed herein is directed to a portable torque measurement and notification system and method ("portable torque measurement and notification system")

In one embodiment, the present invention is directed to a portable torque measurement and notification system, including a sensing device having a first end adaptable to connect with a first torque applying device and a second end adaptable to connect with a second torque applying device, the first and second torque applying device to apply torque to an object, the sensing device including one or more sensors in communication with the first end and second end of the sensing device to produce load responsive measurements of the at least one of the first and second torque applying device; a first electronic circuit to receive the one or more load responsive measurements and to transmit wirelessly at least one of the group consisting of the one or more load responsive measurements and one or more torque measurements; at least one power unit to power the one or more sensors and the first electronic circuit; and a wireless device operable to communicate wirelessly with the sensing device, the wireless device having a means for receiving at least one of the group consisting of the one or more load responsive measurements and the one or more torque measurements.

In one aspect, the portable torque measurement and notification system may further include a load generating device disposed between one of the first end of sensing device and the first torque applying device and the second end of the sensing device and the second torque applying device. In another aspect, the sensing device determines the distance between the first and second torque applying device. In yet another aspect, the wireless device produces a notifier based on the difference between the one or more torque measurements and a target torque value. Preferably, the wireless device may store algorithms to determine a repetition rate of the notifier based on the difference between the one or more torque measurements and the target torque value. In still yet another aspect, the sensing device and wireless device communicate wirelessly at an effective range of no more than 10 feet. Preferably, the first electronic circuit converts the one or more load responsive measurements to the one or more torque measurements.

In another embodiment, the present invention is directed to a portable torque measurement and notification system, including a sensing device having a first end adaptable to connect with a first torque applying device and a second end adaptable to connect with a load generating device, the first torque applying device to apply torque to an object, the sensing device including one or more sensors in communication with the first end and second end of the sensing device to produce load responsive measurements of the first torque applying device; a first electronic circuit to receive the one or more load responsive measurements and to transmit wirelessly one or more of the one or more load responsive measurements and/or the one or more torque measurements; at least one power unit to power the one or more sensors and the first electronic circuit; a wireless device operable to communicate wirelessly with the sensing device, the wireless device having a means for receiving at least one of the group consisting of the one or more load responsive measurements and the one or more torque measurements, and a second electronic circuit to produce a notifier; and a first member to position the sensing device substantially perpendicular to the first torque applying device.

In one aspect, the first member may be a brace that extends from the object to one of the first and second ends of the sensing device. In another aspect, the first member may be a strain beam. In yet another aspect, the first member may be a bracket. Preferably, the sensing device and wireless device communicate wirelessly at an effective range of no more than 10 feet.

In yet another embodiment, the present invention is directed to a method for measuring torque measurement and generating a notifier, including searching for one or more wirelessly pairable load applying devices for applying a load to an object; displaying to a user those paired one or more load applying devices; responsive to selecting one of the displayed one or more load applying devices, receiving one or more of the group consisting of load measurements and torque measurements transmitted from the selected load applying device; and generating a notifier based on the proximity of the one or more of the group consisting of load measurements and torque measurements and a target value.

In one aspect, the target value may be a target torque value. In another aspect, the notifier may be selected from the group consisting of an aural notifier, audible notifier, tactile notifier, vibratory notifier, and vocal notifier, voice notifier, and visual notifier. Also, the method may include displaying to the user a graphical representation of the one or more of the group consisting of load measurements and torque measurements in real-time relative to the target value.

In still yet another aspect, the method may include displaying to the user a graphical representation of the one or more of the group consisting of load measurements and torque measurements in real-time relative to the target value. Additionally, the method may include transmitting all of the received one or more of the group consisting of load measurements and torque measurements to a storage device. Also, the method may include inputting the target value by the user. Further, the method may include inputting one or more of the group consisting of one or more dimensions of the object, one or more dimensions of the load applying device, offset, gain, zero, calibration, distance between one or more load applying devices.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which:

FIG. 3 is a perspective view of a torque applying device having a sensor for determining the distance apart of its jaws of the portable torque measurement and notification system according to another embodiment;

FIG. 4A is a perspective view of a different tool end of a torque applying device according to another embodiment;

FIG. 4B is a perspective view of a different tool end of a torque applying device according to another embodiment;

FIG. 6 is an electronic schematic diagram of circuitry of a torque applying device of portable torque measurement and notification system according to an embodiment;

FIG. 7 is a database spreadsheet with columns/rows showing exemplary values of measured torque by a torque applying device of portable torque measurement and notification system according to an embodiment;

FIG. 30 is a block diagram of components of circuitry of a load measuring device of portable torque measurement and notification system according to another embodiment;

FIG. 32 is a database spreadsheet with columns/rows showing exemplary values of wrench distances, forces, calculated torques, and data of portable torque measurement and notification system according to another embodiment;

FIG. 34 is a database spreadsheet with columns/rows showing exemplary values of wrench distances, forces, calculated torques, and data of portable torque measurement and notification system according to another embodiment;

DETAILED DESCRIPTION OF THE INVENTION

While the making and using of various embodiments of the present invention are discussed in detail below, it should be appreciated that the present invention provides many applicable inventive concepts which can be embodied in a wide variety of specific contexts. The specific embodiments discussed herein are merely illustrative of specific ways to make and use the invention, and do not delimit the scope of the present invention.

Figure 1:
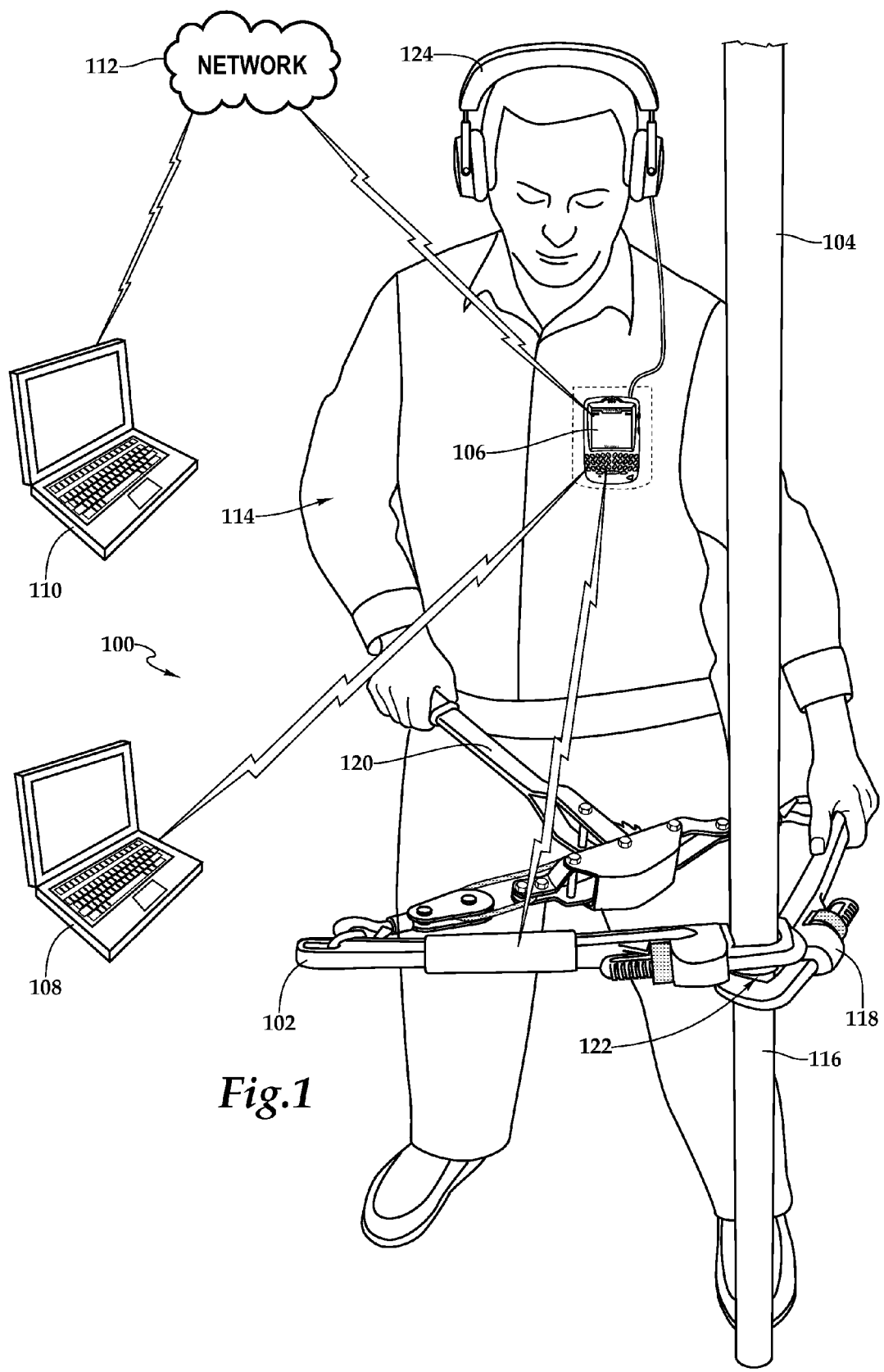
FIG. 1 is a schematic illustration of a portable torque measurement and notification system according to an embodiment.

Referring initially to FIG. 1, a portable torque measurement and notification system is schematically illustrated and generally designated 100. Portable torque measurement and notification system 100 includes a torque applying device 102 for engaging with a tubular member 104 and applying torque to tubular member 104. Portable torque measurement and notification system 100 includes a wireless communications device (wireless device) 106 that is capable to communicating wirelessly with torque applying device 102. Portable torque measurement and notification system 100 further includes one or more computing devices 108 that are in wireless communication with wireless device 106. Additionally, portable torque measurement and notification system 100 may include one or more computing devices 110 that may be in communication with wireless device 106 via any known networks using any known network 112 as further described below.

A user 114 may operate torque applying device 102 to apply torque to tubular member 104 for tightening a threaded end of tubular member 104 with a threaded end of a tubular member 116. In general, user 114 securely grips torque applying device 102 to tubular member 104 and securely grips a conventional wrench 118 to tubular member 116. He then may connect a portable winch 120, such as a "come-along" between torque applying device 102 and wrench 118 to apply the desired or recommended torque to tubular member 104 and tubular member 116 to properly join the two tubular members at joint 122. In one aspect torque applying device 102 may be located above wrench 118 and in another aspect torque applying device 102 may be located below wrench 118 during operation of portable torque measurement and notification system 100.

In another embodiment, 100 may be used without portable winch 120, such that user 114 may apply the force on torque applying device 102 and wrench 118. Additionally, wrench 118 may not be necessary either, as 102 may apply torque to an object, such as tubular members without the need for wrench 118. Also, the present invention is being described applying and measuring torque of torque applying device 102 and wrench to tubular members 104, 116, but the present system may be used when desiring to apply and measure torque applied to any object having any form or shape.

Portable torque measurement and notification system 100 may be used in any type of environments, including in the field, in a shop, and/or or inside a building where pipe strings, coiled tubing strings, tool strings and the like are made up. Although the present portable torque measurement and notification system has been described in relation to tubular members, portable torque measurement and notification system may be used with any types of tools that apply torque or force to another object, regardless of shape, form, etc.

Portable torque measurement and notification system 100 measures the torque applied by torque applying device 102 to tubular member 104 and generates and provides notifiers to user 114 based on actual torque measurements and a target torque value. Such notifiers, as discussed further below, may be any type of notifiers including tactile, visual, auditory, vibratory, and aural, that may be presented to user 114 through listening devices 124. Wireless device 106 may be carried anywhere on user's 114 person, and in one example, wireless device 106 may be carried in a user's 114 pocket. Wireless device 106 may also be carried in a holster that attaches to a belt of user 114, for example.

In another embodiment, portable torque measurement and notification system 100 may generate and provide such notifiers to another user who may then notify user 114 that the target torque value has been achieved. Likewise, any number of users may access any of the computing devices 108, 110 to be notified of any of the data and information herein disclosed and may present such information and data to user 114 or others. Further, wireless device 106 may provide any of the data and notifiers to any other users up to any distance transmittable by wireless device 106.

Figures 2A, 2B, 2C:
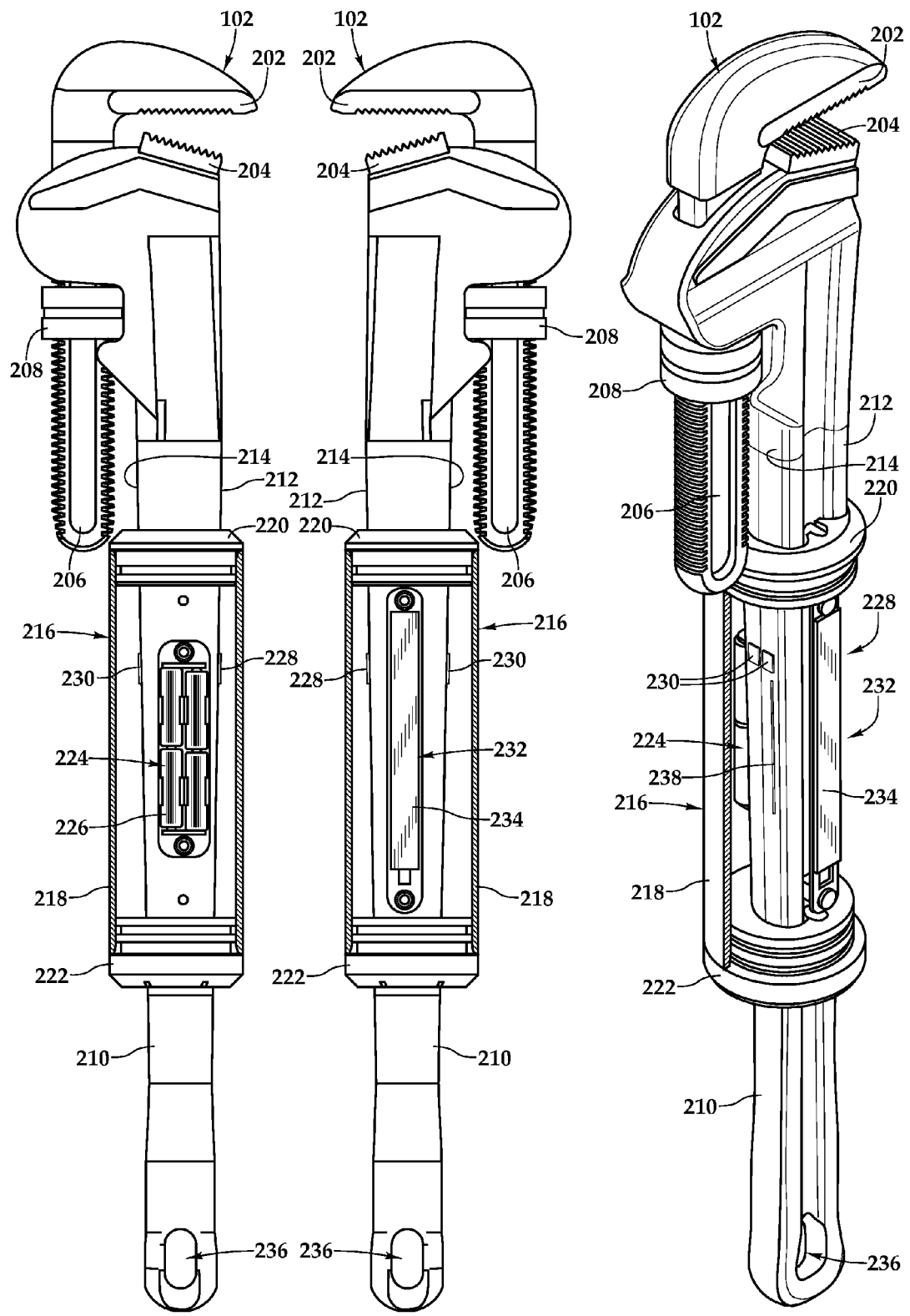
FIG. 2A is a side view of a torque applying device of having a power unit enclosed in a housing disposed about the handle of the torque applying device of the portable torque measurement and notification system according to an embodiment.
FIG. 2B is the opposite side view of the torque applying device of FIG. 2A having electronic circuitry enclosed in the housing disposed about the handle of the torque applying device of the portable torque measurement and notification system according to an embodiment.
FIG. 2C is a perspective partial cutaway view of the torque applying device of FIG. 2A having strain gages enclosed in a housing disposed about the handle of the torque applying device of the portable torque measurement and notification system according to an embodiment.

Turning now to FIGS. 2A-2C, an embodiment of torque applying device 102 is shown in various views. Torque applying device 102 may include an upper jaw 202 and a lower jaw 204 that operate together to securely grip an object, such as tubular members 104, 116. Upper jaw 202 and lower jaw 204 may be teeth and/or dies disposed about the surfaces of each that face each other. Typically, upper jaw 202 is an adjustable jaw that includes a threaded portion 206 at the other end of upper jaw 202 for engaging with a threaded adjustor 208 for adjusting the distance between upper jaw 202 and lower jaw 204. Torque applying device 102 may further include a handle 210 for applying force by either user 114 and/or portable winch 120. Handle 210 typically has a bottom surface 212 and a top surface 214. Extending between bottom surface 212 and top surface 214 are sides of handle 210.

Torque applying device 102 may further include a torque measuring unit 216 that includes a housing 218 that substantially encloses a portion of handle 210. Housing 218 may be any shape or form of housing that substantially encloses all or a portion of handle 210. In one aspect, housing 218 may be a substantially cylindrical housing. Preferably, housing 218 is made and/or formed of a material that doesn't prevent wireless transmissions, such as electromagnetic waves, radio frequency signals, etc., from transmitting between torque applying device 102 and wireless device 106.

Torque measuring unit 216 may further include housing members 220, 222 for providing a sealing enclosure at the ends of housing 218 to handle 210. Housing members 220, 222 may be any shape or form, and in one embodiment they may be substantially disk-shaped objects that have portions of material removed or voids formed for accepting the cross-section of handle 210 when they are joined with housing 218. Preferably, housing members 220, 222 may have additional holes or vias for accepting wires and the like from additional sensors that may be disposed about torque applying device 102. Preferably, housing members 220, 222 are made of flexible, elastic, and the like material such that they do not interfere or counter the bending or flex of handle 210 during operation of torque applying device 102.

Torque applying device 102 further includes a power unit 224 that may be disposed about bottom surface 212, top surface 214 and/or sides of torque applying device 102 for powering the electronics contained within torque measuring unit 216 of torque applying device 102. In one embodiment, power unit 224 may include one or more batteries 226 as known to those skilled in the arts. Preferably, batteries 226 have good temperature variation performance, such that they provide substantially stable voltage through a wide range of environmental operating conditions. In one embodiment, batteries 226 may be lithium iron disulfide batteries, which provide very good low temperature performance.

In one embodiment, torque measuring unit 216 may further include one or more strain gages 228 disposed substantially about bottom surface 212 and one or more strain gages 230 disposed substantially about top surface 214 of handle 210 of torque applying device 102 for detecting the strain of handle 210 when applying force and/or torque to tubular member 104. In one embodiment, strain gages 228, 230 are sets of two "foil-type" strain gages adjacent to each other that are disposed about the bottom surface 212 and top surface 214, respectively, of handle 210 in a location that is provides optimal sensitivity to the strain, flex, compression, tension, and the like of handle 210 of torque applying device 102 during operation of torque applying device 102.

Preferably, strain gages 228, 230 may have insulating flexible backing having an adhesive for adhering to bottom surface 212 and top surface 214 of handle 210. Adhesives may be used for affixing strain gages 228, 230 to bottom surface 212 and top surface 214 of handle 210. As handle 210 is deformed during operation, strain gages 228, 230 are slightly deformed causing the electrical resistance of strain gages 228, 230 to change. Any type of strain gage that is mountable to torque applying device 102 and that can provide strain readings of handle 210 during operation of torque applying device 102 may be used. In one embodiment, strain gages 228, 230 are manufactured by Omega Engineering, Inc. and have part number SGD-7/1000-DY11, for example. Technical specifications of this strain gage are incorporated herein by reference.

Torque measuring unit 216 further includes an electronic circuitry 232, such as printed circuit board ("PCB") PCB 234, that is described further with reference to FIG. 6. PCB 234 may be affixed, attached, and/or adhered to one of the sides of handle 210 by any known means, such as by use of adhesives, fasteners, bolts, screws, and the like. In one embodiment, power unit 224 may be located or disposed on one side of handle 210 and electronic circuitry 232 may be located or disposed on the opposite side of handle 210. Preferably, power unit 224 and electronic circuitry 232 are completely enclosed within housing 218 of torque measuring unit 216 to provide protection of them from the elements during operation of torque applying device 102. Additionally, handle 210 of torque applying device 102 may include a via or hole 236 for accepting fasteners, rings, hooks, and the like of portable winch 120.

In one embodiment, torque applying device 102 may further include one or more tattle-tale wires 238, as best shown in FIG. 2C, for providing notification to user 114 that torque applying device 102 may have been over torqued. If torque applying device 102 was operated beyond its designed limitations, tattle-tale wires 238 may break indicating that torque applying device 102 may need to be replaced. In one embodiment, electronic circuitry 232 of torque applying device 102 may sense that tattle-tale wires 238 has been compromised, broken, and/or open and report such status to wireless device 106 and/or computing devices 108, 110. In general, tattle-tale wires 238 may be located where compression and/or tension of handle 210 of torque applying device 102 occurs. In one aspect, tattle-tale wires 238 may be located or disposed about the bottom surface 212 and/or top surface 214 of torque applying device 102. In another aspect, tattle-tale wires 238 may be substantially proximal to strain gages 228, 230.

In general, if torque applying device 102 is over torqued during normal operations, strain gages 228, 230 may indicate such a condition to electronic circuitry 232 for transmitting to computing devices 108, 110 and user 114. Tattle-tale wires 238 may be useful when torque applying device 102 may be in an off state and be over torqued.

In addition to the strain gages used for sensing strain, another strain sensitive element will be installed in a high strain area of the wrench handle. This strain sensitive element will be constructed such that it will be permanently altered if the wrench is ever subjected to excessive torque. As a safety and health check for the wrench, the condition of this element will be monitored by the on-board electronics and if an "over-torque" history is sensed this will be indicated on the phone application and may be used to make the wrench inoperable.

Referring now to FIG. 3, another torque applying device is schematically illustrated and generally designated 300. Torque applying device 300 includes all of the elements and features of torque applying device 102. Torque applying device 300 includes upper jaw 302, lower jaw 304, threaded portion 306, threaded adjustor 308, handle 310, bottom surface 312, top surface 314, torque measuring unit 316, housing 318, housing members 320, 322, power unit 324, batteries 326, strain gages 328, 330, electronic circuitry 332, PCB 334, and hole 336. Preferably, torque measuring unit 316, housing 318, housing members 320, 322 are made of flexible, elastic, and the like material such that they do not interfere or counter the bending or flex of handle 210 during operation of torque applying device 102. The location and functionality of these common elements and features are similar and/or identical to those related elements and features described above with reference to torque applying device 102.

In this embodiment, torque applying device 300 may further include a jaw distance sensor 338 that may be wired to PCB 334 of electronic circuitry 332 of torque applying device 300. Jaw distance sensor 338 measures and/or senses the distance between upper jaw 302 and lower jaw 304 and transmits this data to PCB 334 of torque measuring unit 316 for calibration purposes as further described below. In another embodiment, jaw distance sensor 338 may be disposed or located substantially about top surface 314 for determining the distance between upper jaw 302 and lower jaw 304 by measuring the position of threaded adjustor 308 on threaded portion 306. In yet another embodiment, the distance between upper jaw 302 and lower jaw 304 may be determined or measured by indirectly measuring any other parameter between torque applying device 300 and any objects, such as tubular members 104, 116.

Some exemplary jaw distance sensor 338 may include optical sensors, doppler sensors, magnetic sensors, photo-electric sensors, ultrasonic sensors, and the like. In this embodiment, jaw distance sensor 338 provides the distance between upper jaw 302 and lower jaw 304 that is securely gripping a tubular member to determine the outer diameter of the gripped or engaged tubular member. This alleviates the need for a user of portable torque measurement and notification system 100 to make a determination of the outer diameter of a particular tubular member.

In addition to measuring torque and notifying user 114 of proximity of actual torque measurements to target torque value, any and all of the data acquired by wireless device 106 from torque applying devices 102, 300, 400, 450 may be used to determine operations of torque applying devices 102, 300, 400, 450, which measurement came from where and for what purpose, track down issues with torque applying devices 102, 300, 400, 450, limitations of torque applying devices 102, 300, 400, 450, confirm that torque applying devices 102, 300, 400, 450 are operating as expected, design flaws, etc.

Turning now to FIG. 4A, an end of another torque applying device is schematically illustrated and generally designated 400. The operating end of torque applying device 400 is shown in FIG. 4A and in this embodiment it includes a handle 402 that includes some or all of the features previously described above relative to torque applying device 102 and torque applying device 300 for measuring torque applied by torque applying device 400. Torque applying device 400 further includes an opening 404 that is formed by a semi-circular structure formed by a first member 406 and a second member 408 that grip indents, reliefs, and the like of a tubular member, for example. Torque applying device 400 may include ratcheting mechanisms as is commonly known in the arts.

Turning now to FIG. 4B, an end of another torque applying device is schematically illustrated and generally designated 450. The operating end of torque applying device 450 is shown in FIG. 4A and in this embodiment it includes a handle 452 that includes some or all of the features previously described above relative to torque applying device 102 and torque applying device 300 for measuring torque applied by torque applying device 450. Torque applying device 450 further includes a chain 454 for gripping an object, such as a tubular member, for example. Chain 454 may be adjusted and secured by adjustor 456. In addition to these torque applying devices described above, the features and elements for measuring torque applying device may be used with any type of tool, wrench, and the like for measuring the torque applied to an object by such torque applying devices.

Figure 5:
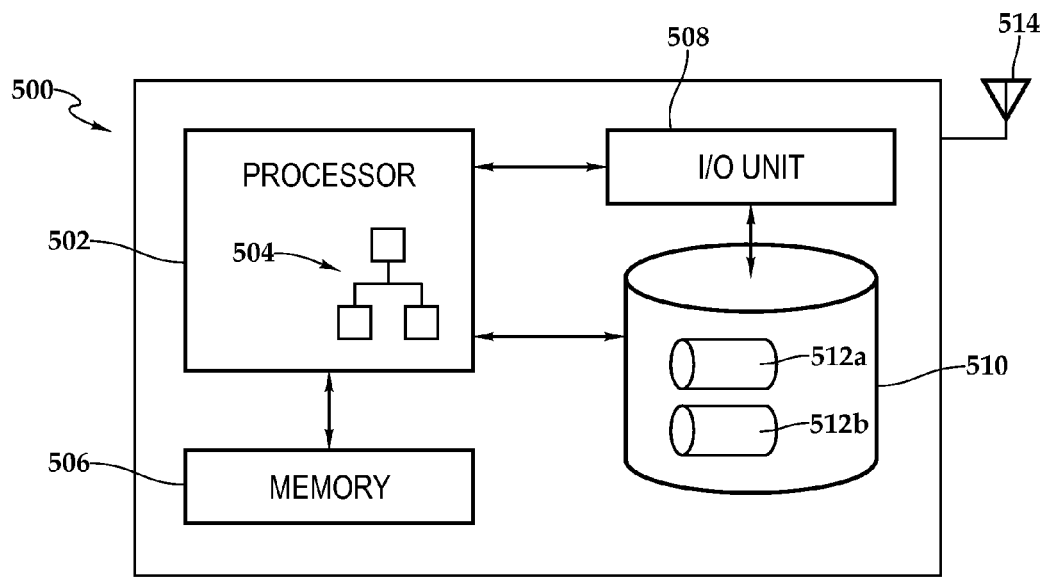
FIG. 5 is a block diagram of components of a computing device of portable torque measurement and notification system according to an embodiment.

With reference now to FIG. 5, a block diagram of exemplary computing devices 108, 110 and wireless device 106 is schematically illustrated and generally designated 500. Computing devices 108, 110 and wireless device 106 may include a processor 502 that executes software 504. Processor 502 may be in communication with memory 506, an input/output ("I/O") unit 508, and a storage unit 510. Storage unit 510 may store databases or data repositories 512a, 512b thereon. Computing devices 108, 110 may further include an antenna 514 for receiving and transmitting data between torque applying device 102 and computing devices 108, 110. Software 504 may include instructions for execution by processor 502 for providing network connectivity and computer status information in accordance with the principles of portable torque measurement and notification system 100. Additionally, portable torque measurement and notification system 100 may include any type of servers and the like that may be used with computing devices 108, computing devices 108, 110 and wireless device 106. Preferably, portable torque measurement and notification system 100 further may include wireless communication capabilities as are commonly known in the arts for communicating with wireless device 106 and/or torque applying device 102 directly. Some exemplary technologies, include Bluetooth, and/or other wireless communication standards herein discussed. In some environments the wireless standards used to communicate between wireless device 106 and torque applying device 102 may be operated at normal wireless signal power outputs such that torque applying device 102 and wireless device 106 may communicate at normal ranges of the wireless standards herein described.

In some other environments, it may be important that the effective distance of the wireless signals between torque applying device 102 and wireless device 106 be limited. For example, drilling operations performed in the field may include perforating devices for perforating casing, tubing, liners, and the like, and oftentimes these perforating devices are operated by wireless standards or technologies. To avoid interfering with these devices, the power of transmitter/transceivers of wireless device 106 and torque applying device 102 may produce a lower than normal power output to as to limit the distance of the wireless signals between torque applying device 102 and wireless device 106.

In one embodiment, the wireless standard used for transmitting the data and information herein described between torque applying device 102 and wireless device 106 may be Bluetooth® standard, or other wireless standard, wherein the power output of the devices may be less than a standard output to limit the range of the wireless signals. In one aspect, the range may be less than 10 feet. In another aspect, the range may be less than 6 feet. In one embodiment, the transmission power of torque applying device 102 and wireless device 106 may be less than 1 mW. In one aspect, the transmission power from about 0.1 mW to about 1.0 mW.

In another embodiment, the wireless standard used for communicating between torque applying device 102 and wireless device 106 in such short range applications may be Near Field Communication ("NFC").

Additionally, wireless device 106 may be operated where no existing wireless communication networks and/or links are available between it and computing devices 108, 110. In such a case, wireless device 106 may store torque measurements and related data and aggregate the data for later transmission once wireless communication network and/or link is established at a later time. Plus, by storing all this information on wireless device 106, user 114 may be able to access this data on location and/or during operation.

Computing devices 108, 110 and wireless device 106 may include any known types of devices that are capable of communicating over antennas 112 as is commonly known in the arts. Wireless device 106 may include mobile phones, cellular phones, Blackberry® wireless devices, iPhone® wireless devices, Android® wireless devices, personal digital assistances ("PDA"), laptops, electronic tablets, personal computers, evolution data optimized ("EVDO") cards, multi-mode devices, and/or other wireless devices and elements.

The portable torque measurement and notification system 100 may include various elements used for wireless and/or wired communication. Network 112 may include mobile switching centers ("MSCs"), local exchanges, networks, antennas or transmission towers, wireless devices, computers, personal computers, servers, computing devices, and wired communication devices for facilitating the transmission of data between computing devices 108, 110 and wireless device 106, in one embodiment.

In one embodiment, computing devices 108, 110 and wireless device 106 may communicate using wireless communications including satellite connections or hardwired connections, such as fiber optics, T1, cable, DSL, high speed trunks, and telephone lines. In one aspect, any number and location of computing devices 108, 110 and wireless device 106 may exist. Further, computing devices 108, 110 and wireless device 106 may communicate with transmission towers using any communications standards, such as time division multiple access ("TDMA"), code division multiple access ("CDMA"), global systems for mobile ("GSM") communications, personal communications systems ("PCS"), wireless local area network ("WLAN"), worldwide interoperability for microwave access ("WiMAX"), or other frequently used cellular and data communications standards and standards.

Network 112 may be any number or combination of networks including wireless networks, data or packet networks, private networks, publicly switched telephone networks ("PSTN"), and/or wired networks. Network 112 of portable torque measurement and notification system 100 may represent a single communication service provider or multiple communications services providers. Network 112 may include any number of systems, towers, servers, and other network and communications devices for implementing the features and performing the methods herein described.

The network 112 may be the Internet, intranet, wide area networks ("WANs"), local area networks ("LANs"), or other communication systems capable of communicating information between computing devices 108, 110 and wireless device 106. Computing devices 108, 110 and wireless device 106 may communicate data packets containing information related to any of the operations of torque applying devices 102, 300, 400, 450 to another computing devices 108, 110, as understood in the art.

Even though FIG. 1 depicts several computing devices 108, 110 and a wireless device 106, it should be understood by those skilled in the art that portable torque measurement and notification system 100 may include any number and type of computing devices 108, 110 and wireless devices 106 without departing from the principles of the present invention.

Referring now to FIG. 6, an electronic schematic diagram of circuitry of an exemplary PCB of torque applying devices 102, 300, 400, 450 is schematically illustrated and generally designated 600. PCB 600 is in communication with strain gages 228, 230 and they may be hard-wired to a strain gage input 601 of PCB 600. In one embodiment, strain gage input 601 is the strain gage input that connects strain gages 228, 230 in a full bridge bending strain configuration. Preferably, two parts are used to form a full bridge. Additionally, PCB 600 may include another set of strain gage inputs 602 that may be used with additional strain gages.

PCB 600 may include a radio frequency ("RF") filter 604 that provides RF filtering prior to sensor signal amplifiers 606, 608. In one embodiment, PCB 600 may further include a capacitor 610 for providing noise filtering. The amplified voltage of sensor signal amplifier 606 is measured by a microcontroller module 612 to obtain a strain reading of torque applying devices 102, 300, 400, 450. In one embodiment, microcontroller module 612 is manufactured by Netburner having part number MOD5213, which is a microcontroller module based on the Freescale MCF5213 ColdFire integrated microcontroller. Microcontroller module 612 may be primary microcontroller of torque applying devices 102, 300, 400, 450 and is responsible for all onboard computation not provided in another subsystem of portable torque measurement and notification system 100.

Sensor signal amplifiers 606, 608 are digitally programmable and are under the control of microcontroller module 612 to compensate for physical properties of torque applying devices 102, 300, 400, 450, including strain/torque relationship, and manufacturing variation. In one embodiment, sensor signal amplifiers 606, 608 are manufactured by Analog Devices having a part number AD8555. PCB 600 may further include voltage dividers 614 that sample the voltage from batteries 226 for measurement by microcontroller module 612. PCB 600 further includes an analog temperature sensor 616 that produces a temperature proportional voltage for measurement by microcontroller module 612. In one embodiment, analog temperature sensor 616 is manufactured by Texas Instruments having part number LM94021.

PCB 600 may also include a battery input connection 618 for connecting with the power output of power unit 224 and/or batteries 226. PCB 600 may further include a diode 620 that provides reverse voltage protection in case batteries 226 are inserted backward into 224. Preferably, a light emitting diode ("LED") 622 is disposed on PCB 600 for reducing the voltage from batteries 226 to a value that is safe to power a voltage regulator 626. Preferably, voltage regulator 626 and capacitors 624 provide a 3.3 volt power supply for the analog subsystem. The power supply is switched on and off under control of microcontroller module 612. A resistor 627 ensures that voltage regulator 626 will shut down when microcontroller module 612 is powered off. A connector 629 and resistor 631 provide access to the diagnostic serial port of microcontroller module 612.

PCB 600 may further include a power supply 630 and capacitors 628 that provide substantially 3.3 volts of regulated power for the digital (primary) subsystem consisting of microcontroller module 612 and a wireless module 642, as discussed further below. In one embodiment, power supply 630 is manufactured by Linear Technology having part number LT1965. Power supply 630 is switched on and off under control of a microcontroller 632, which controls the power on/off state of the primary system (i.e. microcontroller module 612). It receives unregulated battery power through diode 620 and LED 622 such that it is operating at all times when battery power is present. When torque applying devices 102, 300, 400, 450 are in the power off state, microcontroller 632 monitors the state of a power switch 634. When microcontroller 632 senses any change in the state of power switch 634, either opening or closing, it will enable power supply 630, which will power up microcontroller module 612. Microcontroller 632 will hold the power on for several seconds without responding to any input. This permits microcontroller module 612 to complete its boot sequence and begin normal operation, in one embodiment.

After the initial on-time has elapsed, microcontroller 632 monitors a signal received from microcontroller module 612. When the signal goes low (a power off command from microcontroller module 612 to microcontroller 632), microcontroller 632 will signal power supply 630 to power down, removing power to microcontroller module 612 and placing torque applying devices 102, 300, 400, 450 into the power off state.

Preferably, power switch 634 and resistor 636 form the power on switch network. In one embodiment, power switch 634 is a magnetic reed switch manufactured by Cherry having part number MP201701. When power switch 634 is in the open state, resistor 636 provides a logic high signal to microcontroller 632, signaling to microcontroller 632 that power switch 634 is open. When power switch 634 is closed, the signal provided to microcontroller 632 by resistor 636 is pulled to a logic low value by grounding the signal through power switch 634. Microcontroller 632 can then sense the closed state of power switch 634. Resistor 636 has a large value such that battery drain is minimized should power switch 634 remain in the closed state for an extended period. Torque applying devices 102, 300, 400, 450 are powered on by any change in the state of power switch 634, in one embodiment.

A user may use a magnet on the outside of housing 218 to engage power switch 634. In one embodiment, a magnet may be stored in a recess drilled into housing 218 of torque applying devices 102, 300, 400, 450 where it can cause power switch 634 to close. To power the torque applying devices 102, 300, 400, 450 on, the magnet is removed from the recess by hand causing the state of power switch 634 to change and the wrench to power on. The magnet is then returned to the recess for storage (where it is held in place by magnetic force). At this time power switch 634 will close again, but microcontroller 632 will not respond to changes in power switch 634 until it has returned to the off state at the direction of 612. At that time, the state of power switch 634 is ignored but any subsequent change in the state of power switch 634 will cause a power on transition.

Analog power from voltage regulator 626 is controlled at the discretion of firmware embedded in microcontroller module 612. This permits the analog subsystem to be shutdown independent of the primary digital systems to conserve power. PCB 600 may further include a LED 638 for providing power on indication under the control of microcontroller 632. Additionally, PCB 600 may include a integrated circuit serial programming connector 640 that provides in-circuit programmability for microcontroller 632. This permits the firmware for microcontroller 632 to be downloaded into microcontroller 632. PCB 600 may further include wireless module 642. In one embodiment, 642 is a Bluetooth wireless module manufactured by Parani having part number ESD200. Wireless module 642 implements the Bluetooth Serial Port Profile ("SPP") such that microcontroller module 612 can communicate with wireless module 642 using a standard universal asynchronous receiver/transmitter ("UART") serial interface. Firmware embedded in microcontroller module 612 controls and configures the operation of wireless module 642, but the implementation of the Bluetooth standard is contained entirely within wireless module 642, in one embodiment.

In one embodiment, strain gage input 602 may be used by the PCB layout software to reserve two through hole positions on the PCB 600 where strain gage shield wires anchor and connect to ground.

Turning now to FIG. 7, an exemplary database of computing devices 108, 110 and wireless device 106 is schematically illustrated and generally designated 700. Database 700 may include a plurality of fields for inputting and storing data transmitted from torque applying devices 102, 300, 400, 450. For example, database 700 may include a plurality of rows 722a-722n for inputting data from torque applying devices 102, 300, 400, 450 during a particular operation. Each of rows 722a-722n may input and store data for a different operation of torque applying devices 102, 300, 400, 450. In addition, database 700 may include a plurality of fields for inputting and storing data for each of these operations, such as a date field 702, time field 704, job field 706, operator field 708, temperature field 710, voltage field 712, coiled tubing tool field 714, outer diameter field 716, target torque value field 718, and peak torque measurement field 720, for example.

In one embodiment, one of rows 722a-722n may correspond to a particular use or operation of torque applying devices 102, 300, 400, 450. For example, row 722a shows a particular date and time in date field 702 and time field 704 relating to a particular use of torque applying devices 102, 300, 400, 450. Additionally, it may show a particular job site or location information in job field 706. Further, it may show a particular operator, by name or some other identifier, in operator field 708 that operated torque applying devices 102, 300, 400, 450 at that date, time, and location. Similarly, data and information relating to environmental temperature may be inputted and stored in temperature field 710. Also, the voltage provided by power unit 224 and/or batteries 226 may be inputted and stored in voltage field 712. The particular information relating to which tubular member and/or tool that was being torqued during that time and date of the operation may be inputted and stored in coiled tubing tool field 714. Outer diameter field 716 may be used to input and store information relating to the outer diameter of the tubular member that torque applying devices 102, 300, 400, 450 was engaged with for purposes of calibration and the like may be inputted and stored in outer diameter field 716. The set target torque value for that particular joint between the tubular members may be inputted and stored in target torque value field 718. Further, the peak torque measurement provided by torque applying devices 102, 300, 400, 450 during that particular operation may be inputted and stored in peak torque measurement field 720. In addition to the fields shown, database 700 may include any number of other fields and data that relate to a particular operation of torque applying devices 102, 300, 400, 450.

Figure 8:
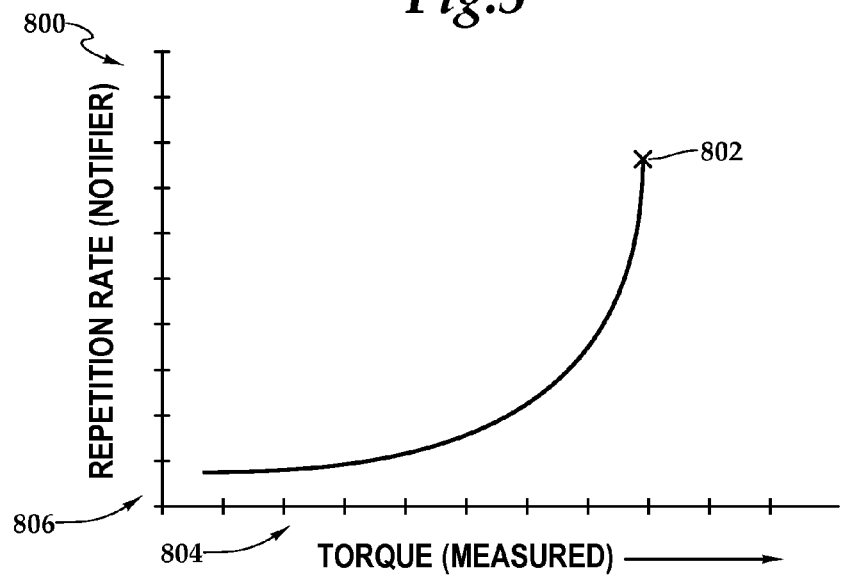
FIG. 8 is a graphical illustration of varying repetition rates of notifiers as a function of proximity of actual torque measurement to target torque value of portable torque measurement and notification system according to an embodiment.

Referring now to FIG. 8, a graphical illustration of the repetition rate of tones generated by wireless device 106 is schematically illustrated and generally designated 800. A data curve is shown that may generally represent in one embodiment of wireless device 106 generating repetition rates for notifiers. A target torque value 802 is determined and as the current torque measurement 804 approaches target torque value 802, the frequency of the repetition rates for the notifiers 806 is increased notifying user 114 that the target torque value 802 is being approached and/or reached.

Target torque value 802 may be any torque value and may be entered by user 114, and or programmed into computing devices 108, 110, and/or wireless device 106. The algorithm for producing the data curve may be any desired algorithm such that it produces a different repetition rate of the notifier to quickly and conveniently notify user 114 that the torque applied to torque applying devices 102, 300, 400, 450 is approaching or has reached target torque value 802 without user 114 having to guess how close the applied torque is to target torque value 802. The shape of the data curve is exemplary, and it may be any shape desired by a user 114 and/or operator of portable torque measurement and notification system 100.

Figure 9:
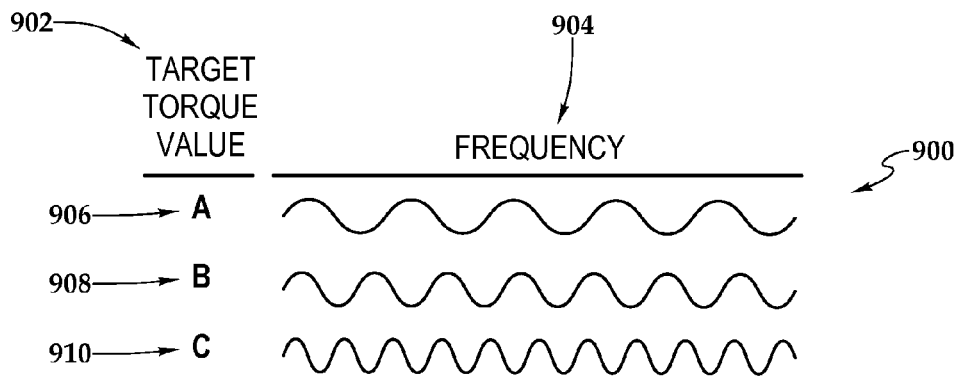
FIG. 9 is an illustration of varying wavelength frequencies of notifiers according to an embodiment.
Figure 10:
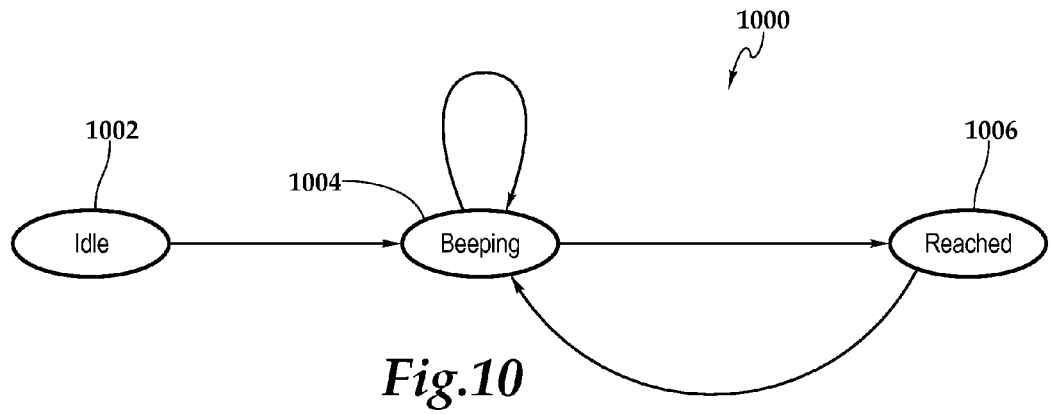
FIG. 10 is an illustration of a process for generating varying repetition rates for notifiers of portable torque measurement and notification system according to an embodiment.

Now turning to FIG. 9, an exemplary illustration an different wavelength frequencies of notifiers corresponding to different target torque values is schematically illustrated and generally designated 900. Portable torque measurement and notification system 100 may provide for using different notifiers (tactile, aural, audible, visual, etc.) that may correspond to different target torque values for providing quick and convenient notifiers to user 114 to alert them that a different target torque value has been set for a particular tubular member, tool, and/or joint 122 in a string of tubular members, for example. For example, should a particular tool or tubing string require one or more different target torque values for making up the tool string, portable torque measurement and notification system 100 may provide a different notifier to user 114 so that they are aware of the different target torque values set. FIG. 10 further provides additional description regarding repetition rates of notifiers.

Figure 11:
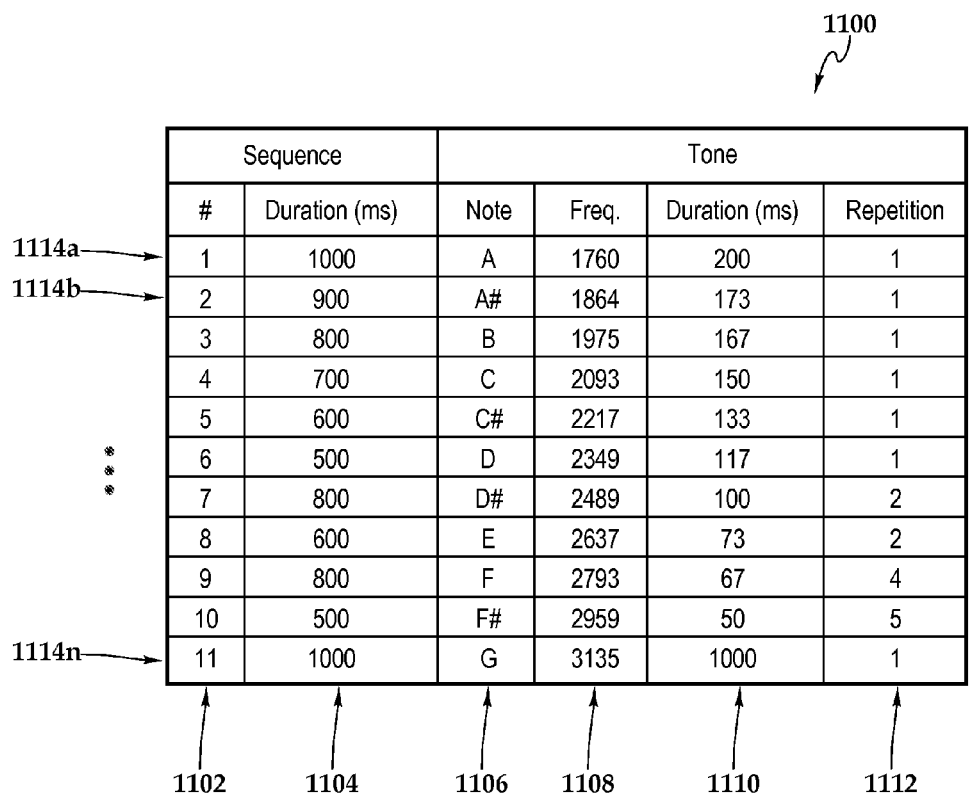
FIG. 11 is exemplary tabular representation of different tones and repetition rates of notifiers of portable torque measurement and notification system according to an embodiment.

For example, target torque value 902 "A" may have a value of 500 ft·lb that will have a corresponding notifier, such as an audible tone having a longer wavelength frequency for producing a lower tone or pitch to user 114. In so doing, user 114 understands that the lower tone or pitch of the notifier is associated with a lower target torque value. Additionally, target torque value 902 "B" may have a value of 750 ft·lb that will have a corresponding notifier, such as an audible tone having a shorter wavelength frequency for producing a slightly higher tone or pitch to differentiate it from target torque value 902 "A." In addition, target torque value 902 "C" may have a value of 900 ft·lb that will have a corresponding notifier, such as an audible tone having an even shorter wavelength frequency for producing a even higher tone or pitch to differentiate it from target torque value 902 "A" and "B." FIG. 11 provides additional description regarding notifier tones and/or pitches.

Portable torque measurement and notification system 100 may also provide a series of different tones at increasing repetition rates at different torque values less than the target torque value. For example, portable torque measurement and notification system 100 may provide a notifier at a first tone (vibration, visual, etc.) having an increasing repetition rate that is set to a first torque value, another notifier having a different tone (vibration, visual, etc.) having an increasing repetition rate that is set to a second torque value, and yet another notifier having yet another different tone (vibration, visual, etc.) having an increasing repetition rate that is set to a third torque value.

In this example, the final target torque value may be 1,500 ft·lb, but user 114 desires to be notified when the measured torque applied by torque applying device 102 has reached certain values less than the target torque value, such as at 500 ft·lb, 1,000 ft·lb, and then the target torque value of 1,500 ft, for example. Portable torque measurement and notification system 100 may provide a corresponding notifier, such as an audible tone having a first wavelength frequency (longer/shorter) for producing a lower tone or pitch to user 114. As the measured torque value goes from 0-500 ft·lb the repetition rate of the notifier increases as the measured torque value approaches 500 ft·lb, the repetition rate increase substantially finally ending in a constant tone at a particular wavelength frequency.

Next, as the measured torque value goes to 501 ft·lb a second tone having a different wavelength frequency than the first tone is presented to user 114 at a low repetition rate and as the measured torque value increases towards 999 ft·lb the repetition rate of the second tone increases accordingly. Once the 1,000 ft·lb is reached the second tone may be presented to user 114 as a constant tone, and not a beeping tone. Then as the measured torque value goes to 1,001 a third tone having yet a different wavelength frequency that the first and second tone is presented to user 114 at a low repetition rate and as the measured torque value increases towards 1,500 ft·lb the repetition rate of the third tone increases accordingly, finally ending with a constant tone once the target torque value of 1,500 ft·lb is reached.

In so doing, user 114 understands that the lower tone or pitch of the notifier is associated with a lower target torque value. Additionally, target torque value 902 "B" may have a value of 750 ft·lb that will have a corresponding notifier, such as an audible tone having a shorter wavelength frequency for producing a slightly higher tone or pitch to differentiate it from target torque value 902 "A." In addition, target torque value 902 "C" may have a value of 900 ft·lb that will have a corresponding notifier, such as an audible tone having an even shorter wavelength frequency for producing a even higher tone or pitch to differentiate it from target torque value 902 "A" and "B." FIG. 11 provides additional description regarding notifier tones and/or pitches.

Turning now to FIG. 10, an exemplary illustration an different wavelength frequencies of notifiers corresponding to different target torque values is schematically illustrated and generally designated 1000. Portable torque measurement and notification system 100 may or may not produce a notifier when torque applying devices 102, 300, 400, 450 is idle tone 1002. Once user 114 begins using torque applying devices 102, 300, 400, 450 portable torque measurement and notification system 100 determines that torque applying devices 102, 300, 400, 450 is being operated and may generate an initial repetition tone 1004. Portable torque measurement and notification system 100 may also generate a different notifier corresponding to a target torque value tone 1006 to notify user 114 that the target torque value has been reached. Between initial tone 1004 and target torque value tone 1006, portable torque measurement and notification system 100 may increase linearly and/or non-linearly a repetition rate for notifiers to notify user 114 that the measure torque value of torque applying devices 102, 300, 400, 450 is approaching the set target torque value.

Referring now to FIG. 11, an exemplary illustration an different wavelength frequencies of notifiers corresponding to the proximity of the actual torque measurement to a set target torque value is schematically illustrated and generally designated 1100. Portable torque measurement and notification system 100 may use a plurality of different notifiers, such as tones 1114a-1114n, to notify user 114 of the proximity of the measured torque value to the set target torque value. For example, a notifier 1114a having idle tone 1002 may have a particular sequence number 1102, duration 1104, such as 1000 milliseconds. It may also have corresponding individual tone characteristics, such as a corresponding musical note 1106 ("A"), a particular wavelength frequency 1108 (1760 Hz), a particular duration 1110 (200 milliseconds), and a particular repetition rate 1112(1).

In one embodiment, portable torque measurement and notification system 100 may include algorithms for determining which notifier to generate and its repetition rate. For example, portable torque measurement and notification system 100 plays notifiers that give an indication of the difference between the current torque measurements and target torque values. In one aspect, when the difference between the two is larger, tones, or any other notifier, may be lower in pitch, longer in duration, and are repeated less frequently. Conversely, when the difference between the two is smaller, tones may be higher in pitch, shorter in duration, and are repeated more often. FIG. 11 depicts an exemplary eleven combinations of pitch, duration, and repetition rate used to indicate the difference between the actual torque measurement to the target torque value.

In one embodiment, portable torque measurement and notification system 100 may have three states related to tone generation, idle tone 1002, initial repetition tone 1004, and target torque value tone 1006, as discussed above. The eleven music scale tones shown in FIG. 11 represent eleven consecutive tones from the chromatic music scale. A long series of identical tones is created by playing the same tone repeatedly; portable torque measurement and notification system 100 can then schedule the next tone sequence. In one embodiment, tone sequences may be selected for playback according to the formula: t=1; if T≥500 and t=10−[T/50]; if 0<T<500; where t is the tone sequence number that will be played, and T is the actual torque differential between target torque value and current torque measurement ($T = T_{target} - T_{actual}$). This formula provides operator feedback over a 500 ft·lb range with 50 ft·lb resolution.

Notifiers may be any type feedback and/or notifier such as aural, audible, vibratory, tactile, visual, and the like. The repetition rates and other characteristics described above applies as possible to all of these different notifier types. For example, as discussed above relating to an aural notifier, the repetition rates may apply to a tactile, vibratory, and/or visual notifier such that they emit their notification characteristics under the same or similar repetition rate, etc. schemes.

In one embodiment, torque applying devices 102, 300, 400, 450 may be calibrated initially prior to its first use, and in another embodiment, torque applying devices 102, 300, 400, 450 may be calibrated in the field, shop, and any time after its first use. Calibration of torque applying devices 102, 300, 400, 450 should allow for the use of as much of sensor signal amplifier 606 converter range as possible considering the measurement range of torque applying devices 102, 300, 400, 450 and the need for headroom to permit the detection of over-range and under-range conditions. Calibration must accommodate for the possibility of positive apparent strain at zero torque. This apparent strain can prevent the desired lower limit of sensor signal amplifier 606 range from being reached. Consequently, the usable range of the A/D converter is reduced. Small and negative apparent strain can be offset by sensor signal amplifier 606 offset adjustment, in one embodiment.

Calibration of sensor signal amplifier 606 requires the selection of gain and offset values that satisfy generally the following conditions: $70 \leq G \leq 1280$; $0 \leq O \leq 4080$; $A_{min} \leq A \leq A_{max}$; where T=torque applied to torque applying devices 102, 300, 400, 450; $T_{max}$=maximum torque range of torque applying devices 102, 300, 400, 450; A=sensor signal amplifier 606 measurement (0-4095); $A_0$=sensor signal amplifier 606 measurement at T=$T_0$, G=$G_0$, O=0, $A_{min}$=preferred minimum (zero torque) sensor signal amplifier 606 measurement (typ. 100); Actual zero torque A may be higher if apparent strain at zero torque yields values higher than $A_{min}$. $A_{max}$=preferred maximum torque sensor signal amplifier 606 measurement (typ. 4000); G=sensor signal amplifier 606 gain (70≤G≤1280); $G_0$=minimum sensor signal amplifier 606 gain (70); O=sensor signal amplifier 606 offset (0≤O≤255); $O_1$=sensor signal amplifier 606 offset (0≤$O_1$≤255) that provides the desired zero strain A value at $G_0$.

In one embodiment, the calibration algorithm may be as follows. Step 1: Determine $O_1$=O at T=0 and G=$G_0$ such that A=$A_{min}$ or O=0, which ever value of O is higher (i.e. $O_1$ cannot be negative). Step 2: Measure $Z_0$=A at G=$G_0$, T=0, and O=$O_1$. Step 3: Determine $G_1$=G at T=$T_{max}$ and O=$O_0$ such that A=$A_{max}$. Step 4: Compute $Z_1$=($Z_0$−16·$O_1$)$G_1$/$G_0$. This is the zero torque value of A at O=$O_1$ and G=$G_1$. Step 5: Compute $R_0$=$A_{max}$−$Z_1$. This is the range of A as T ranges from 0 to $T_{max}$. Step 6: Compute $G_2$=($A_{max}$−$A_{min}$)/$R_0$·$G_1$. This is the gain that will normalize the range of A.

Step 7: Compute $Z_2$=($Z_0$−16)·$O_1$) $G_2$/$G_0$. This is the zero torque value of A at O=$O_1$ and G=$G_2$. Step 8: Compute $O_2$=($A_{min}$−Z)/16. This is the offset to place zero torque in the desired location when G=$G_2$. Step 9: If $O_2$≥0 use $O_2$ and $G_2$ for calibration. Otherwise, continue with step 10. Step 10: Determine $G'_2$=G at T=$T_{max}$ and O=0 such that A=$A_{max}$. Step 11: Use gain $G'_2$ and offset 0 for calibration. The implementation of calibration step 1 requires that the value of $O_1$ be determined. Rather than attempt to compute this value directly, a search algorithm may be used to experimentally determine $O_1$ by taking measurements as O is adjusted over its range. Changing the value of O changes the parameters of the analog signal conditioning system. Some time may be needed to ensure that the data acquisition system reaches a stable state after each change to O.

This includes the digital filtering performed in software 504. Software filters may have a settling time on the order of 1 second, for example. Waiting for this period of time after each experimental test of O causes a very slow calibration sequence. To further speed the implementation of this step, the search algorithm is binary, such that the worst case performance requires approximately $\log_2(256)$ experimental evaluations of O.

The implementation of calibration step 3 may require the determination of gain $G_1$. Gain g2 may be a coarse gain adjustment that may be selected from a table stored in databases 512a, 512b, for example. Gain g1 may provide fine gain adjustment and can be computed from a formula using an exponential or by table lookup. The algorithm selected for this step begins by setting g1 to its minimum value of 4, for example. A binary search algorithm is used to experimentally determine the value of g2 (using values from a table in memory 506, storage 510 and/or databases 512a, 512b) that may provide the highest value of g2 such that A<$A_{max}$. With this value selected for g2, a second binary search algorithm experimentally determines the value of g1, selecting possible values from a table in memory. The value chosen for g1 is the largest value such that A≤$A_{max}$. As with step 1, software filters may be bypassed in this algorithm.

In one embodiment, an initial calibration may be performed prior to the first use of torque applying devices 102, 300, 400, 450. In this embodiment, torque applying devices 102, 300, 400, 450 are placed in a zero torque state. Next, an "offset" button or selection is displayed on wireless device 106 to user 114. Upon selecting the offset function, wireless device 106 performs steps 1 and 2 described above. Next, user 114 may apply maximum torque to torque applying devices 102, 300, 400, 450. Maximum torque may mean connecting torque applying devices 102, 300, 400, 450 to a known torque standard that may be set at the maximum torque of torque applying devices 102, 300, 400, 450 or some other torque standard that is less than the maximum torque value of torque applying devices 102, 300, 400, 450.

Next a "gain" button or selection is displayed to user 114. By selecting the gain button, the remaining calibration steps described above are performed by wireless device 106. After the initial front end calibration, the parameters needed to configure the analog signal conditioning system have been computed and stored in memory 506. In one aspect, the initial calibration does not need to be repeated unless the physical properties of the wrench have been altered, such as might be caused by over stress or over-torquing of torque applying devices 102, 300, 400, 450. In one aspect, after the initial calibration, a "zero" and "normal calibration" procedure, which do not change the parameters of the analog sub-system, may need to be performed after the initial calibration procedure described above.

In one embodiment, zeroing torque applying devices 102, 300, 400, 450 may be performed in the following manner. In doing so, they can be set to compensate for temperature and other short term errors. With the zero torque applied to torque applying devices 102, 300, 400, 450, wireless device 106 sends a command to torque applying devices 102, 300, 400, 450 that they be set to zero. Torque applying devices 102, 300, 400, 450 records the torque reading (with normal software filtering enabled) to non-volatile memory. This is the zero torque offset. All future torque readings will be adjusted by this amount.

In one embodiment, a later calibration, such as a fine or normal calibration may be performed on torque applying devices 102, 300, 400, 450 subsequent to the initial calibration operation. This later calibration operation may be performed to compensate for the effects of aging of torque applying devices 102, 300, 400, 450. Prior to performing this fine calibration, torque applying devices 102, 300, 400, 450 should be zeroed as described above prior to performing calibration. After it has been zeroed, a known torque, such as 800 ft·lb for example, is applied to torque applying devices 102, 300, 400, 450. Wireless device 106 commands or instructs torque applying devices 102, 300, 400, 450 to calibrate to this torque value. Strain gages 228, 230 are read normally (i.e. with software filtering enabled). Zero torque strain is subtracted from this measured torque value. In one embodiment, a scale factor may be computed by the formula: f=T/(S−z); where f is the scale factor, T is the applied torque, and S is the strain measurement from strain gages 228, 230 with the known torque applied to torque applying devices 102, 300, 400, 450, and z is the zero torque offset. f is stored in non-volatile storage. Future torque readings will be scaled by f.

For performing a calibrated torque computation, the following procedure may be used. The formula for computing torque using the calibration values here is: T=f(S−z); where T is the measured torque, S is the strain measurement, z is the zero torque offset, and f is the calibration factor.

Additional parameters and information relating to calibrating torque applying devices 102, 300, 400, 450 may also be inputted into portable torque measurement and notification system 100. For example, calibrating torque applying devices 102, 300, 400, 450 may require the outer diameter of the known torque standard that torque applying devices 102, 300, 400, 450 is engaged with during calibration for further refining the calibration of torque applying devices 102, 300, 400, 450. In one embodiment, user 114 may enter the outer diameter value into portable torque measurement and notification system 100. In another embodiment, jaw distance sensor 338 may determine the distance between upper jaw 202 and lower jaw that would correspond to the outer diameter of the known torque standard.

Additionally, voltage sensitivity or calibration may also need to be taken into account when calibrating torque applying devices 102, 300, 400, 450. Voltage reading from power unit 224 and/or batteries 226 may be transmitted to wireless device 106 for determining further calibration compensation, that may then be transmitted back to torque applying devices 102, 300, 400, 450 for computing when computing torque measurements of torque applying devices 102, 300, 400, 450 prior to transmitting them to wireless device 106.

Turning now to FIGS. 12-27, they include many different exemplary screen shots of GUIs (corresponding GUIs 1200-2700) that may be displayed to user 114 during operation of portable torque measurement and notification system 100. Some or all of these GUIs may or may not be presented to a particular user 114 depending on the operation of torque applying devices 102, 300, 400, 450 and/or wireless device 106. GUI 1200 may be displayed on one or more of wireless device 106 and computing devices 108, 110, for example. It may display a startup screen 1202 for use by user 114. It may also display a connect button 1204 for operating by user 114 to start a scanning and pairing operation for available torque applying devices 102, 300, 400, 450. GUI 1200 may be displayed by a user seals 114 selecting an application start button or selection displayed on wireless device 106.

Figures 12, 13, 14, 15:
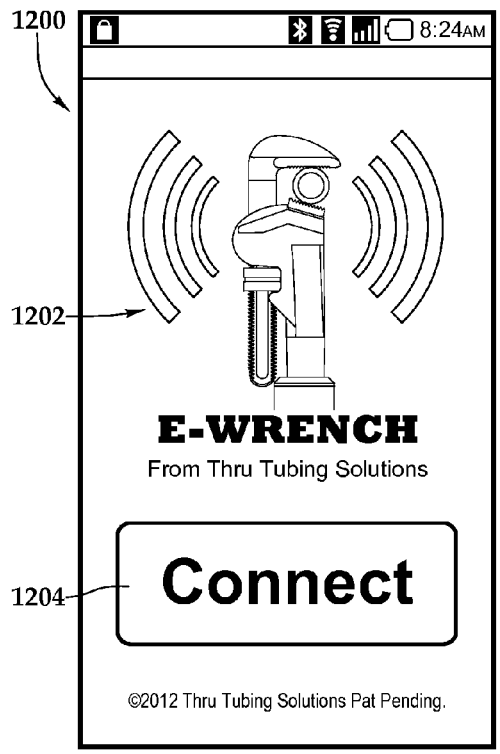
FIG. 12 is an exemplary screenshot of a graphical user interface ("GUI") for displaying wireless device startup functionality of portable torque measurement and notification system according to an embodiment.
FIG. 13 is an exemplary screen shot of a GUI for displaying scanning activity between a wireless device and a torque applying device of portable torque measurement and notification system according to an embodiment.
FIG. 14 is an exemplary screenshot of a GUI for displaying available torque applying devices of portable torque measurement and notification system according to an embodiment.
FIG. 15 is an exemplary screenshot of a GUI for displaying initial torque applying device calibration functionality of portable torque measurement and notification system according to an embodiment.
Figure 16:
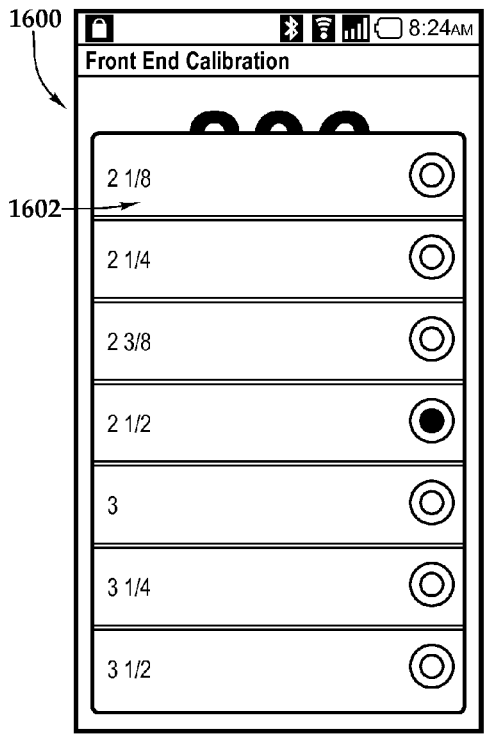
FIG. 16 is another exemplary screenshot of a GUI for displaying initial torque applying device calibration functionality of portable torque measurement and notification system according to an embodiment.
Figure 17:
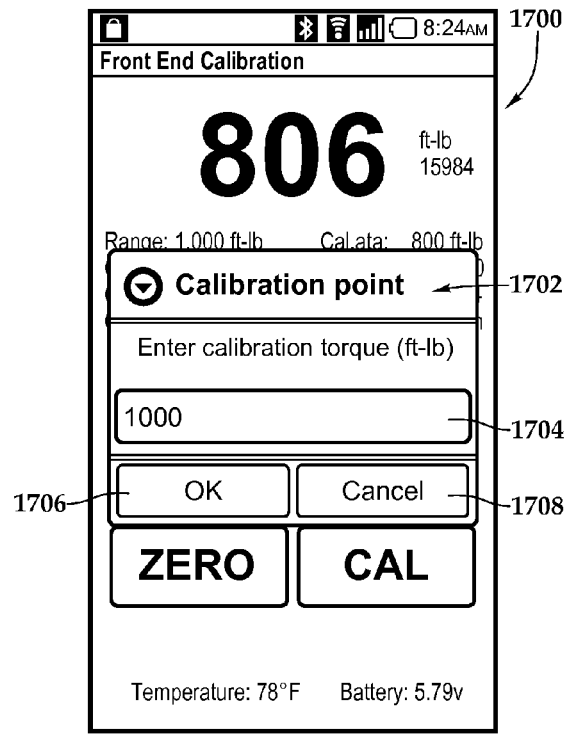
FIG. 17 is another exemplary screenshot of a GUI for displaying initial torque applying device calibration functionality of portable torque measurement and notification system according to an embodiment.
Figure 21:
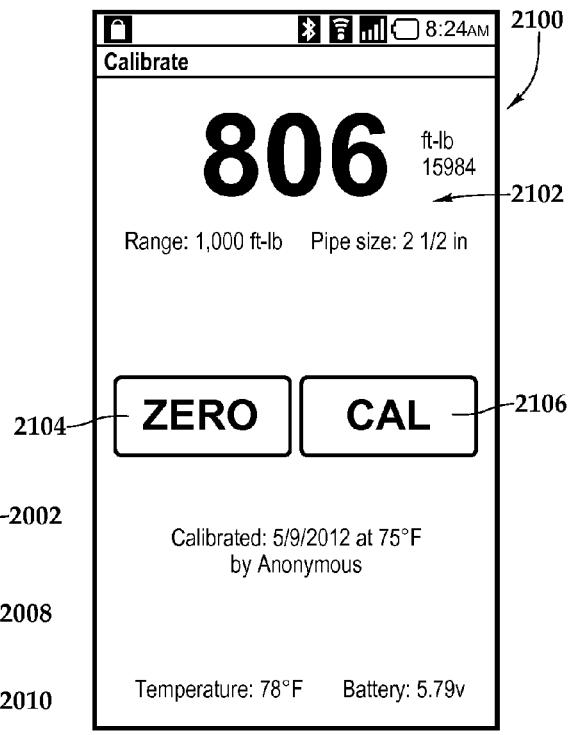
FIG. 21 is an exemplary screenshot of a GUI for displaying torque applying device calibration functionality of portable torque measurement and notification system according to an embodiment.
Figure 22:
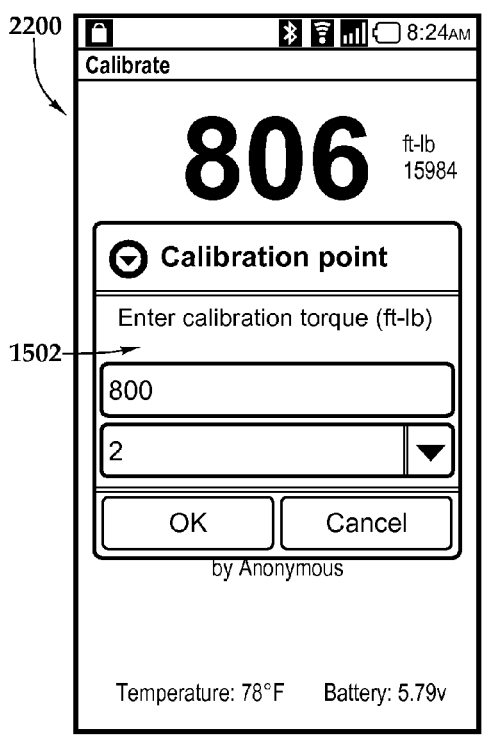
FIG. 22 is another exemplary screenshot of a GUI for displaying torque applying device calibration functionality of portable torque measurement and notification system according to an embodiment.
Figure 23:
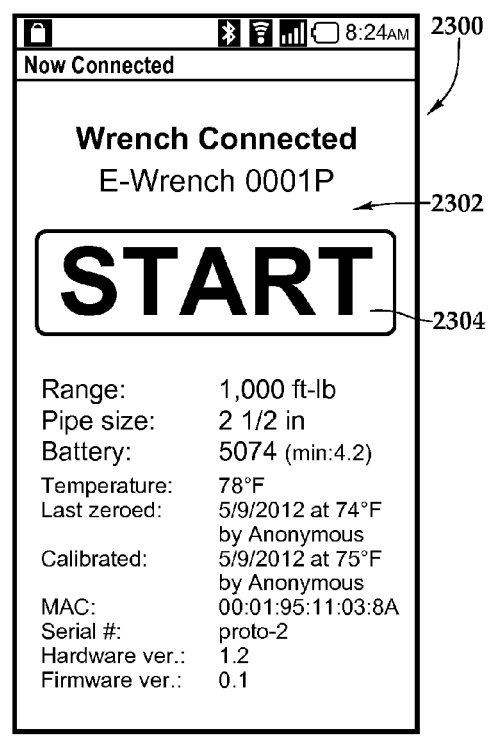
FIG. 23 is an exemplary screenshot of a GUI for displaying torque applying device operation of portable torque measurement and notification system according to an embodiment.
Figure 24:
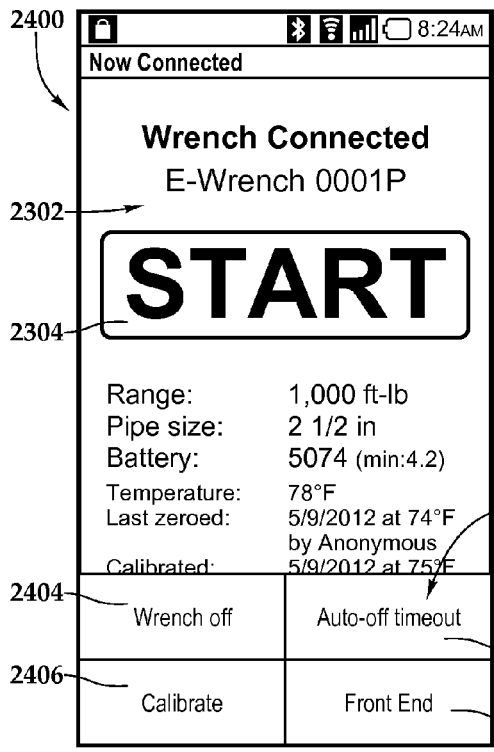
FIG. 24 is another exemplary screenshot of a GUI for displaying torque applying device operation of portable torque measurement and notification system according to an embodiment.
Figure 25:
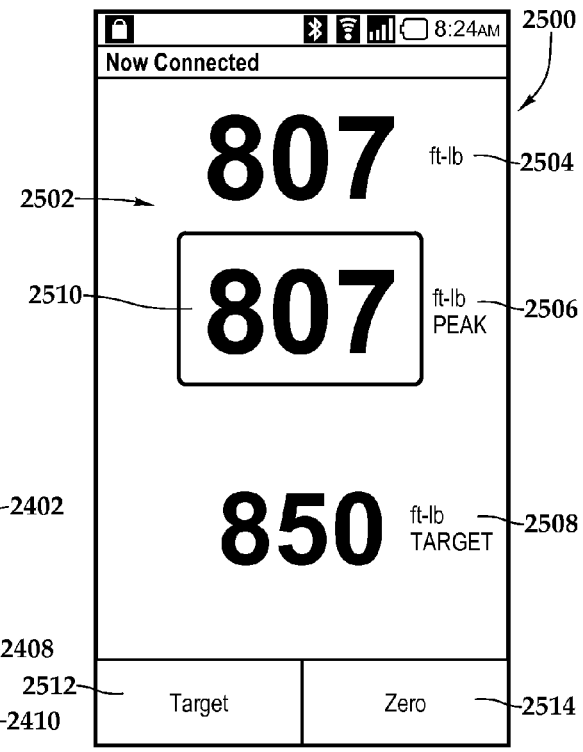
FIG. 25 is another exemplary screenshot of a GUI for displaying torque applying device operation of portable torque measurement and notification system according to an embodiment.
Figure 26:
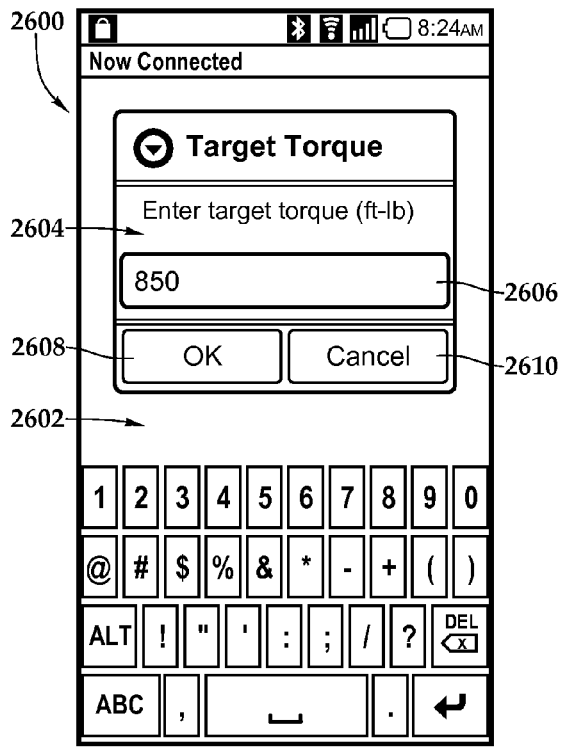
FIG. 26 is another exemplary screenshot of a GUI for displaying torque applying device operation of portable torque measurement and notification system according to an embodiment.

Referring now to FIG. 13, an exemplary screenshot of a GUI for displaying scanning operations of portable torque measurement and notification system is schematically illustrated and generally designated 1300. GUI 1300 may display a scanning status 1302 and a torque applying device paired status 1304 to user 114. Torque applying device paired status 1304 displays a preferable torque applying devices 102, 300, 400, 450 for communicating with wireless device 106. GUI 1300 may be displayed by selecting button 1204. GUI 1400 of FIG. 14 may also be displayed to user 114 that may display 1402 those torque applying devices 102, 300, 400, 450 that were found and paired. Additionally, GUI 1400 may display any other found torque applying devices 102, 300, 400, 450 in portion 1404 of GUI 1400, in one aspect. In one embodiment, GUI 1400 may be displayed automatically after GUI finishes searching and pairing with torque applying devices 102, 300, 400, 450. GUI 1500 displays a calibration point menu 1502 for entering a calibration torque value in field 1504. This value may be entered via a virtual keyboard displayed to user 114 or it may be entered by clicking on a drop down menu that list several different calibration torque values. An alternative to displaying a virtual keyboard, wireless device 106 may display a touch-screen wheel similar to many popular MP3 music players may be used to adjust the target torque value to the desired target value. GUI 1500 may be displayed to user 114 by selecting Cal button 1810 (FIG. 18) and/or Cal button 2106 (FIG. 21).

Calibration point menu 1502 may also include an outer diameter field 1506 for entering the outer diameter of the known torque standard for calibrating torque applying devices 102, 300, 400, 450. Calibration point menu 1502 may further include a "OK" button or selection 1508 for accepting the displayed target torque value and outer diameter displayed in calibration point menu 1502. Calibration point menu 1502 may also include a "Cancel" button or selection 1510 if user 114 desires to cancel calibration point menu functionality.

GUI 1600 may display a list of different outer diameter sizes 1602 for the known calibration standard that may be displayed when target torque value field 1504 may been selected. User 114 may selected any of the displayed outer diameter sizes by clicking in one of the button shown to the right of each size, in one embodiment. In one aspect, once a particular outer diameter size has been selected by user 114, outer diameter sizes 1602 may close and the GUI may return to GUI 1500, for example. In one embodiment, GUI 1600 may be displayed to user 114 by selecting an outer diameter size in the outer diameter field 1506.

Figure 18:
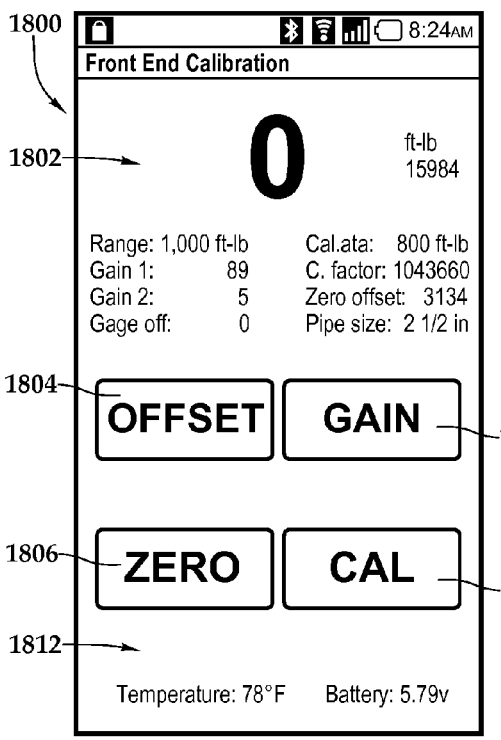
FIG. 18 is another exemplary screenshot of a GUI for displaying initial torque applying device calibration functionality of portable torque measurement and notification system according to an embodiment.
Figure 19:
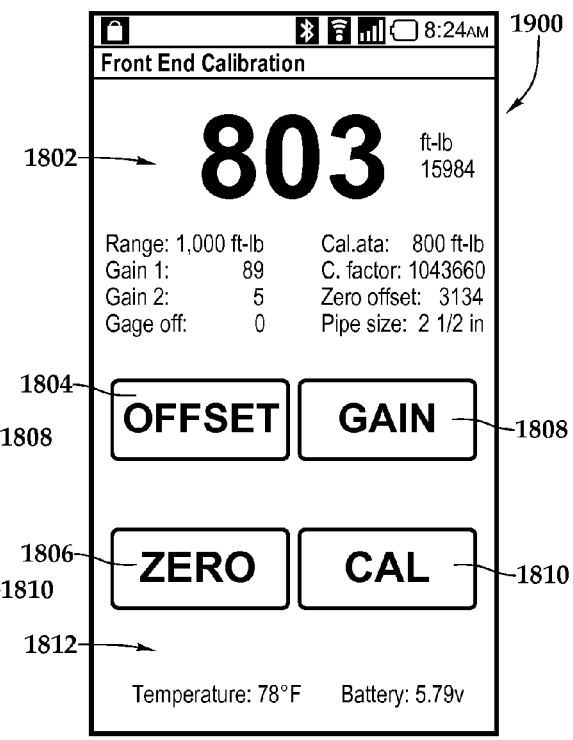
FIG. 19 is another exemplary screenshot of a GUI for displaying initial torque applying device calibration functionality of portable torque measurement and notification system according to an embodiment.
Figure 20:
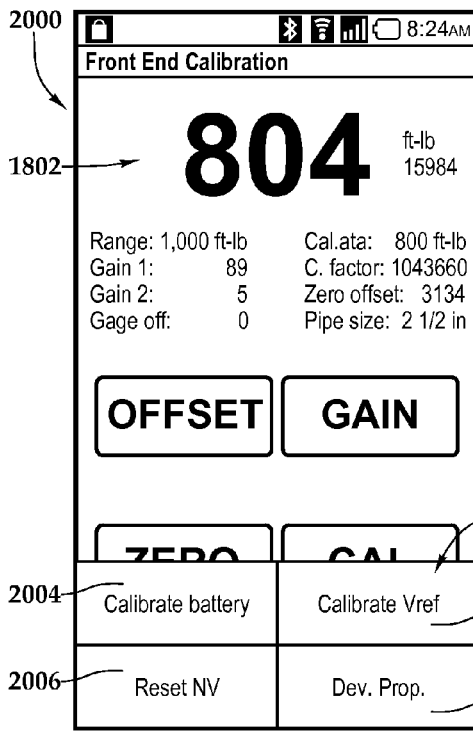
FIG. 20 is another exemplary screenshot of a GUI for displaying initial torque applying device calibration functionality of portable torque measurement and notification system according to an embodiment.

GUI 1700 may display a field for entering the calibration torque value 1702 that may be displayed in response to selecting Gain button 1808 (FIG. 18). A calibration torque value may be inputted in field 1704 with a virtual keyboard displayed to user 114 or by a drop down menu as is commonly known to those skilled in the art. Calibration point menu 1702 may further include a "OK" button or selection 1706 for accepting the displayed target torque value and outer diameter displayed in calibration point menu 1702. Calibration point menu 1702 may also include a "Cancel" button or selection 1710 if user 114 desires to cancel calibration point menu functionality. GUI 1700 may be displayed to user 114 by selecting Gain button 1808 (FIG. 18), in one example.

GUIs 1800 and 1900 displays a display screen 1802 that may include information or data relating to actual torque measurement, range ft-lb, gain 1, gain 2, gage off, cal. ata, zero offset, pipe size, etc. Additionally, they may include an "Offset" button 1804, "Zero" button 1806, "Gain" button 1808, and a calibration "Cal" button 1810. By selecting Offset button 1804 an offset function relating to calibrating torque applying devices 102, 300, 400, 450 as described herein may be performed. Similarly, by selecting Zero button 1806 a zero function relating to calibrating torque applying devices 102, 300, 400, 450 as described herein may be performed. Also, by selecting Gain button 1808 a gain may be determined at a particular torque for calibrating torque applying devices 102, 300, 400, 450 as described herein. GUIs 1800 and 1900 may be displayed to user 114 by selecting Front end button 2410 (FIG. 24), in one example.

GUI 2000 may be displayed when a menu button on wireless device 106 is selected by user 114. In another aspect, GUI 1800 may be displayed by selecting a menu button on GUI 1800. GUI 2000 may include a menu 2002 of functions relating to calibrating torque applying devices 102, 300, 400, 450. For example, menu 2002 may display a "Calibrate battery" button 2004, "Reset NV" button 2006, "Calibrate Vref" button 2008, and a "Dev Prop" button 2010.

GUI 2100 displays a display 2102 that may include a current torque measurement or calibration torque measurement. Additionally, GUI 2100 may include a "Zero" button 2104 and a "Cal" button 2106. By selecting Zero button 1806 a zero function relating to calibrating torque applying devices 102, 300, 400, 450 as described herein may be performed. By selecting Cal button 2106 a calibration function or display relating to calibrating torque applying devices 102, 300, 400, 450 as described herein may be performed or displayed. This particular calibration may be related to the normal or fine calibration operations and not the initial calibration operations as described herein. In one example, GUI 2100 may be displayed to user 114 when the Calibrate button 2406 (FIG. 24) is selected.

GUI 2200 may be displayed when the Cal button 2106 is selected by user 114. Part of the GUI 2200 display may also include calibration point menu 1502 for entering calibration torque values and outer diameter sizes. After torque applying devices 102, 300, 400, 450 has been calibrated, user 114 may be displayed a torque measurement home GUI 2300. GUI 2300 may display a home page display 2302 including information or data relating to type of torque applying devices 102, 300, 400, 450, range, pipe size, battery, temperature, last zeroed, calibrated, media access control ("MAC") address, serial number, hardware version, and firmware version, for example. Additionally, GUI 2300 may display a "Start" button 2304 for starting the torque measurement and notification process with torque applying devices 102, 300, 400, 450. In one example, GUI 2200 may be displayed to user 114 by selecting Cal button 1810 and/or Cal button 2106. In one instance, GUI 2300 may be displayed to user 114 by selecting "wrench" from the list displayed on torque applying device paired status 1304.

GUI 2400 may display a menu 2402 that may include a "Wrench off" button 2404, "Calibrate" button 2406, "Auto-off timeout" button 2408, and "Front end" button 2410 for presenting additional functions and operations to user 114. By selecting Wrench off button 2404 user 114 may turn off torque applying devices 102, 300, 400, 450 manually without waiting on the auto-off timeout function to operate. By selecting Calibrate button 2406 user 114, the normal or fine calibration GUI as described herein may be displayed to user 114. Additionally, should user 114 or another user desire to perform the front end or initial calibration operation, by selecting Front end button 2410 the initial calibration GUIs may be displayed to user 114. In one instance, GUI 2400 may be displayed to user 114 by selecting a menu button displayed on GUI 2300.

Figure 27:
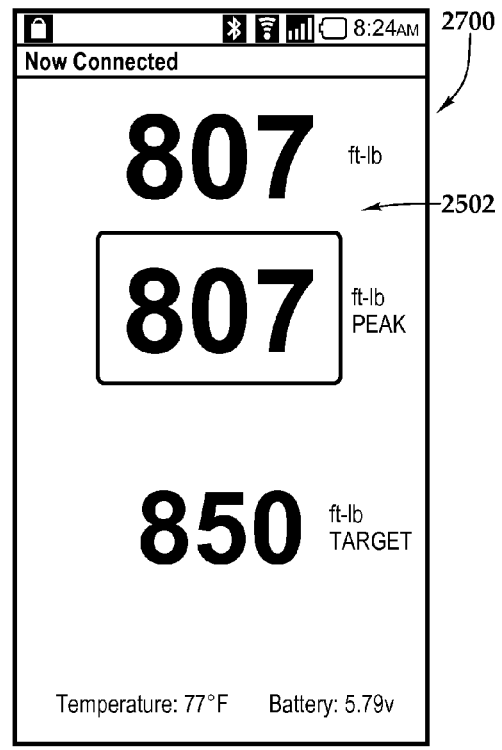
FIG. 27 is another exemplary screenshot of a GUI for displaying torque applying device operation of portable torque measurement and notification system according to an embodiment.

GUIs 2500 and 2700 display to user 114 several different torque measurement or values as described herein. For example display 2502 may include an actual torque measurement 2504 that displays the actual torque measurement of torque applying devices 102, 300, 400, 450 during operation. Further, display 2502 may include a peak torque measurement 2506 that displays the largest or peak torque measurement acquired during an operation of torque applying devices 102, 300, 400, 450. Also, display 2502 may include a target torque value 2508 that is the set target torque value that is the target for reaching during a particular torque operation by torque applying devices 102, 300, 400, 450. In one instance, GUI 2500 may be displayed to user 114 by selecting a menu button displayed on GUI 2700 (FIG. 27). In one example, GUI 2700 may be displayed to user 114 by selecting start button 2304.

GUI 2500 may include a display of the peak torque measurement button 2510 that corresponds to the highest actual torque measurement that has occurred during the torquing operation. As shown, peak torque measurement button 2510 may also serve a dual role as an active button to be selected by user 114 for resetting the actual torque measurement and/or peak torque measurement during any measuring operation. By having this dual functionality, user 114 may be wearing gloves during operation of torque applying devices 102, 300, 400, 450 and still be able to activate the good sized peak torque measurement button 2510 user 114, such as by tapping his pocket to activate peak torque measurement button 2510. In one embodiment, peak torque measurement button 2510 has a black background with a white box for displaying black readout peak torque measurements.

In addition, wireless device 106 may recognize a gesture of some type by user 114 for resetting wireless device 106 during a torque measuring operation. The gesture allows user 114 to make a gesture that wireless device 106 recognizes that user 114 wants to zero wireless device 106. Additionally, such gestures may be recognized by wireless device 106 that user 114 desires to zero wireless device 106, for example. Further, another gesture may be recognized by wireless device 106 that user 114 is finished with the applying torque and measuring torque; and to instruct wireless device 106 to transmit the torque measurements/data to wherever it is desired to be sent.

In another embodiment, wireless device 106 may be programmed such that user 114 may apply torque to torque applying devices 102, 300, 400, 450 to reach a target torque value, and once reached user 114 may contact or touch wireless device 106 to instruct it to set to the next target torque values and parameters for the next joint 122 in the pipe or tool string that user 114 may be assembling. This provides a continuous operation and a excellent data record of sequential torquing operations for a sequence of joint 122 and carefully documents what occurred and when and by whom.

In yet another embodiment, wireless device 106 may be set in an automatic mode where once a target torque value has been reached, wireless device 106 automatically resets for the next joint 122 to be assembled by user 114. In this embodiment, user 114 may continue operating torque applying devices 102, 300, 400, 450 until they are notified that the target torque value has been reached and then they can uncouple torque applying devices 102, 300, 400, 450 from a particular joint 122 and reconnect to the next joint 122 in the tool or pipe string.

Further, GUI 2500 may include a "Target" button 2512 and a "Zero" button 2514. By selecting the Zero button 2514, the zero operation as described herein may be performed. By selecting the Target button 2512, user 114 may be presented with a Target torque input field 2604 as shown with GUI 2600. Target torque input field 2604 may further include a Target torque value 2606 for inputting the target torque value as described herein. Additionally, Target torque input field 2604 may also include an "OK" button 2608 for accepting inputted target torque value and a "Cancel" button 2610 for canceling the target torque value input operation. GUI 2600 may also include a virtual keyboard for entering information and data by user 114, for example. In one instance, GUI 2600 may be displayed to user 114 by selecting peak torque measurement button 2510 and then selecting Target torque value 2606 to bring up virtual keyboard.

Figure 28:
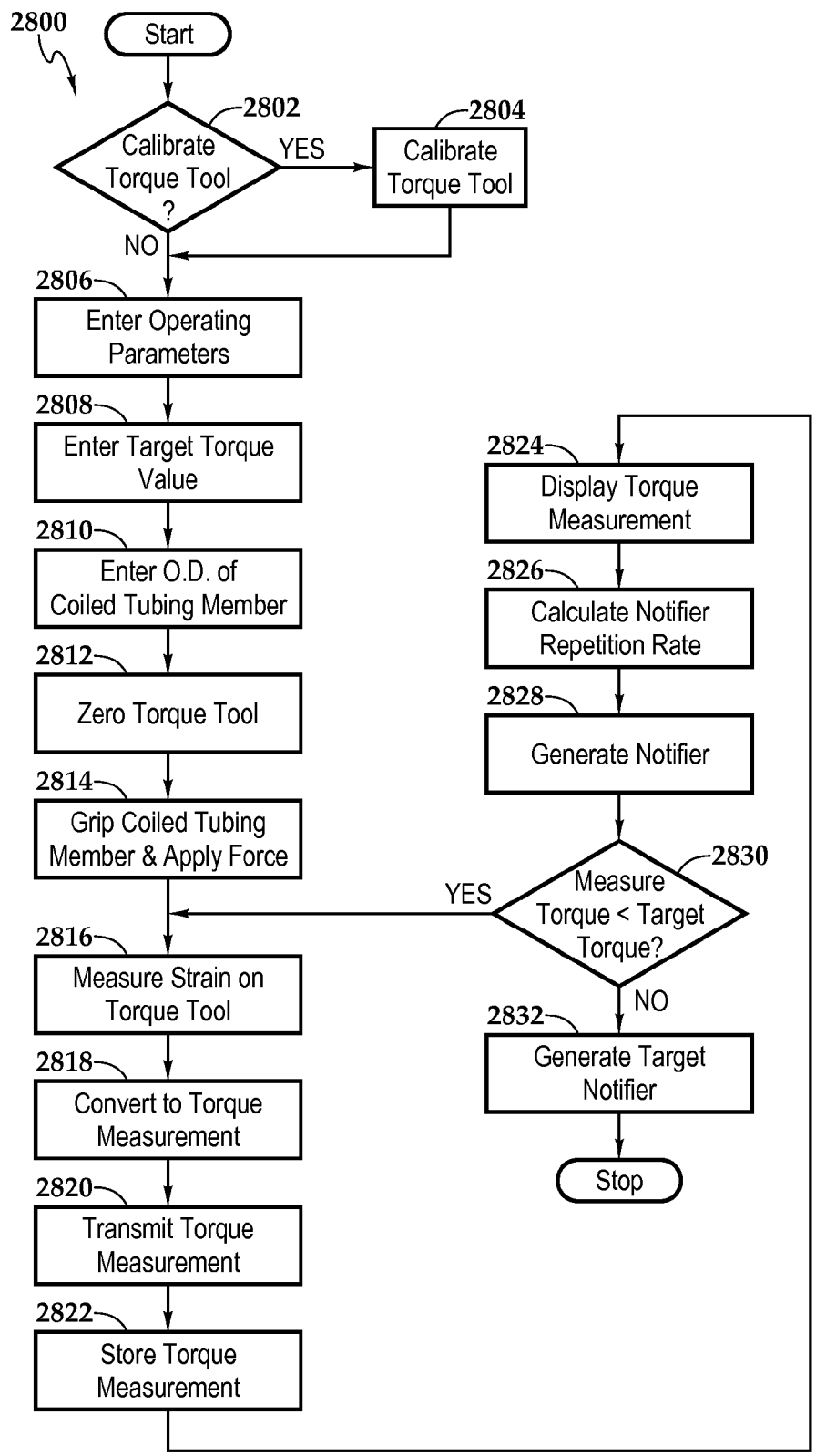
FIG. 28 is a flowchart of a process for measuring and notifying torque measurements to a user according to an embodiment.

Portable torque measurement and notification system 100 further includes methods for measuring torque applied to a tubular member, for example, and notifying a user of the proximity of the actual torque measurement to a set target torque value. With reference to FIG. 28, an embodiment of method for measuring actual torque applied by torque applying devices 102, 300, 400, 450 to a tubular member, for example, is schematically and generally designated 2800. Prior to any of the steps noted below, user 114 may power on torque applying devices 102, 300, 400, 450 by any of the ways described herein, such as by passing a magnet over housing 218, in one example. This operates power switch 634 to power on torque applying devices 102, 300, 400, 450. In step 2802, a query is made regarding whether torque applying devices 102, 300, 400, 450 are to be calibrated prior to taking actual torque measurements. If the answer to this query is yes, then in step 2804 a calibration operation is performed on torque applying devices 102, 300, 400, 450 as described herein. After calibration, the process may proceed to step 2806. If the answer to query is no, then the process proceeds to step 2806, which may be a step where user 114 enters certain parameters relating to the torque operation. This step may also include displaying found and/or paired torque applying devices 102, 300, 400, 450. If more than one torque applying devices 102, 300, 400, 450 are found during the scan, user 114 may be prompted to select one of torque applying devices 102, 300, 400, 450 for operating with wireless device 106.

Step 2808 may include inputting a target torque value that is the goal or target to reach during the torque operation by torque applying devices 102, 300, 400, 450 on a tubular member, for example. Step 2810 may include inputting the outer diameter size of tubular member either manually by user 114 or automatically by jaw distance sensor 338, for example. Step 2812 may include zeroing torque applying devices 102, 300, 400, 450 as described herein prior to applying torque to tubular member.

Step 2814 may include securely gripping coiled tubing and applying torque with torque applying devices 102, 300, 400, 450. In Step 2816, wireless device 106 measures the strain on handle 210 of torque applying devices 102, 300, 400, 450 via strain gages 228, 230. In step 2818, wireless device 106 converts the strain measurements to engineering torque measurements. In step 2820, user 114 may activate start button 2304 instructs wireless device 106 to begin transmitting torque measurements to torque applying devices 102, 300, 400, 450. A stream of torque measurements are transmitted to wireless device 106 during this step, in one example. In one embodiment, these torque measurements are sent at a rate of approximately four times a second.

In another embodiment, wireless device 106 may be displayed a "collect" data button (not shown). By selecting this button, wireless device 106 would obviate all of the extraneous data that may be collected during the torquing operation that really doesn't mean much. Thus, user 114 may determine when and at what time the actual torque measurements are collected by wireless device 106, so that all of the extraneous one may not be transmitted, thus freeing up storage and bandwidth, in one example.

In step 2822, wireless device 106 may store all of the received torque data and in step 2824, wireless device 106 displays the actual torque measurements and peak torque measurements as described herein. In step 2826, wireless device 106 calculates the proximity of the actual torque measurement and/or peak torque measurement to the target torque value and calculates a repetition rate for a particular notifier as described herein.

In step 2828, wireless device 106 provides the generated notifier to user 114 via any means described herein including aural notifiers, audible notifiers, vibratory notifiers, tactile notifiers, visual notifiers, voice notifiers, etc. at a repetition rate to notify user 114 of the proximity of the actual torque measurement to the target torque value. These notifiers may be provided to user 114 via any known means including, earbuds, headphones, speakers, wireless device speakers, wireless headsets, Bluetooth headsets, Bluetooth earbuds, vibrations, tactile actions, lights, vocal commands, etc.

Figure 29A:
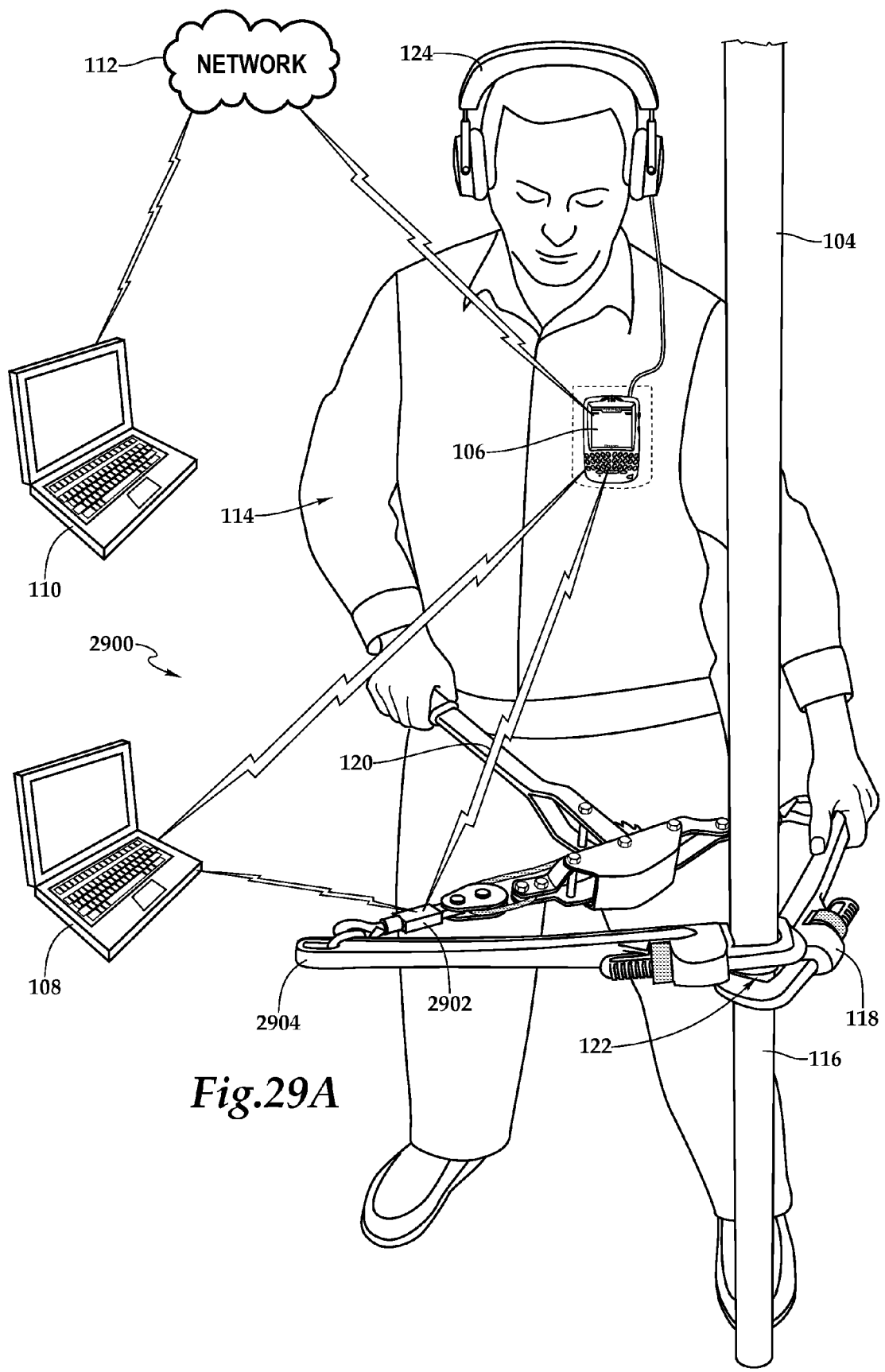
FIG. 29A is a schematic illustration of a portable torque measurement and notification system according to another embodiment.

Referring now to FIG. 29A, another embodiment of a portable torque measurement and notification system is schematically illustrated and generally designated 2900. Portable torque measurement and notification system 2900 includes one or more load measuring device 2902 that may be located between one end of a wrench 2904 and portable winch 120. In another aspect, portable torque measurement and notification system 2900 may include a load measuring device 2902 located between one end of wrench 118 and portable winch 120. In yet another aspect, portable torque measurement and notification system 2900 may include a load measuring device 2902 located between one end of wrench 118 and portable winch 120 and also a load measuring device 2902 located between one end of wrench 2904 and portable winch 120.

As can be seen in FIG. 29A, portable torque measurement and notification system 2900 further includes some or all of the components such as wireless device 106, computing devices 108, computing devices 110, and network 112 of portable torque measurement and notification system 100 for transmitting load or torque measurements and data from load measuring device 2902 to either wireless device 106, computing devices 108, and/or computing devices 110 via all communication means described herein. All disclosure described above relating to these elements, components, and communication means relating to portable torque measurement and notification system 100 are incorporated in portable torque measurement and notification system 2900.

Portable torque measurement and notification system 2900 provides load measurements caused by user 114 operating portable winch 120 between the ends of the handles of wrench 118, 2904 to one or more of wireless device 106, computing devices 108, and/or computing devices 110 as described above relating to portable torque measurement and notification system 100. User 114 may operate load measuring device 2902 by applying a force on wrenches 118, 2904 by portable winch 120. This force is translated into a torque to tubular member 104 for tightening a threaded end of tubular member 104 with a threaded end of a tubular member 116. In general, user 114 securely grips wrench 2904 to tubular member 104 and securely grips wrench 118 to tubular member 116. He then may connect portable winch 120, such as a "come-along" between wrench 2904 and wrench 118 to apply the desired or recommended torque to tubular member 104 and tubular member 116 via wrenches 118, 2904 to properly join the two tubular members at joint 122.

Portable torque measurement and notification system 2900 measures this applied load and calculates the applied torque on tubular members 104, 116. The load and torque measurements and data may then be communicated and stored to one or more wireless device 106, computing devices 108, computing devices 110 via an described means herein.

Additionally, the handles of wrenches 118, 2904 may include vias or holes for accepting fasteners, rings, hooks, and the like of portable winch 120 and load measuring device 2902.

Figure 29B:
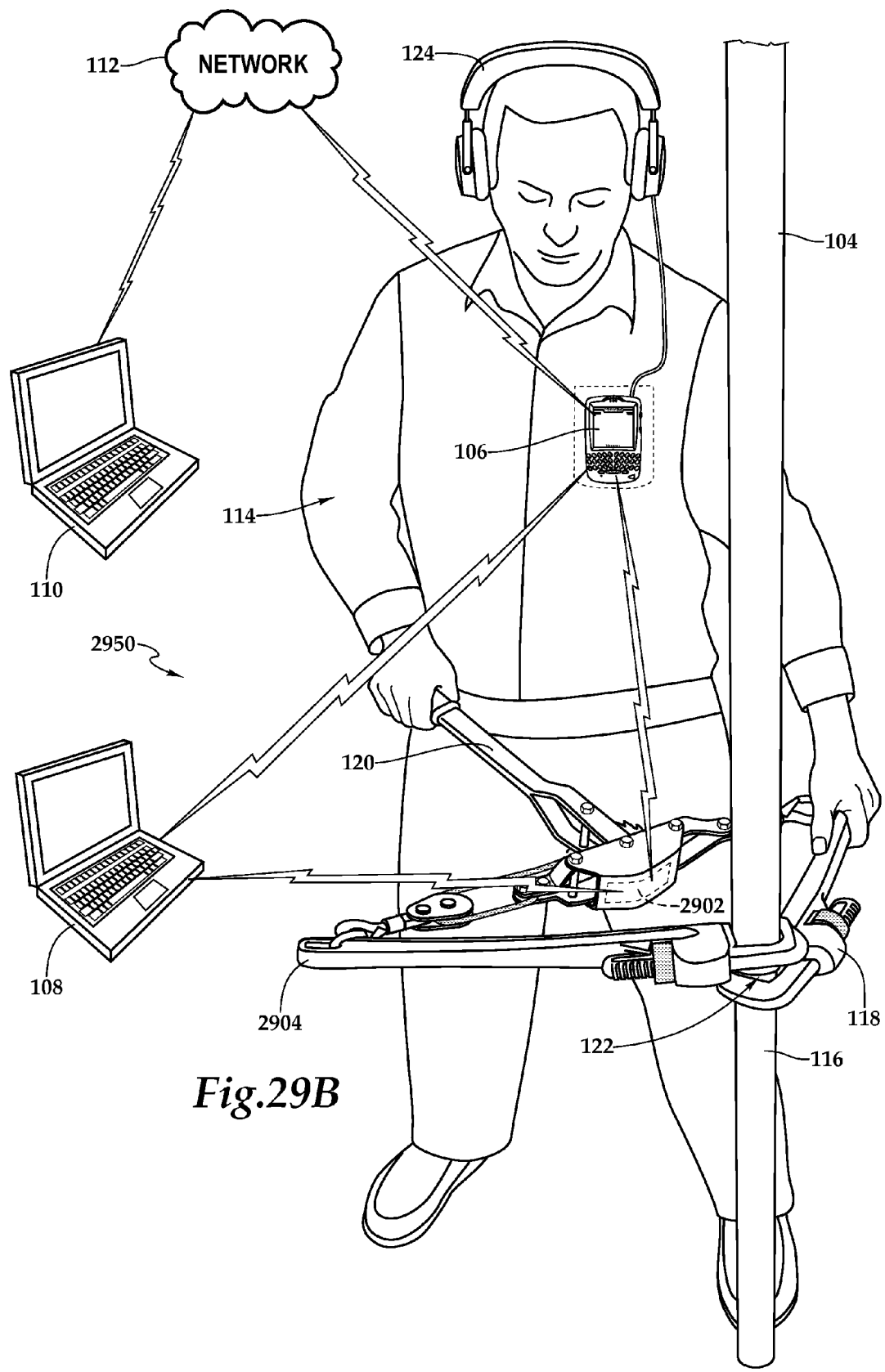
FIG. 29B is a schematic illustration of a portable torque measurement and notification system according to another embodiment.

Referring now to FIG. 29B, some or all of the components of load measuring device 2902 may incorporated into portable winch 120 itself. In this particular embodiment, the functionality of load measuring device 2902 is incorporated directly into portable winch 120, thus eliminating the need for load measuring device 2902 to be located between portable winch 120 and the handles of wrenches 118, 2904, for example.

Turning now to FIG. 30, a load measuring device 2902 is shown and includes a housing 3002 that substantially encloses the electronics, circuitry, load cell, etc. of load measuring device 2902. Housing 3002 may be any shape or form of housing that enables it to be operated between one or more wrenches 118, 2904. Preferably, housing 3002 is made and/or formed of a material that doesn't prevent wireless transmissions, such as electromagnetic waves, radio frequency signals, etc., from transmitting between load measuring device 2902 and one or more of wireless device 106, computing devices 108, and computing devices 110.

Portable torque measurement and notification system 2900 may be used in any type of environments, including in the field, in a shop, and/or or inside a building where pipe strings, coiled tubing strings, tool strings and the like are made up.

Although the present portable torque measurement and notification system has been described in relation to tubular members, portable torque measurement and notification system may be used with any types of tools that apply torque or force to another object, regardless of shape, form, etc.

Portable torque measurement and notification system 2900 measures the torque applied by wrenches 118, wrench 2904 to tubular members 104, 116 and generates and provides notifiers to user 114 based on calculated torque measurements and a target torque value. Such notifiers, as discussed above, may be any type of notifiers including tactile, visual, auditory, vibratory, and aural, that may be presented to user 114 through listening devices 124. Wireless device 106 may be carried anywhere on user's 114 person, and in one example, wireless device 106 may be carried in a user's 114 pocket. Wireless device 106 may also be carried in a holster that attaches to a belt of user 114, for example.

In another embodiment, portable torque measurement and notification system 2900 may generate and provide such notifiers to another user who may then notify user 114 that the target torque value has been achieved. Likewise, any number of users may access any of the computing devices 108, 110 to be notified of any of the data and information herein disclosed and may present such information and data to user 114 or others. Further, wireless device 106 may provide any of the data and notifiers to any other users up to any distance transmittable by wireless device 106.

Load measuring device 2902 may include one or more swivels 3004 that may be connected to housing 3002. One or more hooks 3006 may extend from swivels 3004 for connecting with one or more of wrenches 118, 2904 and portable winch 120. Any other types of fasteners and the like may be used with load measuring device 2902 for connecting it with one or more of wrenches 118, 2904 and portable winch 120. Additionally, hooks 3006 and/or the electronics of load measuring device 2902 may include radio frequency identification tags (RFID) for tracking the number of loading cycles on hooks 3006. This information may be stored by portable torque measurement and notification system 2900 for tracking when to replace hooks and other fasteners based on the statistical analysis by portable torque measurement and notification system 2900 of the failure rates of hooks 3006 corresponding to the number of cycles hooks 3006 were loaded or put under tension, for example.

Load measuring device 2902 further includes one or more load cells 3008 that may be in communication with the ends of housing 3002, swivels 3004, and/or hooks 3006 for measuring the load across load measuring device 2902 as portable winch 120 is operated with one or more wrenches 118, 2904. The shape and size of load cell 3008 may be a factor when designing the shape, size, and/or form of housing 3002 as would be known to those commonly skilled in the arts. Thus, the shape, size, and/or form of housing 3002 shown is one example of such a housing 3002 and other forms of housing 3002 may be used in portable torque measurement and notification system 2900 as would be known to those skilled in the art.

Load cell 3008 may be any type of load cell capable of measuring a tension or load applied across load measuring device 2902. In one example, it may be any know type of tension/load sensor/cells as are commonly known in the arts.

Load measuring device 2902 may further include electronic circuitry, such as that described above relative to torque applying device 102. The circuitry may be disposed on a PCB 3001, similar to that described further with reference to PCB 234 of torque applying device 102. Load measuring device 2902 includes a power unit 3010 housing one or more batteries 3011 may be located or disposed within housing 3002. Preferably, power unit 3010 and electronic circuitry are completely enclosed within housing 3002 of load measuring device 2902 to provide protection of them from the elements during operation of load measuring device 2902.

PCB 3001 is in communication with load cell 3008 and it may be hard-wired to a load cell input 3012 of PCB 3001. Load measuring device 2902 further includes a microcontroller module 3014 to obtain a tension/load reading/measurement of load cell 3008. Microcontroller module 3014 may be primary microcontroller of load measuring device 2902 and is responsible for all onboard computation not provided in another subsystem of portable torque measurement and notification system 2900.

Power unit 3010 may be switched on and off switch 3016. PCB 3001 may further include a wireless module 3018. In one embodiment, wireless module 3018 is a Bluetooth wireless module manufactured by Parani having part number ESD200. Wireless module 3018 implements the Bluetooth Serial Port Profile ("SPP") such that microcontroller module 3001 can communicate with wireless module 3018 using a standard universal asynchronous receiver/transmitter ("UART") serial interface. Firmware embedded in microcontroller module 3014 controls and configures the operation of wireless module 3018, but the implementation of the Bluetooth standard may be contained entirely within wireless module 3018, in one embodiment. PCB 3001 may further include a integrated circuit serial programming connector 3020.

Additionally, load measuring device 2902 may include a display 3022 for displaying one or more data relating to force, load, torque, and the like to a user when operation of the wireless communication features of wireless device 106 are prohibited in a particular work environment. Display 3022 displays this data to user 114 for viewing during operation of wrenches 118, 2904 and load measuring device 2902, for example. Some such environments may deal with the presence of explosive compounds and chemicals where certain powered wireless communication standards may be prohibited. These environments may have an energy or power dissipation requirements or maximum that must be adhered. In these types of environments, certain lower powered wireless communications devices such as tablet PCs may be operated as they may be using certain lower powered wireless communication standards. For example, in certain oil field environments, using certain wireless communication standards, such as Bluetooth® may be prohibited.

In these cases, if no wireless device is available that operates within the energy or power dissipation levels, then user 114 may view display 3022 for all necessary data outputs, including measured torque measurements, target torque values, and the like. Then, once load measuring device 2902 and/or portable winch 120 is removed from such an environment, other wireless communication standards, such as Bluetooth®, may be enabled for transferring all stored data from load measuring device 2902 and/or portable winch 120 to one or more of wireless device 106, computing devices 108, and computing devices 110, for example.

In one embodiment, once load measuring device 2902 is taken to a safe environment where wireless communications may be resumed, all stored data and information contained in load measuring device 2902 may be transmitted wirelessly to one or more of wireless device 106, computing devices 108, and computing devices 110, for example. In addition to those components described above, PCB 3001 and load measuring device 2902 may further include all or some of those components described herein relative to torque applying device torque applying device 102 and PCB 600.

Figure 31A:
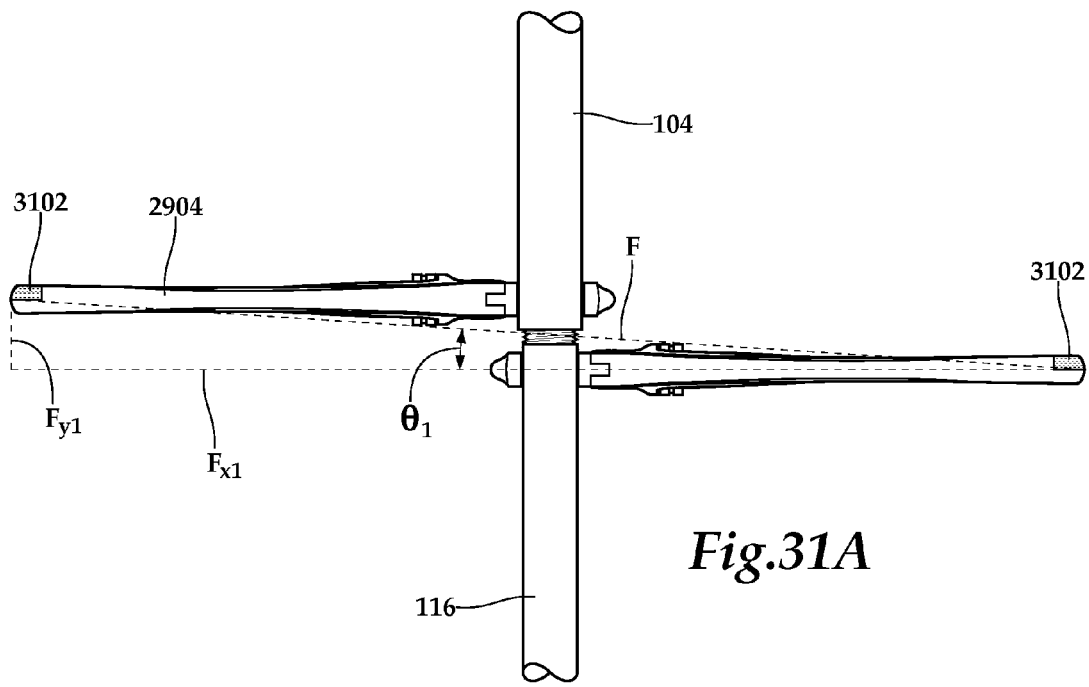
FIG. 31A is a side view of two conventional wrenches disposed about tubular members at a first distance according to one embodiment.
Figure 31B:
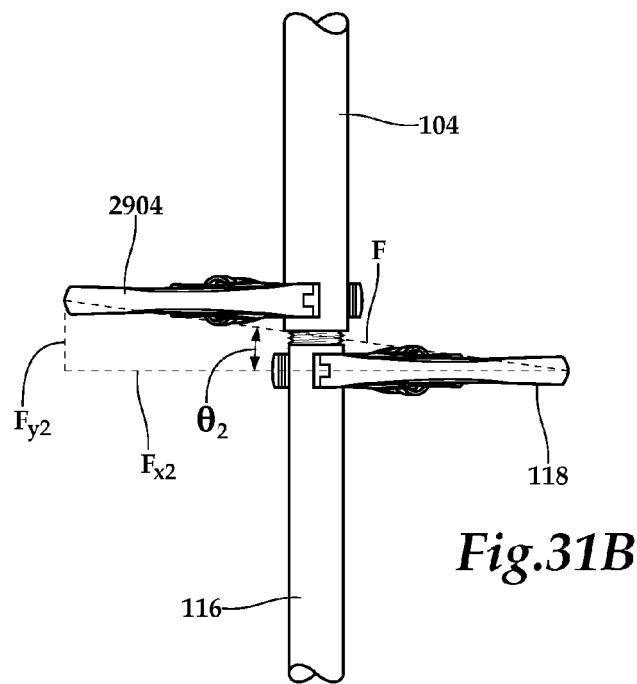
FIG. 31B is a side view of the two conventional wrenches disposed about the tubular members of FIG. 31A at a second distance according to one embodiment.

Referring now to FIGS. 31A-31B, wrenches 118, 2904 are shown in a side view with the two wrench handles separated by a substantial distance. In place of portable winch 120 and load measuring device 2902 being shown, a substantially linear line "F" is shown extending between substantially the centerlines of both wrenches where portable winch 120 and load measuring device 2902 would be located. Since wrench 118 is located below wrench 2904, line F is shown at a slight angle $\theta_1$ is formed between line F and a line $F_{x1}$ representing a substantially horizontal force line or force vector.

Additionally, a substantially vertical force line of force vector $F_{y1}$ is shown connecting the ends of line F and line $F_{x1}$ at the end of handle of wrench 2904. A force applied along line F by portable winch 120 and measured by load measuring device 2902 will impart a vertical force component along line $F_{y1}$ and a horizontal force component along line $F_{x1}$. Thus, any load applied along line F by portable winch 120 and measured by load measuring device 2902 will have a vertical force component that will force the handles of wrenches 118, 2904 together. Because the wrenches 118, 2904 are not in a linear plane, but vertically offset by the distance vertically between the two wrenches, any force or load applied along line F by portable winch 120 and measured by load measuring device load measuring device 2902, a portion of that force or load will be directed towards forcing the two handles of wrenches 118, 2904 together. Thus, not all of the applied load or force by portable winch 120 and measured by load measuring device 2902 will be directed along line $F_{x1}$, and therefore not imparted directly as torque applied to tubular member 104 and tubular member 116.

In one embodiment, portable torque measurement and notification system 2900 measures the load or force applied along line F by portable winch 120 and calculates one or more of the load or force along lines $F_{x1}$ and $F_{y1}$ for determining the actual torque applied to tubular member 104 and tubular member 116. The calculated torque measured by portable torque measurement and notification system 2900 will then be notified to user 114 as described in any embodiment herein and above.

FIG. 31B shows wrenches 118, 2904 during operation of portable winch 120 such that the handles of wrenches 118, 2904 are closer together than they are shown in FIG. 31A. As they are drawn closer together by the operation of portable winch 120 by user 114, for example, an angle $\theta_2$ is formed between line F and line $F_{x1}$. As they are drawn closer together, $\theta_2$ becomes slightly larger than $\theta_1$. Although two different distances are shown in FIGS. 31A-31B, portable torque measurement and notification system 2900 may measure a tension/load applied by portable winch 120 and measured by load measuring device 2902 in incremental distances during operation of portable winch 120 while applying torque to tubular members.

In one aspect, wrenches 118, 2904 may include distance sensors 3102 that determine or measure the distance between the ends of handles of wrenches 118, 2904. Distance sensors 3102 may be in communication with one or more of load measuring device 2902, wireless device 106, computing devices 108, and computing devices 110. Distance sensors 3102 may be any kind of distance sensors as described above and as commonly known to those skilled in the arts. Generally, distance sensors 3102 measures and provides the distance between the ends of handles of wrenches 118, 2904 during operation of wrenches 118, 2904 in applying torque to tubular members 104, 116 or other objects as described herein.

Now turning to FIG. 32, an exemplary database of computing devices 108, 110 and wireless device 106 is schematically illustrated and generally designated 3200. Database 3200 may include a plurality of fields for inputting and storing data transmitted from load measuring device 2902. For example, database 3200 may include a plurality of rows 3214a-3214n for inputting data from load measuring device 2902 during a particular operation. Each of rows 3214a-3214n may input and store data for a different operation of load measuring device 2902. In addition, database 3200 may include a plurality of fields for inputting and storing data for each of these operations, such as a handle distance field 3202, wrench distance field 3204, $\theta$ (offset) field 3206, load/force field 3208, force $(F_x)$ field 3210, force $(F_y)$ field 3212, handle length/radius (L/r) field 3216, and calculated torque field 3218, for example.

In one embodiment, some of the data contained in database 700 may be used in conjunction with the data shown in database 3200. For example, many of the fields of database 700 may be used with database 3200, such as date field 702, time field 704, job field 706, operator field 708, temperature field 710, voltage field 712, coiled field 714, outer diameter field 716, target torque value field 718, and peak torque measurement field 720, for example.

Additionally, one of rows 3214a-3214n may correspond to a particular use or operation of load measuring device 2902 that corresponds to a particular date and time in date field 702 and time field 704 relating to a particular use of load measuring device 2902. Additionally, it may show a particular job site or location information in job field 706. Further, it may show a particular operator, by name or some other identifier, in operator field 708 that operated load measuring device 2902 at that date, time, and location. Similarly, data and information relating to environmental temperature may be inputted and stored in temperature field 710. Also, the voltage provided by power unit 224 and/or batteries 226 may be inputted and stored in voltage field 712.

The particular information relating to which tubular member and/or tool that was being torqued during that time and date of the operation may be inputted and stored in coiled tubing tool field 714. Outer diameter field 716 may be used to input and store information relating to the outer diameter of the tubular member that load measuring device 2902 was engaged with for purposes of calibration and the like may be inputted and stored in outer diameter field 716. The set target torque value for that particular joint between the tubular members may be inputted and stored in target torque value field 718. Further, the peak torque measurement provided by load measuring device 2902 during that particular operation may be inputted and stored in peak torque measurement field 720. In addition to the fields shown, database 700 may include any number of other fields and data that relate to a particular operation of load measuring device 2902.

Handle distance field 3202 of database 3200 may include data relating to the distance between the ends or holes in the handles of wrenches 118, 2904 during operation of wrenches 118, 2904 by portable winch 120. As wrenches 118, 2904 and portable winch 120 are operated, this data may be transmitted to database 3200 to import into one or more of fields 3214a-3214n. For example, field 3214a shows wrench 118 and wrench 2904 apart by a distance of 36 inches and field 3214b shows wrench 118 and wrench 2904 apart by a distance of 32 inches. The changing values of the distances show the two wrenches being operated by portable winch 120 pulling the wrenches together as torque is applied to tubular members 104, 116.

Wrench distance field 3204 includes data relating to the distance between wrench 118 and wrench 2904. This data or information may be entered into portable torque measurement and notification system 2900 by user 114 or may be detected or measured with distance sensors as described herein. Angle θ (offset) field 3206 contains the calculated angles between the F line and the $F_{x1}$ line, such as angles $θ_1$ and $θ_2$. Though there are many different ways to calculate these angles, in one embodiment, portable torque measurement and notification system 2900 may produce a quotient by dividing the data in each of wrench distance field 3204 by the corresponding data in handle distance field 3202 and then calculating the inverse sine (arcsine) of the quotient to produce angle θ. These calculations may be stored in θ (offset) field 3206.

Load/force field 3208 may be data that is transmitted from load measuring device 2902 that may be raw load data or information applied by wrenches 118, 2904. Force (Fx) field 3210 may be data that is calculated by portable torque measurement and notification system 2900 by multiplying the cosine of the data in θ (offset) field 3206 by the corresponding data in load/force field 3208. Likewise, portable torque measurement and notification system 2900 may calculate data in force (Fy) field 3212 by multiplying the sine of the data in θ (offset) field 3206 by the corresponding data in load/force field 3208. Handle length/radius (L/r) field 3216 contains data relating to the distance between the connection point of portable winch 120 and/or load measuring device 2902 with each handle of wrenches 118, 2904 and the center point on the object gripped by wrenches 118, 2904, in one example. Calculated torque field 3218 may be calculate by portable torque measurement and notification system 2900 by multiplying the data in force (Fx) field 3210 by the corresponding data in handle length/radius (L/r) field 3216, in one example.

Figure 33A:
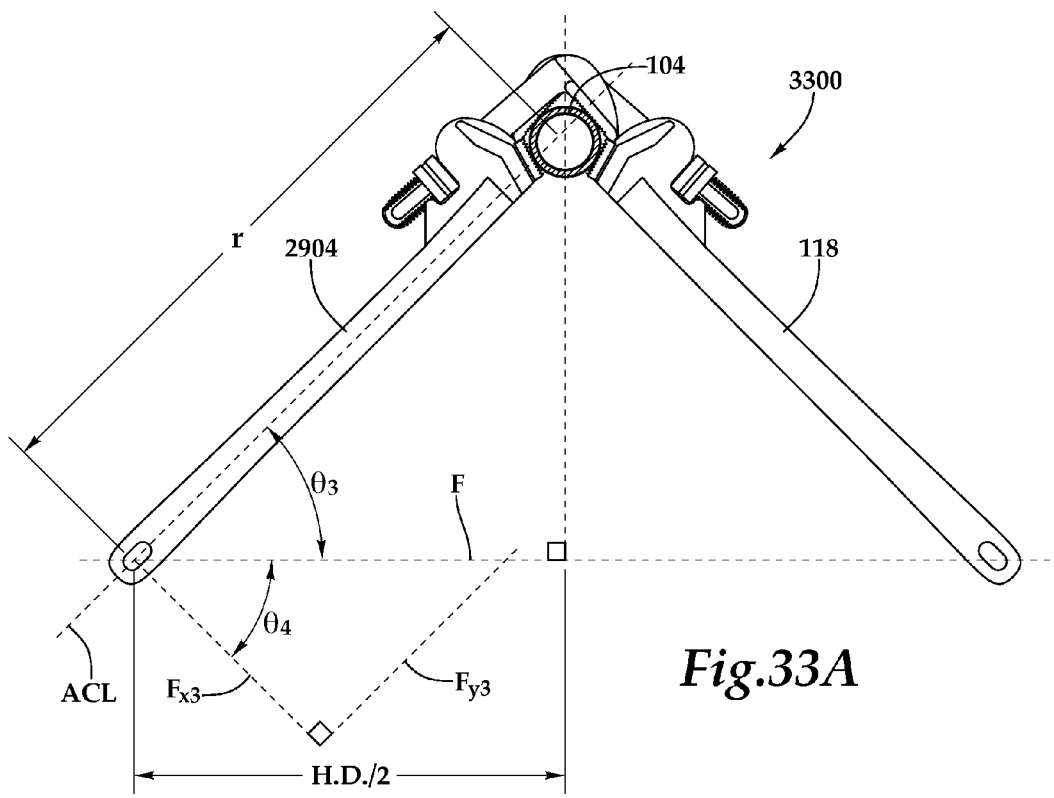
FIG. 33A is a top view of two conventional wrenches disposed about tubular members at a first distance according to one embodiment.
Figure 33B:
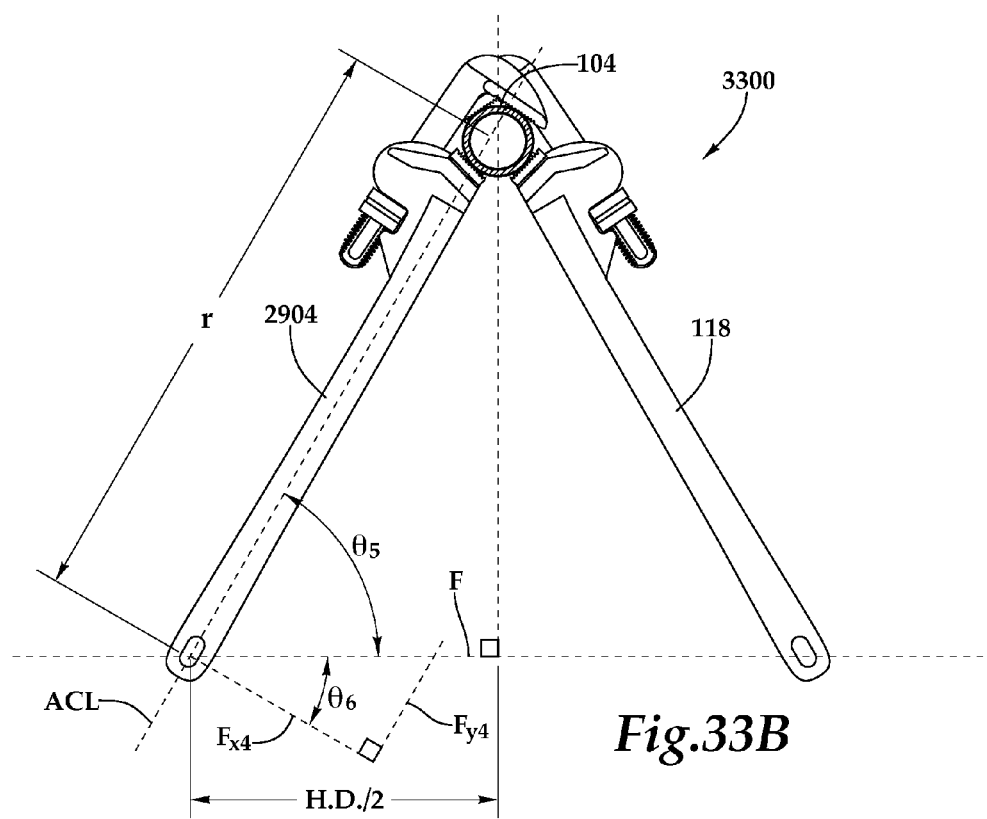
FIG. 33B is a top view of the two conventional wrenches disposed about the tubular members of FIG. 31A at a second distance according to one embodiment.

Turning now to FIGS. 33A-33B, a top view of wrenches 118, 2904 is shown in two different distances from each other. In FIG. 33A, wrenches 118, 2904 are gripped onto tubular members 116, 2904, respectively, and form an angle between the two wrenches of approximately 90 degrees. In FIG. 33B, wrenches 118, 2904 are gripped onto tubular members 116, 2904, respectively, and form an angle between the two wrenches of approximately 60 degrees. The change in angles formed by wrenches 118, 2904 may be from operation of portable winch 120 for applying torque to the tubular members.

In place of portable winch 120 and load measuring device 2902 being shown, a substantially linear line "F" is shown extending between substantially ends of the handles of both wrenches where portable winch 120 and load measuring device 2902 would be located. Line F represents substantially the force line or force vector of the portable winch 120 and load measuring device 2902 when connected between wrenches 118, 2904.

As can be seen in FIG. 33A, any force applied along line F has a force component that is perpendicular ($F_{x3}$) to the handle of wrench 2904 and a force component that is parallel ($F_{y3}$) to the handle of wrench 2904. Thus, not all of the applied load or force by portable winch 120 and measured by load measuring device 2902 will be directed along line $F_{x3}$, and therefore not imparted directly as torque applied to tubular member 104 and tubular member 116. The force vector $F_{x3}$ is the applied force that is realized in applying torque to tubular member 104. Portable torque measurement and notification system 2900 determines the force $F_{x3}$ for calculating the torque applied to tubular member 104.

In one embodiment, portable torque measurement and notification system 2900 measures the load or force applied along line F by portable winch 120 and calculates one or more of the load or force along lines $F_{x3}$ and $F_{y3}$ for determining the actual torque applied to tubular member 104 and tubular member 116. The calculated torque measured by portable torque measurement and notification system 2900 will then be notified to user 114 as described in any embodiment herein and above.

In one aspect, wrenches 118, 2904 may include distance sensors 3102 that determine or measure the distance between the ends of handles of wrenches 118, 2904. Distance sensors 3102 may be in communication with one or more of load measuring device 2902, wireless device 106, computing devices 108, and computing devices 110. Distance sensors 3102 may be any kind of distance sensors as described above and as commonly known to those skilled in the arts. Generally, distance sensors 3102 measures and provides the distance between the ends of handles of wrenches 118, 2904 during operation of wrenches 118, 2904 in applying torque to tubular members 104, 116 or other objects as described herein.

FIG. 33B shows wrenches 118, 2904 during operation of portable winch 120 such that the handles of wrenches 118, 2904 are closer together than they are shown in FIG. 33A. As they are drawn closer together by the operation of portable winch 120 by user 114, for example, an angle $θ_2$ is formed between line F and line $F_{x1}$. As they are drawn closer together, $θ_2$ becomes slightly larger than $θ_1$. Although two different distances are shown in FIGS. 31A-31B, portable torque measurement and notification system 2900 may measure a tension/load applied by portable winch 120 and measured by load measuring device 2902 in incremental distances during operation of portable winch 120 while applying torque to tubular members.

Referring to FIG. 33A, an angle $θ_3$ is formed between the line F and the substantially axial centerline (ACL) of wrench 2904. Once the distance between the handles of wrenches 118, 2904 is determined, either by distance sensors 3102 or any other means commonly known by those skilled in the art, portable torque measurement and notification system 2900 divides this handle distance by 2 to generate one side of a right triangle (H.D./2). To determine $θ_3$, portable torque measurement and notification system 2900 divides H.D./2 by r and then takes the inverse cosine (arc cosine) of this quotient to generate the angle $θ_3$. Since $F_{x3}$ and ACL form a 90 degree angle, portable torque measurement and notification system 2900 subtracts calculated angle $θ_3$ from 90 degrees to calculate $θ_4$.

Portable torque measurement and notification system 2900 then can calculate the force line or vector $F_{x3}$ by multiplying the applied force by portable winch 120 and measured by load measuring device 2902 along line F by the cosine of $θ_4$ to produce the force that is perpendicular to the handle of wrench 2904 for calculating the applied torque to the tubular members. Force line or vector line $F_{y3}$ may be calculated by multiplying the applied by portable winch 120 and measured by load measuring device 2902 along line F by the sine of $θ_4$ to produce the force that is parallel to the handle of wrench 2904. Portable torque measurement and notification system 2900 may do so by multiplying $F_{x3}$ by r to produce the applied torque to the tubular members. Similar measurements and calculations may be made regarding the wrenches in FIG. 33B to produce $θ_5$, $θ_6$, line F, $F_{x4}$, and $F_{y4}$.

Now turning to FIG. 34, an exemplary database of computing devices 108, 110 and wireless device 106 is schematically illustrated and generally designated 3400. Database 3400 may include a plurality of fields for inputting and storing data transmitted from load measuring device 2902. For example, database 3400 may include a plurality of rows 3410a-3410n for inputting data from load measuring device 2902 during a particular operation. Each of rows 3410a-3410n may input and store data for a different operation of load measuring device 2902. In addition, database 3400 may include a plurality of fields for inputting and storing data for each of these operations, such as a handle distance/2 (H.D./2) field 3402, angle (θ) of handles field 3404, force ($F_x$) field 3406, and calculated torque field 3408, for example.

In one embodiment, some or all of the data contained in databases 700, 3200 may be used in conjunction with the data shown in database 3400. For example, many of the fields of database 700 may be used with database 3400, such as date field 702, time field 704, job field 706, operator field 708, temperature field 710, voltage field 712, coiled field 714, outer diameter field 716, target torque value field 718, and peak torque measurement field 720, for example. Additionally, many of the field of database 3200 may be used with database 3400, such as calculated torque field 3218 and the like. For calculating $F_{x3}$ and $F_{x4}$, the data contained in force ($F_x$) field 3210 may be used as the line F force for multiplying as described above.

Figure 35:
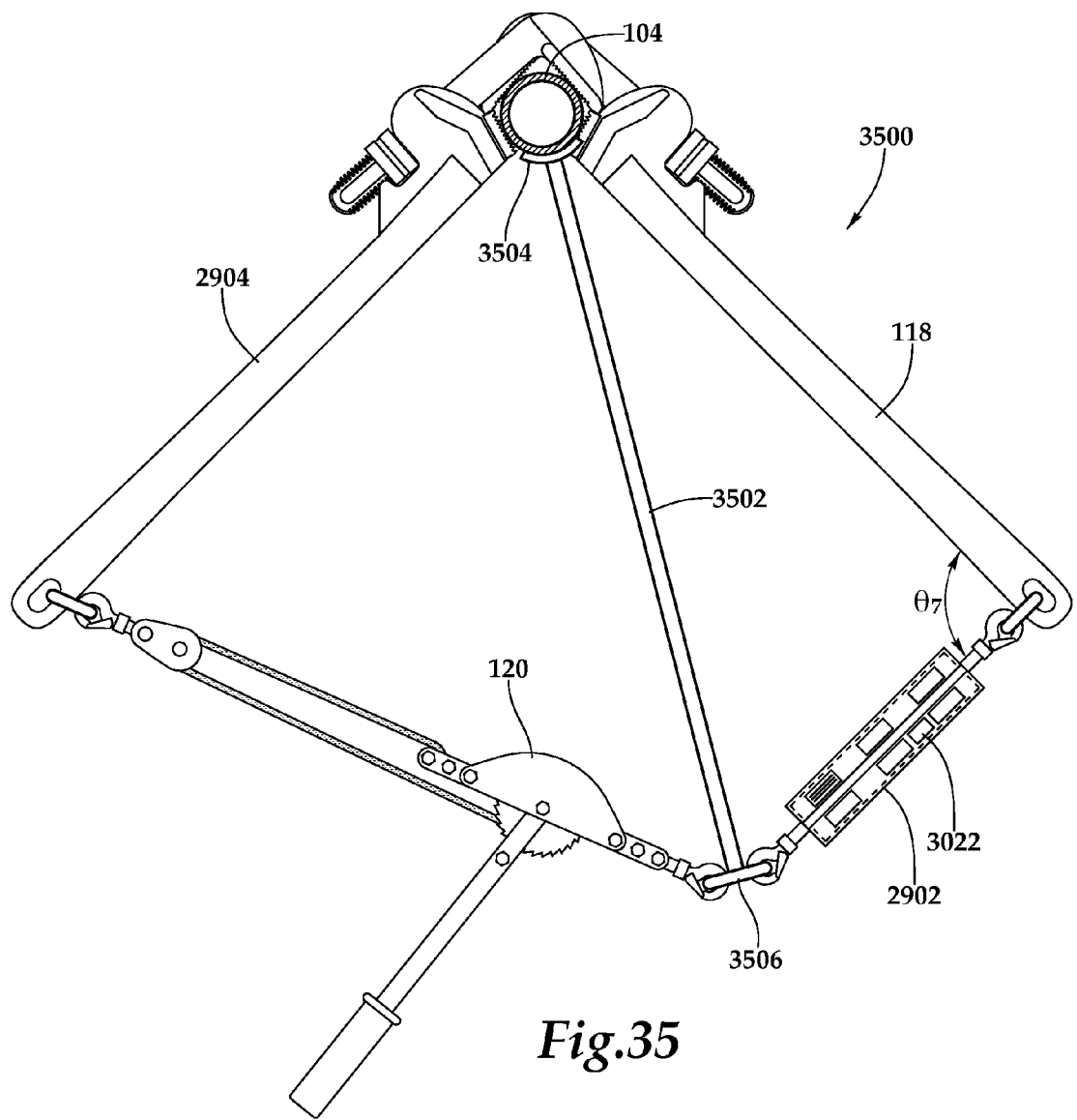
FIG. 35 is a schematic illustration of a portable torque measurement and notification system according to another embodiment.

Referring now to FIG. 35, another embodiment of a portable torque measurement and notification system is schematically illustrated and generally designated portable torque measurement and notification system 3500. Portable torque measurement and notification system 3500 may include a brace 3502 that is disposed between an object, such as tubular member 104, and the ends of portable winch 120 and load measuring device 2902. Brace 3502 includes a first end 3504 that is placed against tubular member 104 for supporting the body of brace 3502. Preferably, first end 3504 provides minimal friction against any object that it is in contact with, such as user 114, so as to not add additional friction that would interfere with accurate load and/or torque measurements. Brace 3502 includes a second end 3506 for engaging with one end of portable winch 120 and one end of load measuring device 2902 such that a 90 degree angle $θ_7$ is created between load measuring device 2902 and the handle of the wrenches 118, 2904 that it is connected, such as wrench 118 as shown. Brace 3502 being a rigid member provides the 90 degree angle $θ_7$ at all times between load measuring device 2902 and the handle of wrench 118 so that the only load measured by load measuring device 2902 is always perpendicular to the handle of wrench 118. Second end 3506 preferably includes eyelets, vias, and/or holes for accepting hooks, fasteners, and the like for connecting portable winch 120 and load measuring device 2902 to second end 3506.

Portable torque measurement and notification system 3500 measures the load applied to wrenches 118, 2904 by portable winch 120 directly from load measuring device 2902 and may store this data for calculating torque applied to tubular member 104 in any of the databases as described herein.

In yet another embodiment, the first end 3504 of brace 3502 may be pivotable attached to one of wrenches 118, 2904, such as wrench 118, for convenience when operating. In this embodiment, first end 3504 is attached loosely or pivotably such that it doesn't interfere with forces applied by portable winch 120 to wrenches 118, 2904.

Figure 36:
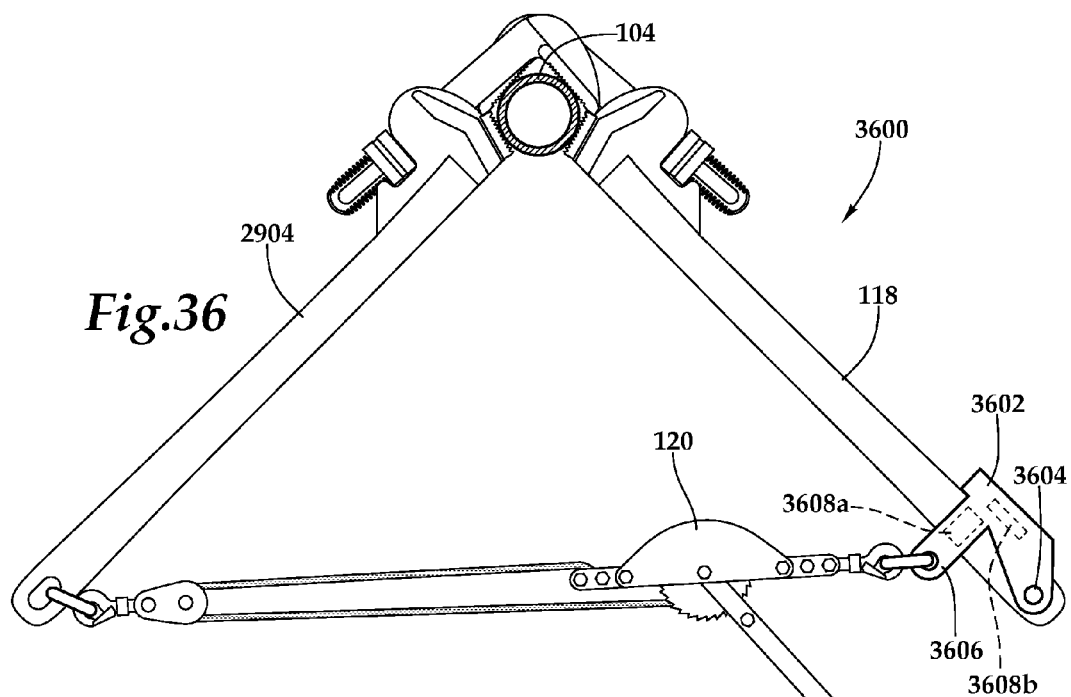
FIG. 36 is a schematic illustration of a portable torque measurement and notification system according to another embodiment.

Turning now to FIG. 36, another embodiment of a portable torque measurement and notification system is schematically illustrated and generally designated 3600. Portable torque measurement and notification system 3600 may include a rotatable or pivotable strain beam 3602 that is disposed about the handle of wrenches 118, 2904 such as wrench 118. Strain beam 3602 includes a hole, via, or aperture 3604 that is rotatably or pivotably secured through a hole, via, or aperture through the handle of wrenches 118, 2904, such as wrench 118, to enable a securing device to secure the two together while enabling strain beam 3602 to pivot or rotate substantially about hole 3604. Additionally, strain beam 3602 includes a clevis 3606 for engaging with portable winch 120 as shown.

Strain beam 3602 preferably enclose electronics 3608a and load sensors 3608b (collectively sensors 3608) such as those described herein for determining loads applied to wrench 118 by portable winch 120 during operation. Due to the disposition of strain beam 3602, location of sensors 3608, and the substantially perpendicular position of clevis 3606 to strain beam 3602, any forces or loads applied to clevis 3606 by portable winch 120 are translated or measured as being substantially perpendicular to the ACL of handle of wrench 118. Load and torque data may be calculated and stored as described above using known lengths of wrenches 118, 2904 handles, distances between wrench handles, and the like.

In one embodiment, sensors 3608b may measure the bending of either the handle of wrenches 118, 2904 and/or the bending of strain beam 3602, for example. In addition, another set of sensors 3608b may be disposed about strain beam 3602 for determining the actual load or tension applied to clevis 3606 and strain beam 3602 by portable winch 120, in one example.

Figure 37:
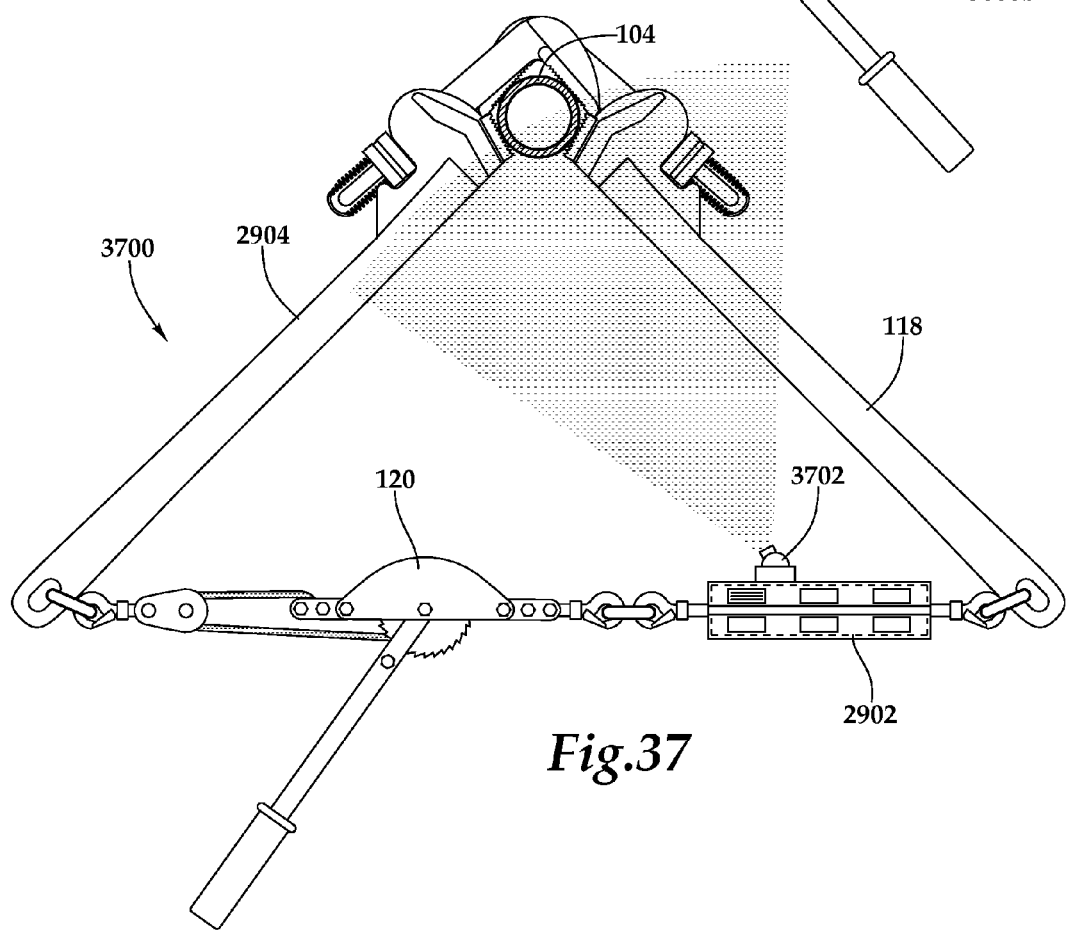
FIG. 37 is a schematic illustration of a portable torque measurement and notification system according to another embodiment.

With reference to FIG. 37, yet another embodiment of a portable torque measurement and notification system is schematically illustrated and generally designated 3700. Portable torque measurement and notification system 3700 may include a camera 3702 that may be fixed to load measuring device 2902 for taking a sequential images or video of the object, such as tubular member 104. Since the location of camera 3702 is fixed and disposed about load measuring device 2902, any movement laterally of load measuring device 2902 during operation of portable winch 120 will change the location of tubular member 104 within the field of view. The change in location of tubular member 104 in the field of view may be measured by image analysis and angles of the two wrenches 118, 2904 may be determined based on the sequential images or video captured by camera 3702. This embodiment provides images and analysis of the center of an object, such as tubular member 104, along with the known angle of camera 3702 relative to load measuring device 2902 to calculate the distance of the handles of wrenches 118, 2904, in one example. Portable torque measurement and notification system 3700 analyzes these changes positions and calculates a distance between the handles of wrenches 118, 2904 as described above or by other means commonly known to those skilled in the arts. Additionally, the size or outer diameter of an object, such as tubular member 104, may be determined by analyzing the images or video captured by camera 3702.

Figure 38:
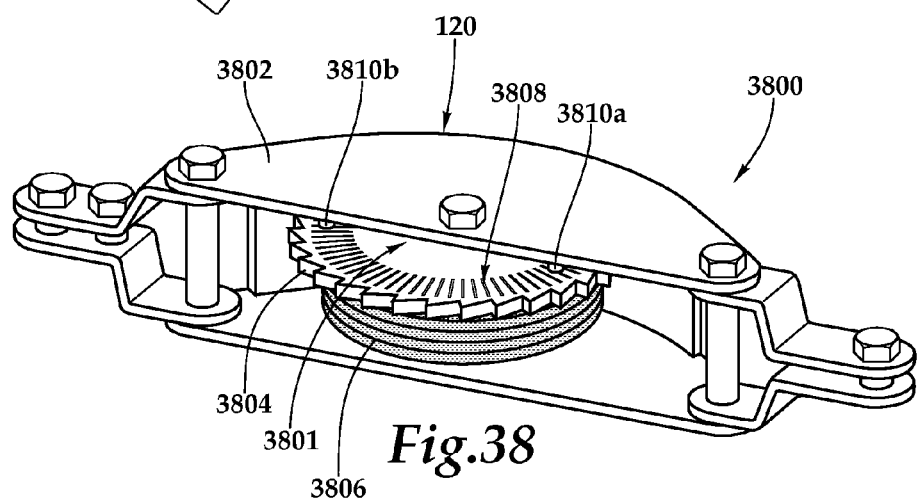
FIG. 38 is a perspective view of a portable winch having a rotary encoder of portable torque measurement and notification system according to another embodiment.

Referring now to FIG. 38, still yet another embodiment of a portable torque measurement and notification system is schematically illustrated and generally designated 3800. Portable torque measurement and notification system 3800 may include a rotary encoder 3801 that is operable within or outside of a housing 3802 of portable winch 120 for determining the angular position and/or rotations of a ratchet wheel or hub 3804 during operation of portable winch 120 for determining the distance between the handles of wrenches 118, 2904 or the angular position between the handles of wrenches 118, 2904 for calculating the distance between the handles for use in calculating the torque applied to objects or tubular member 104, for example. In one aspect, hub 3804 of portable winch 120 includes a line or chain 3806 for connecting with load measuring device 2902 and/or wrenches 118, 2904 as described herein.

In one embodiment, a side of hub 3804 may include a plurality of sensor readable markings 3808 and the like disposed about the periphery of hub 3804 for determining the number of revolutions and angular position of hub 3804 during operation. In one aspect, sensor readable markings 3808 may be read by one or more sensors 3810a, 3810b (collectively sensors 3810) to determine the number of revolutions and angular position of hub 3804 during operation. Although one embodiment of a rotary encoder is described, portable winch 120 may include any type of rotary encoder commonly known to those skilled in the arts.

In one embodiment, rotary encoder is an absolute rotary encoder capable of determining the angular position of hub of portable winch 120 during one or more revolutions of hub during operation. Revolutions of hub and angular position during any of those revolution may be translated or calculated into a linear distance for determining the distance between the ends of the handles of wrenches 118, 2904, as described herein.

In another embodiment, portable winch 120 may include a tension sensor (not shown) for determining the tension of the load applied to the handles of wrenches 118, 2904 by portable winch 120. In this embodiment, portable winch 120 may transmit data associated with load, tension, torque, handle distance, and the like to any one of load measuring device 2902, wireless device 106, computing devices 108, and computing devices 110, for example. This data may be transmitted wirelessly to these devices via any known communication standards as described herein. This embodiment may be employed along with the description associated with FIG. 29B, in one aspect.

In other embodiments, portable winch 120 may be replace by other known load/tension generating devices, such as come-a-long, a chain come-a-long, a cable come-a-long, a power screw, a turnbuckle, a hydraulic cylinder, a pneumatic cylinder, and a threaded boomer, for example.

Figure 39:
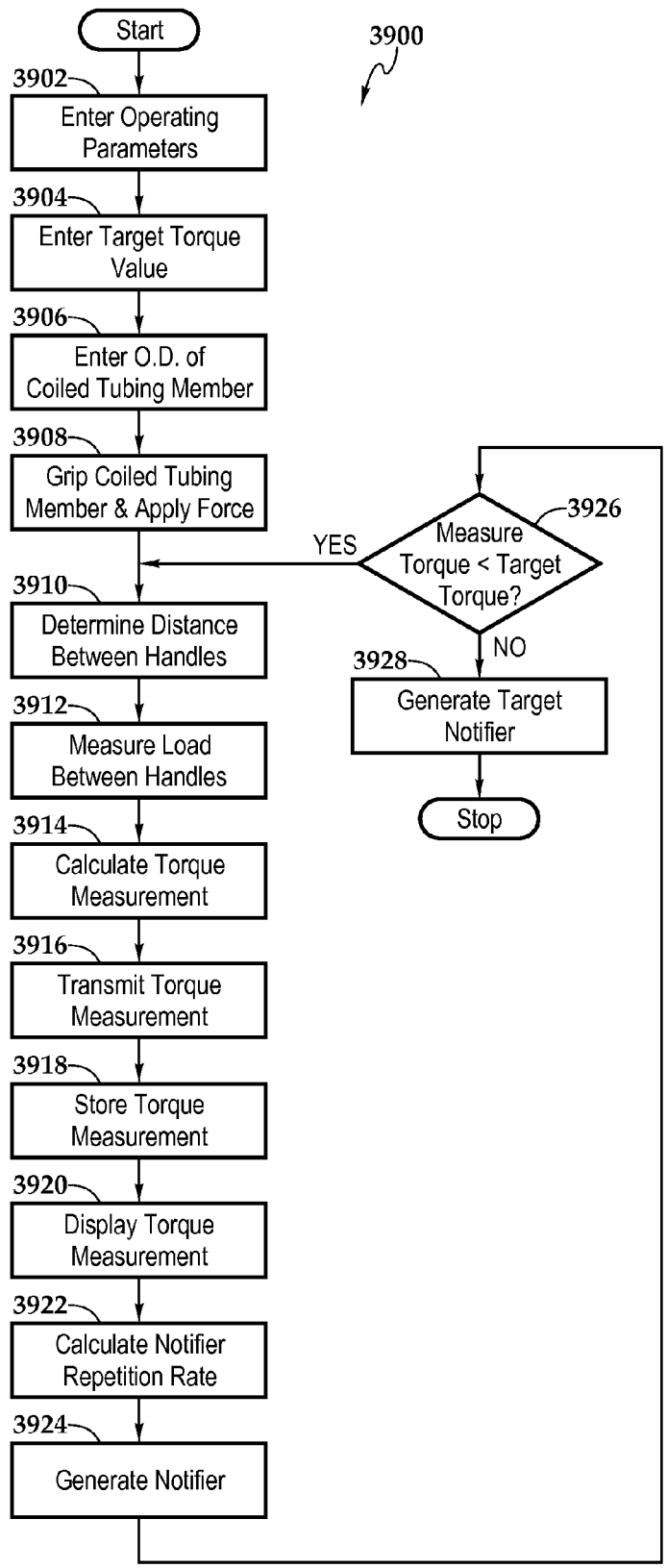
FIG. 39 is a flowchart of a process for measuring and notifying torque measurements to a user according to another embodiment.

Portable torque measurement and notification system 2900 further includes methods for measuring torque applied to a tubular member, for example, and notifying a user of the proximity of the actual torque measurement to a set target torque value. With reference to FIG. 39, an embodiment of method for measuring actual torque applied by load measuring device 2902 and/or portable winch 120 to a tubular member, for example, is schematically and generally designated 3900. Prior to any of the steps noted below, user 114 may power on load measuring device 2902 by any of the ways described herein. In step 3902, a user 114 may enter certain parameters relating to the torque operation. This step may also include displaying found and/or paired load measuring device 2902. If more than one load measuring device 2902 are found during the scan, user 114 may be prompted to select one of load measuring device 2902 for operating with wireless device 106.

Step 3904 may include inputting a target torque value that is the goal or target to reach during the torque operation by load measuring device 2902 and/or portable winch 120 on an object or tubular member, for example. Step 3906 may include inputting the outer diameter size of tubular member either manually by user 114, for example.

Step 3908 may include securely gripping an object, such as tubular members 104, 116 and applying torque with wrenches 118, 2904, for example. Step 3910 may include determining the distance between the handles of wrenches 118, 2904 by any means described herein. In step 3912, load measuring device 2902 and/or portable winch 120 measures the load and/or tension applied by portable winch 120 to the handles of wrenches 118, 2904.

In step 3914, load measuring device 2902 and/or portable winch 120 calculates the force or load measurements to engineering torque measurements. In step 3916, user 114 may activate start button 2304 instructing load measuring device 2902 and/or portable winch 120 to begin transmitting torque measurements to one or more of wireless device 106, computing devices 108, and/or computing devices 110. A stream of torque measurements may be transmitted to these devices during this step, in one example. In one embodiment, these torque measurements are sent at a rate of approximately four times a second. Additionally, this step may be activated after load measuring device 2902 and/or portable winch 120 has been used in an environment where wireless communications are not possible. In this case, load measuring device 2902 and/or portable winch 120 may transmit post-operation all stored data measured and calculated during an operation to one or more of wireless device 106, computing devices 108, and/or computing devices 110, for example.

In another embodiment, wireless device 106 may be displayed a "collect" data button (not shown). By selecting this button, wireless device 106 would obviate all of the extraneous data that may be collected during the torquing operation that really doesn't mean much. Thus, user 114 may determine when and at what time the actual torque measurements are collected by wireless device 106, computing devices 108, and/or computing devices 110 so that all of the extraneous one may not be transmitted, thus freeing up storage and bandwidth, in one example.

In step 3918, wireless device 106 may store all of the received force and torque data, and in step 3920, wireless device 106 may display the actual torque measurements and peak torque measurements as described herein. In an alternate method, this step may include displaying all force and/or torque data to display 3022 onboard load measuring device 2902 and/or portable winch 120. In step 3922, wireless device 106, load measuring device 2902, and/or portable winch 120 may calculate the proximity of the actual torque measurement and/or peak torque measurement to the target torque value and calculate a repetition rate for a particular notifier as described herein.

In step 3924, wireless device 106, load measuring device 2902, and/or portable winch 120 may provide the generated notifier to user 114 via any means described herein including aural notifiers, audible notifiers, vibratory notifiers, tactile notifiers, visual notifiers, voice notifiers, etc. at a repetition rate to notify user 114 of the proximity of the actual torque measurement to the target torque value. These notifiers may be provided to user 114 via any known means including, earbuds, headphones, speakers, wireless device speakers, wireless headsets, Bluetooth headsets, Bluetooth earbuds, vibrations, tactile actions, lights, vocal commands, etc.

In step 3926, wireless device 106, load measuring device 2902, and/or portable winch 120 may compare the measured torque value with the target torque and if it is less that the target torque value the process may be returned to step 3910. If in query 3926, the measured torque value isn't less than the target torque value, then any of wireless device 106, load measuring device 2902, and/or portable winch 120 of portable torque measurement and notification system 2900 may generate the target notifier to user 114.

Figure 40:
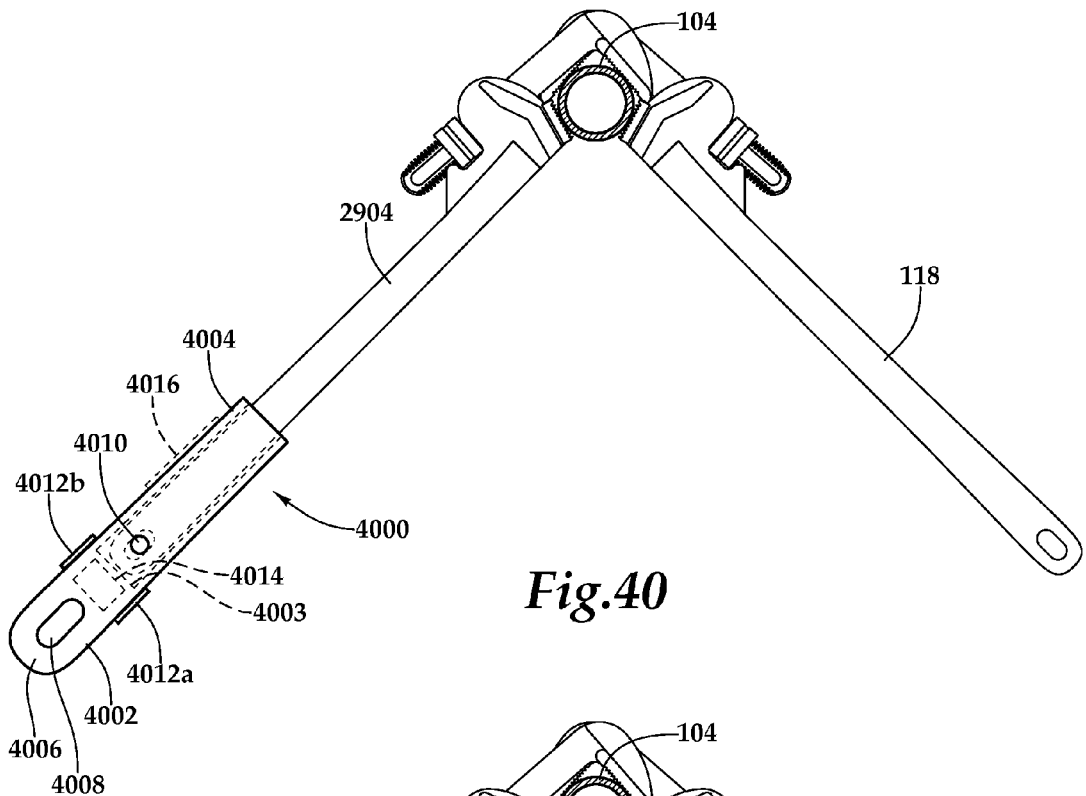
FIG. 40 is a schematic illustration of a removable lever arm having strain gages disposed about a torque applying device of the portable torque measurement and notification system according to an embodiment.

Turning now to FIG. 40, a removable lever arm having strain gages disposed about a torque applying device of the portable torque measurement and notification system is schematically illustrated and generally designated 4000. As discussed above relative to torque applying device 102, load measuring device 2902, and portable winch 120 (including load measuring device 2902), removable lever arm 4000 measures and transmits force and/or torque measurements that are applied to an object, such as tubular members 104, 116 to one or more of wireless device 106, computing devices 108, and computing devices 110.

Removable lever arm 4000 includes a body 4002 having a cavity 4003 that extends substantially axially through body 4002. Body 4002 has a first end 4004 that has an opening (not shown) for accepting or allowing for the insertion of the end of wrenches 118, 2904. The opening is in communication with cavity 4003 as shown. As shown in FIG. 40, the distal end or end of wrenches 118, 2904 is inserted into cavity 4003 and is in substantially rigid contact with body 4002 of removable lever arm 4000. Body 4002 extends distally from first end 4004 to a second end 4006 of body 4002. Force applied directly or indirectly to removable lever arm 4000 is transmitted to handle of a torque applying device, such as wrench 2904, for applying a torque to an object, any object, such as tubular members 104, 116.

In one embodiment, second end 4006 of removable lever arm 4000 may include a hole, via, and/or aperture 4008 for accepting hooks and the like of portable winch 120 for connecting portable winch 120 with one or more wrenches 118, 2904. Preferably, body 4002 include a hole, via, and/or aperture that substantially mates or matches up with the hole in the end of wrenches 118, 2904 for accepting a fastener and/or securing means, such as pin 4010. As shown, pin 4010 is disposed through hole of removable lever arm 4000 securing it to wrench 2904. Pin 4010 may be any type of fastener and/or securing means to enable securely fastening removable lever arm 4000 with one or more of wrenches 118, 2904.

Preferably, body 4002 may be made of any type of material such that it has the rigidity and strength to withstand the forces applied to it by portable winch 120 and/or user 114, for example. Removable lever arm 4000 also includes one or more strain gages 4012a that are disposed substantially on the bottom surface of body 4002 of removable lever arm 4000 for detecting and measuring the strain of body 4002 of removable lever arm 4000 when applying force and/or torque to an object, such as tubular members 104, 116. Additionally, removable lever arm 4000 may also include one or more strain gages 4012b (strain gages 4012a and 4012b are collectively strain gages 4012) that are disposed substantially on the upper surface of body 4002 of removable lever arm 4000 for detecting and measuring the strain of body 4002 of removable lever arm 4000 when applying force and/or torque to an object, such as tubular members 104, 116.

In one embodiment, strain gages 4012 are individual and/or sets of "foil-type" strain gages adjacent to each other that are disposed about the bottom surface and top surface of body 4002, respectively, of removable lever arm 4000 in a location that provides optimal sensitivity to the strain, flex, compression, tension, and the like of body 4002 of removable lever arm 4000 during operation of removable lever arm 4000 while applying force and/or torque to wrenches 118, 2904 for applying torque to an object, such as tubular members 104, 116.

Preferably, strain gages 4012 may have insulating flexible backing having an adhesive for adhering to bottom surface and top surface of body 4002 of removable lever arm 4000. Adhesives may be used for affixing strain gages 4012 to bottom surface and top surface of body 4002 of removable lever arm 4000. As body 4002 is deformed during operation, strain gages 4012 are slightly deformed causing the electrical resistance of strain gages 4012 to change. Any type of strain gage that is mountable to body 4002 of removable lever arm 4000 and that can provide strain readings of body 4002 during operation of removable lever arm 4000 while applying force and/or torque to wrenches 118, 2904 may be used.

As can be seen in FIG. 40, second end 4006 of removable lever arm 4000 may extend beyond the end of wrench 2904 to provide additional increased leverage distance for applying torque to an object, such as tubular member 104 and also to enclose or house a power unit 224 and electronic circuitry, such as PCB 234. Removable lever arm 4000 may include all or portions of the electronic circuitry 232, power units 224, tattle-tale wires 238, PCBs and the like (collectively electronics 4014) as described herein for communicating measurements and readings of torque that is applied to an object, such as tubular members 104, 116 when force and/or torque is applied to removable lever arm 4000 and wrenches 118, 2904. As described herein, parts of electronics 4014 are also in communication with strain gages 4012 for receiving strain readings and measurements outputted by strain gages 4012 for converting to torque measurements for transmitting to wireless device 106.

Preferably, body 4002 is made and/or formed of a material that doesn't prevent wireless transmissions, such as electromagnetic waves, radio frequency signals, etc., from transmitting between electronics 4014 of removable lever arm 4000 and one or more of wireless device 106, computing devices 108, and computing devices 110. In those instances where body 4002 may be made of a material that may compromise the wireless transmission of data, measurements, readings, instructions and the like between removable lever arm 4000 and any of wireless device 106, computing devices 108, and/or computing devices computing devices 110; an antenna 4016 in communication with electronics 4014 may be disposed about the outer surface of body 4002 of removable lever arm 4000 for communicating with one or more of wireless device 106, computing devices 108, and computing devices 110.

Figure 41:
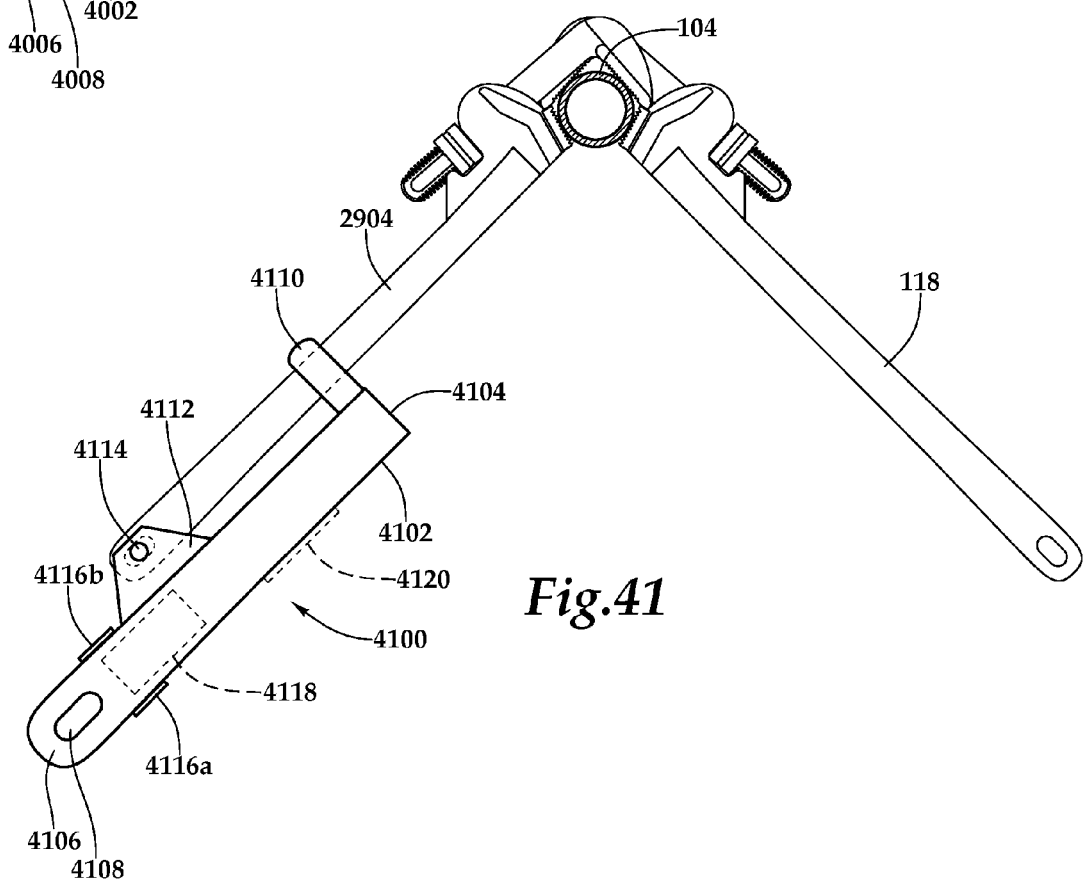
FIG. 41 is a schematic illustration of a removable lever arm having strain gages disposed about a torque applying device of the portable torque measurement and notification system according to another embodiment.

Referring now to FIG. 41, a removable lever arm having strain gages disposed about a torque applying device of the portable torque measurement and notification system is schematically illustrated and generally designated 4100. As discussed above relative to torque applying device 102, load measuring device 2902, and portable winch 120 (including load measuring device 2902), removable lever arm 4100 transmits force and/or torque measurements that are applied to an object, such as tubular members 104, 116 to one or more of wireless device 106, computing devices 108, and computing devices 110.

Removable lever arm 4100 includes a body 4102 that has a first end 4104 and a second end 4106. Force applied directly or indirectly to removable lever arm 4100 is transmitted to handle of a torque applying device, such as wrench 2904, for applying a torque to an object, any object, such as tubular members 104, 116.

In one embodiment, second end 4106 of removable lever arm 4000 may include a hole, via, and/or aperture 4108 for accepting hooks and the like of portable winch 120 for connecting portable winch 120 with one or more wrenches 118, 2904. Extending from substantially first end 4104 is a connecting member 4110 for connecting with handle of a torque applying device, such as wrench 2904. First member 4110 has a looped or u-shaped form for encircling handle of torque applying devices, such as wrench 2904, for connecting body 4102 with a portion of handle of torque applying devices, such as wrench 2904.

Removable lever arm 4100 may also include a bracket 4112 that has a hole, via, and/or aperture that substantially mates or matches up with the hole in the end of wrenches 118, 2904 for accepting a fastener and/or securing means, such as pin 4114. Bracket 4112 may extend outwardly from body 4102 in a similar direction as connecting member 4110 for connecting with handle of a torque applying device, such as wrenches 118, 2904. As shown, pin 4114 is disposed through hole of removable lever arm 4100 securing it to wrench 2904. Pin 4114 may be any type of fastener and/or securing means to enable securely fastening removable lever arm 4100 with one or more of wrenches 118, 2904.

As shown in FIG. 41, when connecting removable lever arm 4100 with a torque applying device, such as wrenches 118, 2904, the distal ends of handles of wrenches 118, 2904 are inserted through connecting member 4110 and bracket 4112 is affixed or secured to the hole disposed through the end of handle of the torque applying device, such as wrenches 118, 2904.

Preferably, body 4102 may be made of any type of material such that it has the rigidity and strength to withstand the forces applied to it by portable winch 120 and/or user 114, for example. Removable lever arm 4100 also includes one or more strain gages 4116*a* that are disposed substantially on the bottom surface of body 4102 of removable lever arm 4100 for detecting and measuring the strain of body 4102 of removable lever arm 4100 when applying force and/or torque to an object, such as tubular members 104, 116. Additionally, removable lever arm 4100 may also include one or more strain gages 4116*b* (strain gages 4116*a* and 4116*b* are collectively strain gages 4116) that are disposed substantially on the upper surface of body 4102 of removable lever arm 4100 for detecting and measuring the strain of body 4102 of removable lever arm 4100 when applying force and/or torque to an object, such as tubular members 104, 116.

In one embodiment, strain gages 4116 are individual and/or sets of "foil-type" strain gages adjacent to each other that are disposed about the bottom surface and top surface of body 4102, respectively, of removable lever arm 4100 in a location that provides optimal sensitivity to the strain, flex, compression, tension, and the like of body 4102 of removable lever arm 4100 during operation of removable lever arm 4100 while applying force and/or torque to wrenches 118, 2904 for applying torque to an object, such as tubular members 104, 116.

Preferably, strain gages 4116 may have insulating flexible backing having an adhesive for adhering to bottom surface and top surface of body 4102 of removable lever arm 4100. Adhesives may be used for affixing strain gages 4116 to bottom surface and top surface of body 4102 of removable lever arm 4100. As body 4102 is deformed during operation, strain gages 4116 are slightly deformed causing the electrical resistance of strain gages 4116 to change. Any type of strain gage that is mountable to body 4102 of removable lever arm 4100 and that can provide strain readings of body 4102 during operation of removable lever arm 4100 while applying force and/or torque to wrenches 118, 2904 may be used.

As can be seen in FIG. 41, second end 4106 of removable lever arm 4100 may extend beyond the end of wrench 2904 to provide additional increased leverage distance for applying torque to an object, such as tubular member 104. Removable lever arm 4100 also encloses and houses a power unit 224 and electronic circuitry, such as PCB 234. Removable lever arm 4100 may include all or portions of the electronic circuitry 232, power units 224, tattle-tale wires 238, PCBs and the like (collectively electronics 4018) as described herein for communicating measurements and readings of torque that is applied to an object, such as tubular members 104, 116 when force and/or torque is applied to removable lever arm 4100 and wrenches 118, 2904. As described herein, parts of electronics 4118 are also in communication with strain gages 4116 for receiving strain readings and measurements outputted by strain gages 4116 for converting to torque measurements for transmitting to wireless device 106.

Preferably, body 4102 is made and/or formed of a material that doesn't prevent wireless transmissions, such as electromagnetic waves, radio frequency signals, etc., from transmitting between electronics 4118 of removable lever arm 4100 and one or more of wireless device 106, computing devices 108, and computing devices 110. In those instances where body 4102 may be made of a material that may compromise the wireless transmission of data, measurements, readings, instructions and the like between removable lever arm 4100 and any of wireless device 106, computing devices 108, and/or computing devices computing devices 110; an antenna 4120 in communication with electronics 4118 may be disposed about the outer surface of body 4102 of removable lever arm 4100 for communicating with one or more of wireless device 106, computing devices 108, and computing devices 110.

Figure 42:
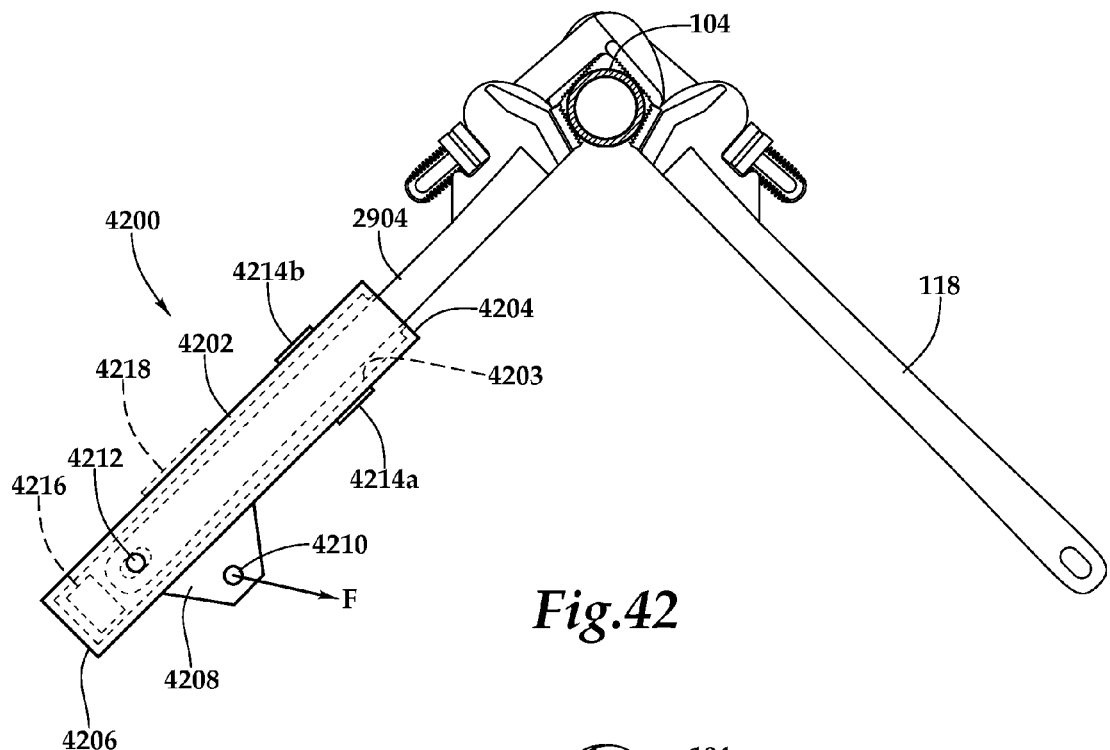
FIG. 42 is a schematic illustration of a removable lever arm having strain gages disposed about a torque applying device of the portable torque measurement and notification system according to another embodiment.

Turning now to FIG. 42, a removable lever arm having strain gages disposed about a torque applying device of the portable torque measurement and notification system is schematically illustrated and generally designated 4200. As discussed above relative to torque applying device 102, load measuring device 2902, and portable winch 120 (including load measuring device 2902), removable lever arm 4200 measures and transmits force and/or torque measurements that are applied to an object, such as tubular members 104, 116 to one or more of wireless device 106, computing devices 108, and computing devices 110.

Removable lever arm 4200 includes a body 4202 having a cavity 4203 that extends substantially axially through body 4202. Body 4202 has a first end 4204 that has an opening (not shown) for accepting or allowing for the insertion of the end of torque applying devices, such as wrenches 118, 2904. The opening is in communication with cavity 4203 as shown. As shown in FIG. 42, the distal end or end of wrenches 118, 2904 is inserted into cavity 4203 and is in substantially rigid contact with body 4202 of removable lever arm 4200. Body 4202 extends distally from first end 4204 to a second end 4206 of body 4202. Force applied directly or indirectly to removable lever arm 4200 is transmitted to handle of a torque applying device, such as wrench 2904, for applying a torque to an object, any object, such as tubular members 104, 116.

Removable lever arm 4200 includes a bracket 4208 that has a hole, via, and/or aperture 4210 for accepting a hook or other fastening means of portable winch 120 and the like to connect bracket 4208 of removable lever arm 4200 with another torque applying device, such as wrench 118. Additionally, body 4202 include a hole, via, and/or aperture that substantially mates or matches up with the hole in the end of wrenches 118, 2904 for accepting a fastener and/or securing means, such as pin 4212. Bracket 4208 may extend outwardly from body 4202 towards another torque applying device, such as wrench 118, for connecting with handle of the torque applying device, such as wrenches 118, 2904.

As shown, pin 4212 is disposed through hole of removable lever arm 4200 securing it to wrench 2904. Pin 4212 may be any type of fastener and/or securing means to enable securely fastening removable lever arm 4200 with one or more of wrenches 118, 2904. Preferably, body 4202 may be made of any type of material such that it has the rigidity and strength to withstand the forces applied to it by portable winch 120 and/or user 114, for example. Removable lever arm 4200 also includes one or more strain gages 4014*a* that are disposed substantially on the bottom surface of body 4202 of removable lever arm 4200 for detecting and measuring the strain of body 4202 of removable lever arm 4200 when applying force and/or torque to an object, such as tubular members 104, 116. Additionally, removable lever arm 4200 may also include one or more strain gages 4214b (strain gages 4214a and 4214b are collectively strain gages 4214) that are disposed substantially on the upper surface of body 4202 of removable lever arm 4200 for detecting and measuring the strain of body 4202 of removable lever arm 4200 when applying force and/or torque to an object, such as tubular members 104, 116.

In one embodiment, strain gages 4214 are individual and/or sets of "foil-type" strain gages adjacent to each other that are disposed about the bottom surface and top surface of body 4202, respectively, of removable lever arm 4200 in a location that provides optimal sensitivity to the strain, flex, compression, tension, and the like of body 4202 of removable lever arm 4200 during operation of removable lever arm 4200 while applying force and/or torque to wrenches 118, 2904 for applying torque to an object, such as tubular members 104, 116.

Preferably, strain gages 4214 may have insulating flexible backing having an adhesive for adhering to bottom surface and top surface of body 4202 of removable lever arm 4200. Adhesives may be used for affixing strain gages 4214 to bottom surface and top surface of body 4202 of removable lever arm 4200. As body 4202 is deformed during operation, strain gages 4214 are slightly deformed causing the electrical resistance of strain gages 4214 to change. Any type of strain gage that is mountable to body 4202 of removable lever arm 4200 and that can provide strain readings of body 4202 during operation of removable lever arm 4200 while applying force and/or torque to wrenches 118, 2904 may be used.

As can be seen in FIG. 42, second end 4206 of removable lever arm 4200 may extend beyond the end of wrench 2904 to enclose or house a power unit 224 and electronic circuitry, such as PCB 234. Removable lever arm 4200 may include all or portions of the electronic circuitry 232, power units 224, tattle-tale wires 238, PCBs and the like (collectively electronics 4216) as described herein for communicating measurements and readings of torque that is applied to an object, such as tubular members 104, 116 when force and/or torque is applied to removable lever arm 4200 and wrenches 118, 2904. As described herein, parts of electronics 4216 are also in communication with strain gages 4214 for receiving strain readings and measurements outputted by strain gages 4214 for converting to torque measurements for transmitting to wireless device 106.

Preferably, body 4202 is made and/or formed of a material that doesn't prevent wireless transmissions, such as electromagnetic waves, radio frequency signals, etc., from transmitting between electronics 4216 of removable lever arm 4200 and one or more of wireless device 106, computing devices 108, and computing devices 110. In those instances where body 4202 may be made of a material that may compromise the wireless transmission of data, measurements, readings, instructions and the like between removable lever arm 4200 and any of wireless device 106, computing devices 108, and/or computing devices computing devices 110; an antenna 4218 in communication with electronics 4216 may be disposed about the outer surface of body 4202 of removable lever arm 4200 for communicating with one or more of wireless device 106, computing devices 108, and computing devices 110.

Figure 43:
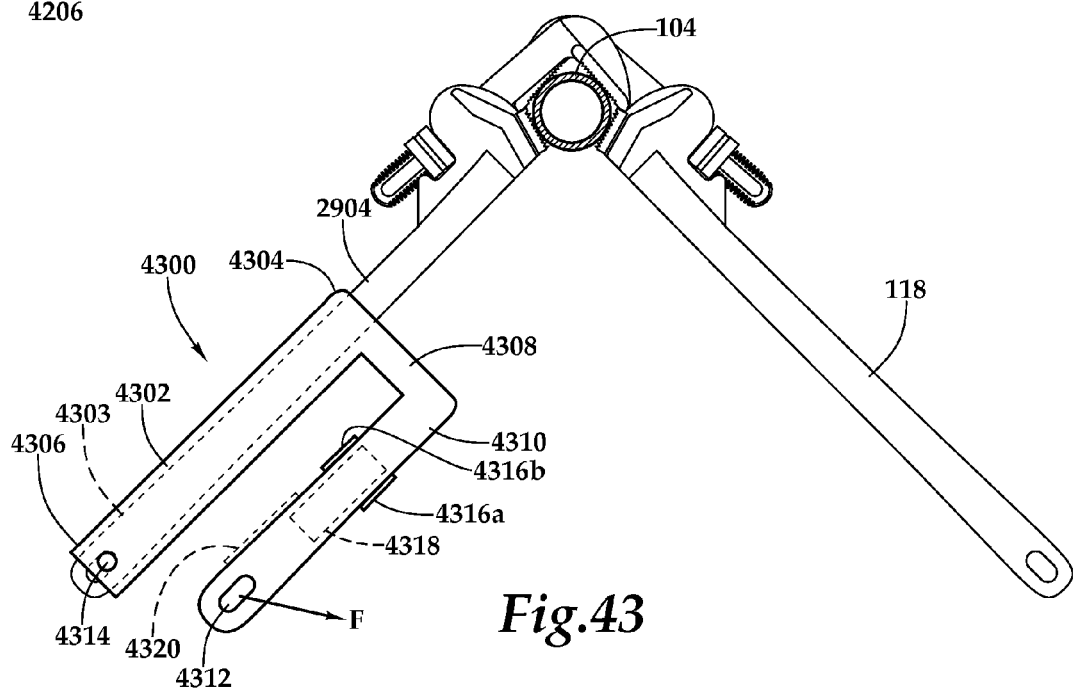
FIG. 43 is a schematic illustration of a removable lever arm having strain gages disposed about a torque applying device of the portable torque measurement and notification system according to another embodiment.

Turning now to FIG. 43, a removable lever arm having strain gages disposed about a torque applying device of the portable torque measurement and notification system is schematically illustrated and generally designated 4300. As discussed above relative to torque applying device 102, load measuring device 2902, and portable winch 120 (including load measuring device 2902), removable lever arm 4300 measures and transmits force and/or torque measurements that are applied to an object, such as tubular members 104, 116 to one or more of wireless device 106, computing devices 108, and computing devices 110.

Removable lever arm 4300 includes a body 4302 having a cavity 4303 that extends substantially axially through body 4302. Body 4302 has a first end 4304 that has an opening (not shown) for accepting or allowing for the insertion of the end of torque applying devices, such as wrenches 118, 2904. The opening is in communication with cavity 4303 as shown. As shown in FIG. 43, the distal end or end of wrenches 118, 2904 is inserted into cavity 4303 and is in substantially rigid contact with body 4302 of removable lever arm 4300. Body 4302 extends distally from first end 4304 to a second end 4306 of body 4302. Force applied directly or indirectly to removable lever arm 4300 is transmitted to handle of a torque applying device, such as wrench 2904, for applying a torque to an object, any object, such as tubular members 104, 116.

Removable lever arm 4300 includes a first member 4308 and a second member 4310 that together with body 4302 for a substantially U-shaped lever arm. As shown in FIG. 43, first member 4308 may extend substantially perpendicular from body 4302, in one instance. In another aspect, first member 4308 may form a different angle relative to body 4302. Also as shown in FIG. 43, second member 4310 may extend substantially perpendicular from first member 4308 such that second member 4310 may be disposed substantially parallel axially to body 4302. This is just one embodiment, and other embodiments of arrangements of first member 4308 and second member 4310 relative to body 4302 are also considered part of this disclosure. In another embodiment, any number of bends and members may be employed relative to body 4302 for providing a connection point to portable winch 120 and/or user 114 for providing force and/or torque to an object, such as tubular members 104, 116.

In one aspect, second member 4310 may include a hole, via, and/or aperture 4312 for accepting a hook or other fastening means of portable winch 120 and the like to connect first member 4308 and/or second member 4310 removable lever arm 4300 with another torque applying device, such as wrench 118. Additionally, body 4302 may include a hole, via, and/or aperture that substantially mates or matches up with the hole in the end of wrenches 118, 2904 for accepting a fastener and/or securing means, such as pin 4314.

As shown, pin 4314 is disposed through hole of removable lever arm 4300 securing it to wrench 2904. Pin 4314 may be any type of fastener and/or securing means to enable securely fastening removable lever arm 4300 with one or more of wrenches 118, 2904. Preferably, body 4302 may be made of any type of material such that it has the rigidity and strength to withstand the forces applied to it by portable winch 120 and/or user 114, for example. Removable lever arm 4300 also includes one or more strain gages 4316a that are disposed substantially on the bottom surface of second member 4310 of removable lever arm 4300 for detecting and measuring the strain of first member 4310 of removable lever arm 4300 when applying force and/or torque to an object, such as tubular members 104, 116. Additionally, removable lever arm 4300 may also include one or more strain gages 4316b (strain gages 4316a and 4316b are collectively strain gages 4316) that are disposed substantially on the upper surface of second member 4310 of removable lever arm 4300 for detecting and measuring the strain of body 4302 of removable lever arm 4300 when applying force and/or torque to an object, such as tubular members 104, 116.

In one embodiment, strain gages 4316 are individual and/or sets of "foil-type" strain gages adjacent to each other that are disposed about the bottom surface and top surface of second member 4310, respectively, of removable lever arm 4300 in a location that provides optimal sensitivity to the strain, flex, compression, tension, and the like of second member 4310 of removable lever arm 4300 during operation of removable lever arm 4300 while applying force and/or torque to wrenches 118, 2904 for applying torque to an object, such as tubular members 104, 116.

Preferably, strain gages 4316 may have insulating flexible backing having an adhesive for adhering to bottom surface and top surface of second member 4310 of removable lever arm 4300. Adhesives may be used for affixing strain gages 4316 to bottom surface and top surface of second member 4310 of removable lever arm 4300. As second member 4310 is deformed during operation, strain gages 4316 are slightly deformed causing the electrical resistance of strain gages 4316 to change. Any type of strain gage that is mountable to body 4302 of removable lever arm 4300 and that can provide strain readings of second member 4310 during operation of removable lever arm 4300 while applying force and/or torque to wrenches 118, 2904 may be used.

As can be seen in FIG. 43, second end 4306 may enclose or house a power unit 224 and electronic circuitry, such as PCB 234. Second member 4310 of removable lever arm 4300 may include all or portions of the electronic circuitry 232, power units 224, tattle-tale wires 238, PCBs and the like (collectively electronics 4318) as described herein for communicating measurements and readings of torque that is applied to an object, such as tubular members 104, 116 when force and/or torque is applied to removable lever arm 4300 and wrenches 118, 2904. In another embodiment, electronics 4318 may be disposed in any other components and/or parts of removable lever arm 4300, including first member 4308 and body 4302, for example. As described herein, parts of electronics 4318 are also in communication with strain gages 4316 for receiving strain readings and measurements outputted by strain gages 4316 for converting to torque measurements for transmitting to wireless device 106.

Preferably, body 4302 is made and/or formed of a material that doesn't prevent wireless transmissions, such as electromagnetic waves, radio frequency signals, etc., from transmitting between electronics 4318 of removable lever arm 4300 and one or more of wireless device 106, computing devices 108, and computing devices 110. In those instances where body 4302 may be made of a material that may compromise the wireless transmission of data, measurements, readings, instructions and the like between removable lever arm 4300 and any of wireless device 106, computing devices 108, and/or computing devices computing devices 110; an antenna 4320 in communication with electronics 4318 may be disposed about the outer surface of second member 4310, body 4302, and/or first member 4308 of removable lever arm 4300 for communicating with one or more of wireless device 106, computing devices 108, and computing devices 110.

Figure 44:
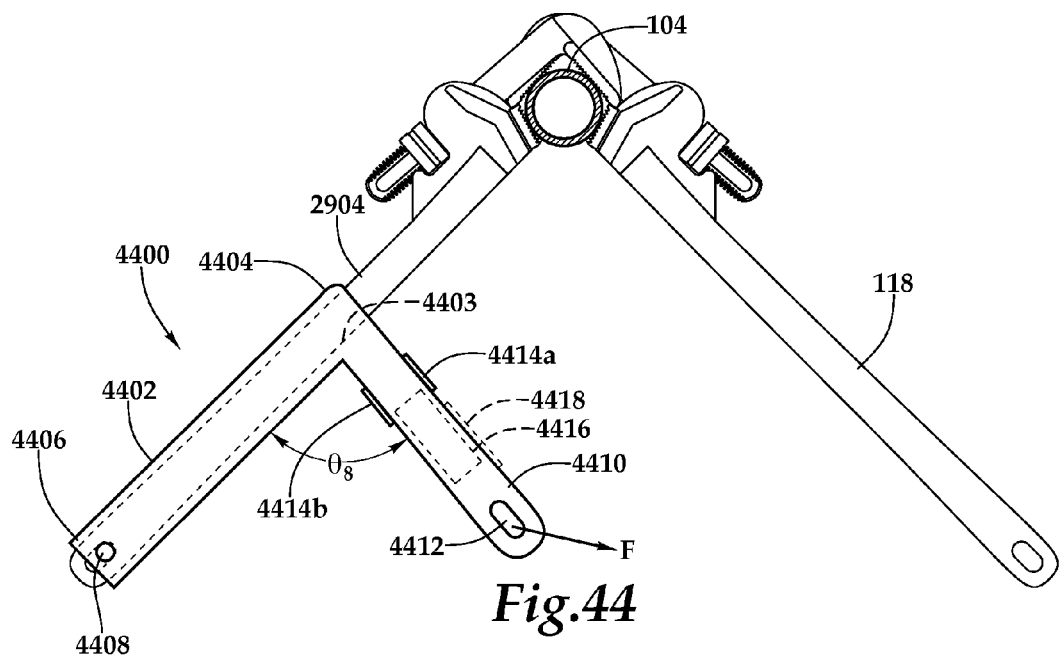
FIG. 44 is a schematic illustration of a removable lever arm having strain gages disposed about a torque applying device of the portable torque measurement and notification system according to another embodiment.

Turning now to FIG. 44, a removable lever arm having strain gages disposed about a torque applying device of the portable torque measurement and notification system is schematically illustrated and generally designated 4400. As discussed above relative to torque applying device 102, load measuring device 2902, and portable winch 120 (including load measuring device 2902), removable lever arm 4400 measures and transmits force and/or torque measurements that are applied to an object, such as tubular members 104, 116 to one or more of wireless device 106, computing devices 108, and computing devices 110.

Removable lever arm 4400 includes a body 4402 having a cavity 4403 that extends substantially axially through body 4402. Body 4402 has a first end 4404 that has an opening (not shown) for accepting or allowing for the insertion of the end of torque applying devices, such as wrenches 118, 2904. The opening is in communication with cavity 4403 as shown. As shown in FIG. 44, the distal end or end of wrenches 118, 2904 is inserted into cavity 4403 and is in substantially rigid contact with body 4402 of removable lever arm 4400. Body 4402 extends distally from first end 4404 to a second end 4406 of body 4402. Force applied directly or indirectly to removable lever arm 4400 is transmitted to handle of a torque applying device, such as wrench 2904, for applying a torque to an object, any object, such as tubular members 104, 116.

Removable lever arm 4400 includes an extending member 4410 that forms an angle $\theta_8$ with body 4402 for a substantially L-shaped lever arm. As shown in FIG. 44, extending member 4410 may extend substantially perpendicular from body 4402, in one instance. In another aspect, extending member 4410 may form a different angle relative to body 4402. In another embodiment, any number of bends and members may be employed relative to body 4402 and extending member 4410 for providing a connection point to portable winch 120 and/or user 114 for providing force and/or torque to an object, such as tubular members 104, 116.

In one aspect, extending member 4410 may include a hole, via, and/or aperture 4412 for accepting a hook or other fastening means of portable winch 120 and the like to connect extending member 4410 with another torque applying device, such as wrench 118. Additionally, body 4402 may include a hole, via, and/or aperture that substantially mates or matches up with the hole in the end of wrenches 118, 2904 for accepting a fastener and/or securing means, such as pin 4408.

As shown, pin 4408 is disposed through hole of removable lever arm 4400 securing it to wrench 2904. Pin 4408 may be any type of fastener and/or securing means to enable securely fastening removable lever arm 4400 with one or more of wrenches 118, 2904. Preferably, body 4402 may be made of any type of material such that it has the rigidity and strength to withstand the forces applied to it by portable winch 120 and/or user 114, for example. Removable lever arm 4400 also includes one or more strain gages 4414*b* that are disposed substantially on the bottom surface of extending member 4410 of removable lever arm 4400 for detecting and measuring the strain of extending member 4410 of removable lever arm 4400 when applying force and/or torque to an object, such as tubular members 104, 116. Additionally, removable lever arm 4400 may also include one or more strain gages 4414*a* (strain gages 4414*a* and 4414*b* are collectively strain gages 4414) that are disposed substantially on the upper surface of extending member 4410 of removable lever arm 4400 for detecting and measuring the strain of extending member 4410 of removable lever arm 4400 when applying force and/or torque to an object, such as tubular members 104, 116.

In one embodiment, strain gages 4316 are individual and/or sets of "foil-type" strain gages adjacent to each other that are disposed about the bottom surface and top surface of extending member 4410, respectively, of removable lever arm 4400 in a location that provides optimal sensitivity to the strain, flex, compression, tension, and the like of extending member 4410 of removable lever arm 4400 during operation of removable lever arm 4400 while applying force and/or torque to wrenches 118, 2904 for applying torque to an object, such as tubular members 104, 116.

Preferably, strain gages 4414 may have insulating flexible backing having an adhesive for adhering to bottom surface and top surface of extending member 4410 of removable lever arm 4400. Adhesives may be used for affixing strain gages 4414 to bottom surface and top surface of extending member 4410 of removable lever arm 4400. As extending member 4410 is deformed during operation, strain gages 4414 are slightly deformed causing the electrical resistance of strain gages 4414 to change. Any type of strain gage that is mountable to body 4402 of removable lever arm 4400 and that can provide strain readings of extending member 4410 during operation of removable lever arm 4400 while applying force and/or torque to wrenches 118, 2904 may be used.

As can be seen in FIG. 44, extending member 4410 may enclose or house a power unit 224 and electronic circuitry, such as PCB 234. Extending member 4410 of removable lever arm 4400 may include all or portions of the electronic circuitry 232, power units 224, tattle-tale wires 238, PCBs and the like (collectively electronics 4416) as described herein for communicating measurements and readings of torque that is applied to an object, such as tubular members 104, 116 when force and/or torque is applied to removable lever arm 4400 and wrenches 118, 2904. In another embodiment, electronics 4416 may be disposed in any other components and/or parts of removable lever arm 4400, including body 4402, for example. As described herein, parts of electronics 4416 are also in communication with strain gages 4414 for receiving strain readings and measurements outputted by strain gages 4414 for converting to torque measurements for transmitting to wireless device 106.

Preferably, body 4402 is made and/or formed of a material that doesn't prevent wireless transmissions, such as electromagnetic waves, radio frequency signals, etc., from transmitting between electronics 4416 of removable lever arm 4400 and one or more of wireless device 106, computing devices 108, and computing devices 110. In those instances where body 4402 may be made of a material that may compromise the wireless transmission of data, measurements, readings, instructions and the like between removable lever arm 4400 and any of wireless device 106, computing devices 108, and/or computing devices computing devices 110; an antenna 4418 in communication with electronics 4416 may be disposed about the outer surface of extending member 4410 and/or body 4402 of removable lever arm 4400 for communicating with one or more of wireless device 106, computing devices 108, and computing devices 110.

Figure 45:
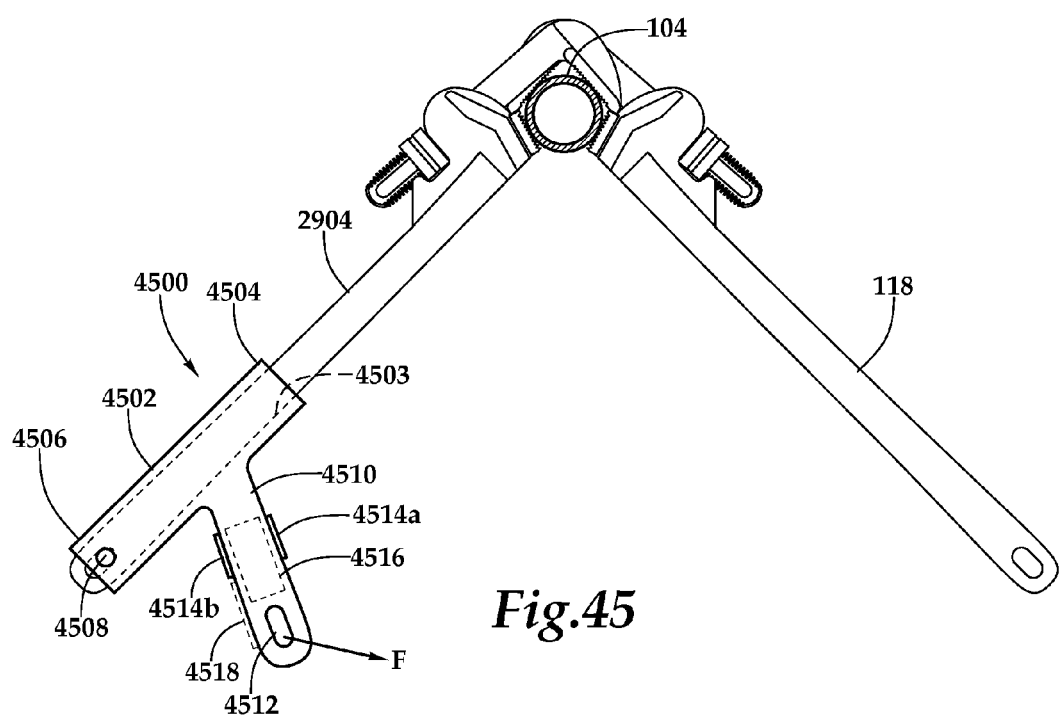
FIG. 45 is a schematic illustration of a removable lever arm having strain gages disposed about a torque applying device of the portable torque measurement and notification system according to another embodiment.

Referring now to FIG. 45, a removable lever arm having strain gages disposed about a torque applying device of the portable torque measurement and notification system is schematically illustrated and generally designated 4500. As discussed above relative to torque applying device 102, load measuring device 2902, and portable winch 120 (including load measuring device 2902), removable lever arm 4500 measures and transmits force and/or torque measurements that are applied to an object, such as tubular members 104, 116 to one or more of wireless device 106, computing devices 108, and computing devices 110.

Removable lever arm 4500 includes a body 4502 having a cavity 4503 that extends substantially axially through body 4502. Body 4502 has a first end 4504 that has an opening (not shown) for accepting or allowing for the insertion of the end of torque applying devices, such as wrenches 118, 2904. The opening is in communication with cavity 4503 as shown. As shown in FIG. 45, the distal end or end of wrenches 118, 2904 is inserted into cavity 4503 and is in substantially rigid contact with body 4502 of removable lever arm 4500. Body 4502 extends distally from first end 4504 to a second end 4506 of body 4502. Force applied directly or indirectly to removable lever arm 4500 is transmitted to handle of a torque applying device, such as wrench 2904, for applying a torque to an object, any object, such as tubular members 104, 116.

Removable lever arm 4500 includes an extending member 4510 that forms an angle with body 4502 for a substantially T-shaped lever arm. As shown in FIG. 45, extending member 4510 may extend substantially perpendicular from body 4502, in one instance. In another aspect, extending member 4510 may form a different angle relative to body 4502. In another embodiment, any number of bends and members may be employed relative to body 4502 and extending member 4510 for providing a connection point to portable winch 120 and/or user 114 for providing force and/or torque to an object, such as tubular members 104, 116.

In one aspect, extending member 4510 may include a hole, via, and/or aperture 4512 for accepting a hook or other fastening means of portable winch 120 and the like to connect extending member 4410 with another torque applying device, such as wrench 118. Additionally, body 4502 may include a hole, via, and/or aperture that substantially mates or matches up with the hole in the end of wrenches 118, 2904 for accepting a fastener and/or securing means, such as pin 4508.

As shown, pin 4508 is disposed through hole of removable lever arm 4500 securing it to wrench 2904. Pin 4508 may be any type of fastener and/or securing means to enable securely fastening removable lever arm 4500 with one or more of wrenches 118, 2904. Preferably, body 4502 may be made of any type of material such that it has the rigidity and strength to withstand the forces applied to it by portable winch 120 and/or user 114, for example. Removable lever arm 4500 also includes one or more strain gages 4514b that are disposed substantially on the bottom surface of extending member 4510 of removable lever arm 4500 for detecting and measuring the strain of extending member 4510 of removable lever arm 4500 when applying force and/or torque to an object, such as tubular members 104, 116. Additionally, removable lever arm 4500 may also include one or more strain gages 4514a (strain gages 4514a and 4514b are collectively strain gages 4414) that are disposed substantially on the upper surface of extending member 4510 of removable lever arm 4500 for detecting and measuring the strain of extending member 4510 of removable lever arm 4500 when applying force and/or torque to an object, such as tubular members 104, 116.

In one embodiment, strain gages 4514 are individual and/or sets of "foil-type" strain gages adjacent to each other that are disposed about the bottom surface and top surface of extending member 4510, respectively, of removable lever arm 4500 in a location that provides optimal sensitivity to the strain, flex, compression, tension, and the like of extending member 4510 of removable lever arm 4500 during operation of removable lever arm 4500 while applying force and/or torque to wrenches 118, 2904 for applying torque to an object, such as tubular members 104, 116.

Preferably, strain gages 4514 may have insulating flexible backing having an adhesive for adhering to bottom surface and top surface of extending member 4510 of removable lever arm 4500. Adhesives may be used for affixing strain gages 4514 to bottom surface and top surface of extending member 4510 of removable lever arm 4500. As extending member 4510 is deformed during operation, strain gages 4514 are slightly deformed causing the electrical resistance of strain gages 4514 to change. Any type of strain gage that is mountable to body 4502 of removable lever arm 4500 and that can provide strain readings of extending member 4510 during operation of removable lever arm 4500 while applying force and/or torque to wrenches 118, 2904 may be used.

As can be seen in FIG. 45, extending member 4510 may enclose or house a power unit 224 and electronic circuitry, such as PCB 234. Extending member 4510 of removable lever arm 4500 may include all or portions of the electronic circuitry 232, power units 224, tattle-tale wires 238, PCBs and the like (collectively electronics 4516) as described herein for communicating measurements and readings of torque that is applied to an object, such as tubular members 104, 116 when force and/or torque is applied to removable lever arm 4500 and wrenches 118, 2904. In another embodiment, electronics 4516 may be disposed in any other components and/or parts of removable lever arm 4500, including body 4502, for example. As described herein, parts of electronics 4516 are also in communication with strain gages 4514 for receiving strain readings and measurements outputted by strain gages 4514 for converting to torque measurements for transmitting to wireless device 106.

Preferably, body 4502 is made and/or formed of a material that doesn't prevent wireless transmissions, such as electromagnetic waves, radio frequency signals, etc., from transmitting between electronics 4516 of removable lever arm 4500 and one or more of wireless device 106, computing devices 108, and computing devices 110. In those instances where body 4502 may be made of a material that may compromise the wireless transmission of data, measurements, readings, instructions and the like between removable lever arm 4500 and any of wireless device 106, computing devices 108, and/or computing devices computing devices 110; an antenna 4518 in communication with electronics 4516 may be disposed about the outer surface of extending member 4510 and/or body 4502 of removable lever arm 4500 for communicating with one or more of wireless device 106, computing devices 108, and computing devices 110.

While this invention has been described with reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. A portable torque measurement and notification system, comprising:
   a sensing device having a first end adaptable to connect with a first torque applying device and a second end adaptable to connect with a second torque applying device, the first and second torque applying device to apply torque to an object, the sensing device comprising:
      one or more sensors in communication with the first end and second end of the sensing device to produce load responsive measurements of the at least one of the first and second torque applying device;
      a first electronic circuit to receive the one or more load responsive measurements and to transmit wirelessly at least one of the group consisting of the one or more load responsive measurements; and
   a wireless device operable to communicate wirelessly with the sensing device, the wireless device having a means for receiving at least one of the group consisting of the one or more load responsive measurements.

2. The portable torque measurement and notification system as recited in claim 1, further comprising:
   a load generating device disposed between one of the first end of the sensing device and the first torque applying device and the second end of the sensing device and the second torque applying device.

3. The portable torque measurement and notification system as recited in claim 1, wherein the sensing device determines the distance between the first and second torque applying device.

4. The portable torque measurement and notification system as recited in claim 1, wherein the wireless device produces a notifier based on the difference between one or more torque measurements and a target torque value.

5. The portable torque measurement and notification system as recited in claim 4, wherein the wireless device stores algorithms to determine a repetition rate of the notifier based on the difference between the one or more torque measurements and the target torque value.

6. The portable torque measurement and notification system as recited in claim 1, wherein the sensing device and wireless device communicate wirelessly at an effective range of no more than 10 feet.

7. The portable torque measurement and notification system as recited in claim 1, wherein the first electronic circuit converts the one or more load responsive measurements to one or more torque measurements.

8. A portable torque measurement and notification system, comprising:
   a sensing device having a first end adaptable to connect with a first torque applying device and a second end adaptable to connect with a load generating device, the first torque applying device to apply torque to an object, the sensing device comprising:
      one or more sensors in communication with the first end and second end of the sensing device to produce load responsive measurements of the first torque applying device;
      a first electronic circuit to receive the one or more load responsive measurements and to transmit wirelessly at least one of the group consisting of the one or more load responsive measurements;
   a wireless device operable to communicate wirelessly with the sensing device, the wireless device having a means for receiving at least one of the group consisting of the one or more load responsive measurements and the one or more torque measurements, and a second electronic circuit to produce a notifier; and
   a first member to position the sensing device substantially perpendicular to the first torque applying device.

9. The portable torque measurement and notification system as recited in claim 8, wherein the first member is a brace that extends from the object to one of the first and second ends of the sensing device.

10. The portable torque measurement and notification system as recited in claim 8, wherein the first member is a strain beam.

11. The portable torque measurement and notification system as recited in claim 8, wherein the first member is a bracket.

12. The portable torque measurement and notification system as recited in claim 8, wherein the sensing device and wireless device communicate wirelessly at an effective range of no more than 10 feet.

13. A method for measuring torque measurement and generating a notifier, comprising:
   searching for one or more wirelessly pairable load applying devices for applying a load to an object;
   displaying to a user those paired one or more load applying devices;
   responsive to selecting one of the displayed one or more load applying devices, receiving one or more of the group consisting of load measurements and torque measurements transmitted from the selected load applying device; and generating a notifier based on the proximity of the one or more of the group consisting of load measurements and torque measurements and a target value.

14. The method as recited in claim 13, further comprising: converting the one or more load measurements to one or more equivalent torque measurements.

15. The method as recited in claim 13, wherein the target value is a target torque value.

16. The method as recited in claim 13, wherein the notifier is selected from the group consisting of an aural notifier, audible notifier, tactile notifier, vibratory notifier, and vocal notifier, voice notifier, and visual notifier.

17. The method as recited in claim 13, wherein the generating the notifier comprises:

displaying to the user a graphical representation of the one or more of the group consisting of load measurements and torque measurements in real-time relative to the target value.

18. The method as recited in claim 13, further comprising: transmitting all of the received one or more of the group consisting of load measurements and torque measurements to a storage device.

19. The method as recited in claim 13, further comprising: inputting the target value by the user.

20. The method as recited in claim 13, further comprising: inputting one or more of the group consisting of one or more dimensions of the object, one or more dimensions of the load applying device, offset, gain, zero, calibration, distance between one or more load applying devices.

* * * * *